(12) United States Patent
Jha et al.

(10) Patent No.: US 12,236,779 B2
(45) Date of Patent: Feb. 25, 2025

(54) COLLECTIVE PERCEPTION SERVICE ENHANCEMENTS IN INTELLIGENT TRANSPORT SYSTEMS

(71) Applicant: Intel Corporation, Santa Clara, CA (US)

(72) Inventors: Satish C. Jha, Portland, OR (US); Kathiravetpillai Sivanesan, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 17/924,016

(22) PCT Filed: May 25, 2021

(86) PCT No.: PCT/US2021/034031
§ 371 (c)(1),
(2) Date: Nov. 8, 2022

(87) PCT Pub. No.: WO2021/252174
PCT Pub. Date: Dec. 16, 2021

(65) Prior Publication Data
US 2023/0206755 A1    Jun. 29, 2023

Related U.S. Application Data

(60) Provisional application No. 63/036,156, filed on Jun. 8, 2020.

(51) Int. Cl.
*G08G 1/01* (2006.01)
*G08G 1/09* (2006.01)
(Continued)

(52) U.S. Cl.
CPC ......... *G08G 1/0141* (2013.01); *G08G 1/0112* (2013.01); *G08G 1/012* (2013.01);
(Continued)

(58) Field of Classification Search
CPC .... G08G 1/0141; G08G 1/0112; G08G 1/012; G08G 1/094; G08G 1/096775; H04W 4/38; H04W 4/40
(Continued)

(56) References Cited

U.S. PATENT DOCUMENTS 11,575,750 B2 *    2/2023   Nassor ................ H04W 12/122
2018/0365909 A1 *  12/2018  Cheng .................... G07C 5/008
(Continued)

FOREIGN PATENT DOCUMENTS

WO    WO 2019-156266 A1    8/2019
WO    WO 2020-257642 A1    12/2020

OTHER PUBLICATIONS

International Search Report and Written Opinion mailed Sep. 16, 2021 for International Patent Application No. PCT/US2021/034031, 13 pages.
(Continued)

*Primary Examiner* — Zhen Y Wu
(74) *Attorney, Agent, or Firm* — Schwabe, Williamson & Wyatt, P.C.

(57) ABSTRACT

The present disclosure is related to Intelligent Transport Systems (ITS), and in particular, to service dissemination basic services (SDBS) and/or collective perception service (CPS) of an ITS Station (ITS-S). Implementations of how the SDBS and/or CPS is arranged within the facilities layer of an ITS-S, different conditions for service dissemination messages (SDMs) and/or collective perception message (CPM) dissemination, and format and coding rules of the SDM/CPS generation are provided.

25 Claims, 14 Drawing Sheets

(51) Int. Cl.
  *G08G 1/0967* (2006.01)
  *H04W 4/38* (2018.01)
  *H04W 4/40* (2018.01)

(52) U.S. Cl.
  CPC ....... *G08G 1/094* (2013.01); *G08G 1/096775* (2013.01); *H04W 4/38* (2018.02); *H04W 4/40* (2018.02)

(58) Field of Classification Search
  USPC ...................................................... 340/425.5
  See application file for complete search history.

(56) References Cited

U.S. PATENT DOCUMENTS

| | | | |
|---|---|---|---|
| 2019/0339082 A1* | 11/2019 | Doig | G01C 21/3848 |
| 2020/0228946 A1* | 7/2020 | Hwang | H04W 4/40 |
| 2020/0326726 A1* | 10/2020 | Vassilovski | G08G 1/096741 |
| 2020/0374053 A1* | 11/2020 | Hwang | H04W 4/40 |
| 2021/0067926 A1* | 3/2021 | Hwang | H04W 4/44 |
| 2021/0160323 A1* | 5/2021 | Nassor | G08G 1/012 |
| 2021/0344513 A1* | 11/2021 | Russell | H04L 9/0891 |
| 2021/0347382 A1* | 11/2021 | Huang | G01S 19/393 |
| 2022/0005353 A1* | 1/2022 | Hwang | H04W 4/40 |
| 2022/0061093 A1* | 2/2022 | Back | H04W 74/0816 |
| 2022/0086609 A1* | 3/2022 | Hwang | H04W 4/40 |
| 2022/0103986 A1* | 3/2022 | Hwang | H04W 4/44 |
| 2022/0217513 A1* | 7/2022 | Back | H04W 92/10 |
| 2022/0217568 A1* | 7/2022 | Mach | H04W 36/037 |
| 2023/0179969 A1* | 6/2023 | Pateromichelakis | H04L 41/0894 370/329 |

OTHER PUBLICATIONS

"Intelligent Transport Systems (ITS); Vehicular Communications; Basic Set of Applications; Analysis of the Collective Perception Service (CPS); Release 2", ETSI TR 103 562 V2.1.1, 119 pages, Dec. 2019.

Ferdinand Mütsch, "TalkyCars: A Distributed Software Platform for Cooperative Perception among Connected Autonomous Vehicles based on Cellular-V2X Communication", Karlsruhe Institute of Technology, Master's Thesis, 127 pages (Apr. 8, 2020).

International Preliminary Report on Patentability mailed Dec. 22, 2022 for International Patent Application No. PCT/US2021/034031, 9 pages.

* cited by examiner

COLLECTIVE PERCEPTION SERVICE ENHANCEMENTS IN INTELLIGENT TRANSPORT SYSTEMS

RELATED APPLICATIONS

The present application is a national phase entry under 37 U.S.C. § 371 of Int'l App. No. PCT/US2021/034031, filed May 25, 2021 which designated, among various States, the United States of America and which claims priority to U.S. Provisional App. No. 63/036,156 filed Jun. 8, 2020, the contents of each of which are hereby incorporated by reference in their entireties and for all purposes.

TECHNICAL FIELD

The present disclosure generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety.

BRIEF DESCRIPTION OF THE DRAWINGS

In the drawings, which are not necessarily drawn to scale, like numerals may describe similar components in different views. Like numerals having different letter suffixes may represent different instances of similar components. The accompanying drawings include.

DETAILED DESCRIPTION

Figure 1:
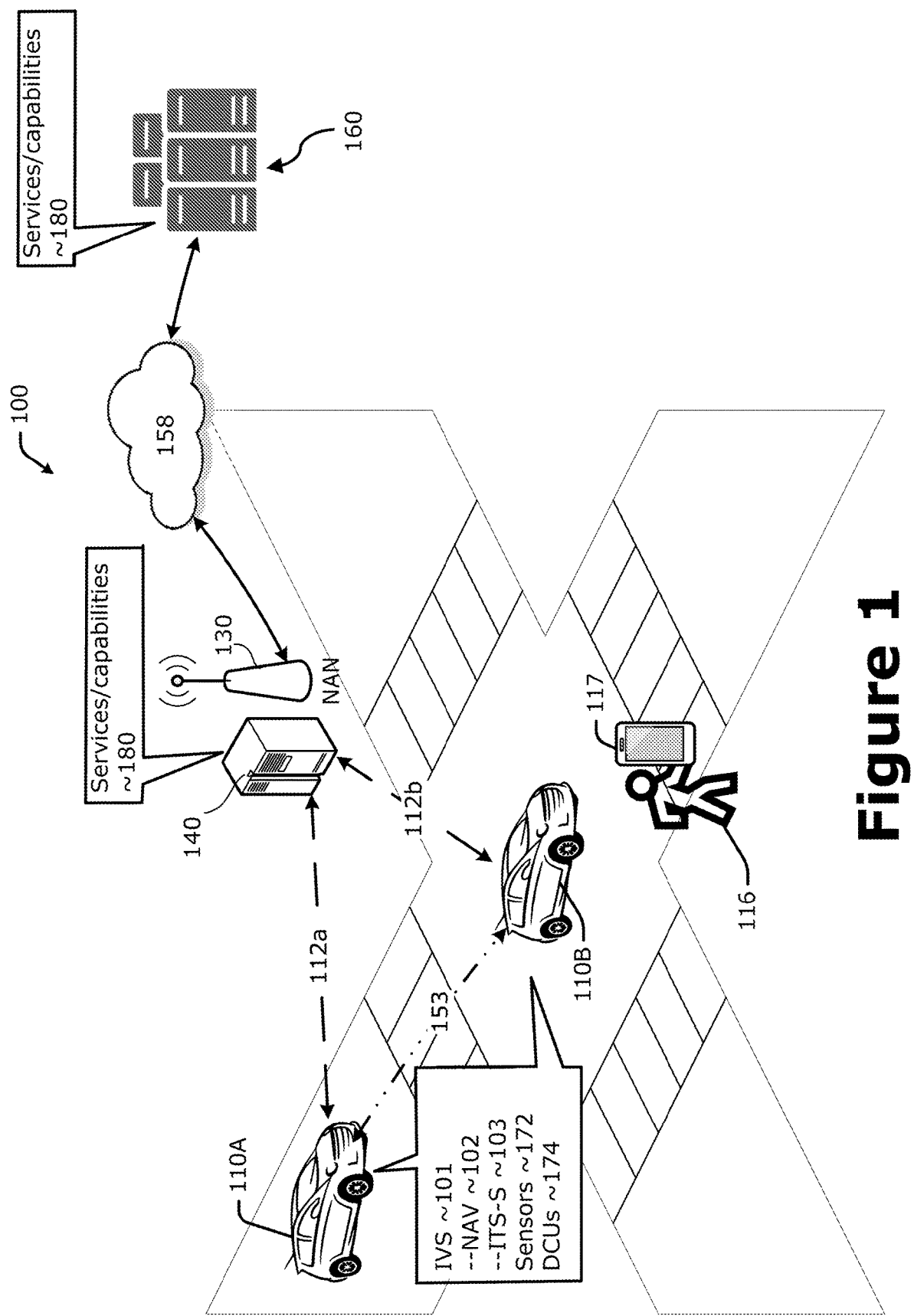
FIG. 1 illustrates an operative arrangement.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, and/or the like. It will be apparent to those skilled in the art having the benefit of the present disclosure that modifications may be made without departing from the scope of the present disclosure. In certain instances, descriptions of well-known devices, circuits, and methods are omitted so as not to obscure the description with unnecessary detail.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X can use co-operative awareness to provide more intelligent services for end-users. This means that entities, such as vehicle stations or vehicle user equipment (vUEs) including such as CA/AD vehicles, roadside infrastructure or roadside units (RSUs) 130, application servers, and pedestrian devices (e.g., smartphones, tablets, and/or the like), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, and/or the like). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

The present document describes enhancements to the Collective Perception Service (CPS) to support applications in the domain of road and traffic safety. Collective Perception (CP) aims at sharing information about the current driving environment between ITS-Ss in the ITS. For this purpose, the CPS provides information about an ITS sub-systems's environment, which may include road safety relevant objects (e.g., other road participants, obstacles, and the like) detected by local perception sensors and/or free space information. CP reduces the uncertainty of an ITS sub-system about its current environment, as other ITS-Ss contribute context information (e.g., information about their perceived environments). This includes enhancements and/or updates to the syntax and semantics of Collective Perception Messages (CPM) and details of the data and message handling to increase the awareness of the environment in a more cooperative manner.

1. Intelligent Transport System (ITS) Arrangements

FIG. 1 illustrates an overview of an environment 100, which includes vehicles 110A and 110B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, and/or the like. The terms "motor", "motorized", and/or the like. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, and/or the like.

For illustrative purposes, the following description is provided for deployment scenarios including vehicles 110 in a 2D freeway/highway/roadway environment wherein the vehicles 110 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 110 are implemented as flying objects, such as aircraft, drones, UAVs, and/or to any other like motorized devices.

For illustrative purposes, the following description is provided where the vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the functionality discussed herein. Vehicles 110 including a computing system (e.g., IVS 101) as well as the vehicles referenced throughout the present disclosure, may be referred to as vehicle user equipment (vUE) 110, vehicle stations 110, vehicle ITS stations (V-ITS-S) 110, computer assisted (CA)/autonomous driving (AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture of FIG. 6-9. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

Figure 9:
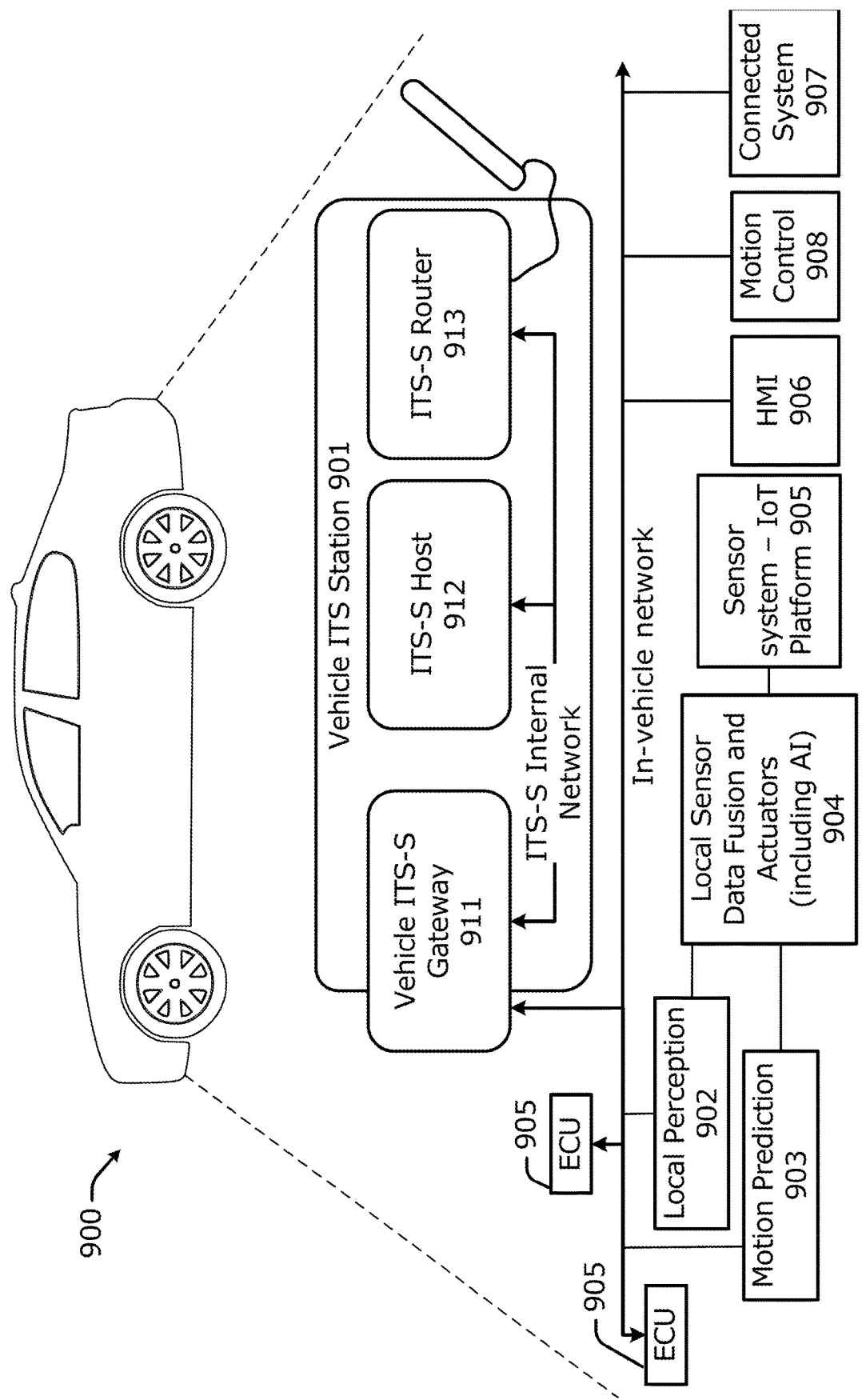
FIG. 9 depicts ae vehicle ITS station (V-ITS-S) in a vehicle system.

The IVS 101 includes the ITS-S 103, which may be the same or similar to the ITS-S 901 of FIG. 9. The IVS 101 may be, or may include, Upgradeable Vehicular Compute Systems (UVCS) such as those discussed infra. As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 101 and CA/AD vehicle 110 otherwise may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other elements of the underlying UVCS technology used to implement IVS 101 will be further described with references to remaining FIGS. 6-11.

In addition to the functionality discussed herein, the ITS-S 901 (or the underlying V2X RAT circuitry on which the ITS-S 901 operates) is capable of measuring various signals or determining/identifying various signal/channel characteristics. Signal measurement may be performed for cell selection, handover, network attachment, testing, and/or other purposes. The measurements/characteristics collected by the ITS-S 901 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, and/or the like. DCUs 174 are embedded systems or other like computer devices that control a corresponding system of a vehicle 110. The DCUs 174 may each have the same or similar components as devices/systems of FIG. 15 discussed infra, or may be some other suitable microcontroller or other like processor device, memory device(s), communications interfaces, and the like. Individual DCUs 174 are capable of communicating with one or more sensors 172 and actuators (e.g., actuators 1574 of FIG. 15). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 1572 of FIG. 15. In particular, the IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, and/or the like). Other technologies could be used, such as Bluetooth/Bluetooth Low Energy (BLE) or the like. The vehicles 110 may exchange ITS protocol data units (PDUs) or other messages (e.g., VAMs, CPMs, and/or the like) with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S(R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU 116/V-ITS-S 110.

Environment 100 also includes VRU 116, which includes a VRU ITS-S 117. The VRU 116 is a non-motorized road users as well as L class of vehicles (e.g., mopeds, motorcycles, Segways, and/or the like), as defined in Annex I of EU regulation 168/2013 (see e.g., International Organization for Standardization (ISO) "Road vehicles—Vehicle dynamics and road-holding ability—Vocabulary", ISO, TC 22, SC 33, Ed. 2 (2011-12) ("[ISO-8855:2011]")). SAE International, "Taxonomy and Classification of Powered Micromobility Vehicles", Powered Micromobility Vehicles Committee, SAE Ground Vehicle Standard J3194 (20 Nov. 2019) ("[SAE-J3194]") also proposes a taxonomy and classification of powered micro-mobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. The VRU ITS-S 117 could be either pedestrian-type VRU (see e.g., P-ITS-S 1001 of FIG. 10) or vehicle-type (on bicycle, motorbike) VRU. The term "VRU ITS-S" as used herein refers to any type of VRU device or VRU system. Before the potential VRU 116 can even be identified as a VRU 116, it may be referred to as a non-VRU and considered to be in IDLE state or inactive state in the ITS.

If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle). In ETSI TS 103 300-2 V2.1.1 (2020-05) ("[TS103300-2]"), the different types of VRUs 116 have been categorized into various profiles that further define the VRU functional system and communications architectures for VRU ITS-S 117. For robustly supporting the VRU profile awareness enablement, VRU related functional system requirements, protocol and message exchange mechanisms (e.g., CPMs, VAMs, and/or the like) are provided herein.

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, and/or the like) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present disclosure are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09) ("[EN302665]"), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including non-equipped VRUs (e.g., a VRU 116 not having a device); VRU-Tx (e.g., a VRU 116 equipped with an ITS-S 117 having only a transmission (Tx) but no reception (Rx) capabilities that broadcasts awareness messages or beacons about the VRU 116); VRU-Rx (e.g., a VRU 116 equipped with an ITS-S 117 having only an Rx (but no Tx) capabilities that receives broadcasted awareness messages or beacons about the other VRUs 116 or other non-VRU ITS-Ss); and VRU-St (e.g., a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 110 and/or R-ITS-S 130 with a VRU application. Examples of the various VRU system configurations are shown by table 2 of ETSI TR 103 300-1 v2.1.1 (2019-09) ("[TR103300-1]").

The message specified for VRUs 116/117 is the VRU awareness message (VAM). VAMs are messages transmitted from VRU ITSs 117 to create and maintain awareness of VRUs 116 participating in the VRU/ITS system. VAMs are harmonized in the largest extent with the existing Cooperative Awareness Messages (CAM) defined in [EN302637-2]. The transmission of the VAM is limited to the VRU profiles specified in clause 6.1 of [TS103300-2]. The VAMs contain all required data depending on the VRU profile and the actual environmental conditions. A VAM contains status and attribute information of the originating VRU ITS-S 117. The content may vary depending on the profile of the VRU ITS-S 117. A typical status information includes time, position, motion state, cluster status, and others. Typical attribute information includes data about the VRU profile, type, dimensions, and others. The generation, transmission and reception of VAMs are managed by the VRU basic service (VBS), which is a facilities layer entity that operates the VAM protocol. The VBS provides the following services: handling the VRU role, sending and receiving of VAMs to enhance VRU safety. The VBS also specifies and/or manages VRU clustering in presence of high VRU 116/117 density to reduce VAM communication overhead. In VRU clustering, closely located VRUs with coherent speed and heading form a facility layer VRU cluster and only cluster head VRU 116/117 transmits the VAM. Other VRUs 116/117 in the cluster skip VAM transmission. Active VRUs 116/117 (e.g., VRUs 116/117 not in a VRU cluster) send individual VAMs (called single VRU VAM or the like). An "individual VAM" is a VAM including information about an individual VRU 116/117. A VAM without a qualification can be a cluster VAM or an individual VAM. Other details regarding VRUs and VAMs are discussed in ETSI TS 103 300-3 V0.1.11 (2020-05) ("[TS103300-3]")

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112a and the WLAN V2X RAT may utilize an air interface 112b. The access layer for the ITS-G5 interface is outlined in ETSI EN 302 663 V1.3.1 (2020-01) (hereinafter "[EN302663]") and describes the access layer of the ITS-S reference architecture (see e.g., FIG. 6). The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). The NAN 130 or an edge compute node 140 may provide one or more services/capabilities 180.

In V2X scenarios, a V-ITS-Ss 110 or a NAN 130 may be or act as a RSU or R-ITS-S 130, which refers to any transportation infrastructure entity used for V2X communications. In this example, the RSU 130 may be a stationary RSU, such as an gNB/eNB-type RSU or other like infrastructure, or relatively stationary UE. Additionally or alternatively, the RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110a may be equipped with a first V2X RAT communication system (e.g., C-V2X) whereas V-ITS-S 110b may be equipped with a second V2X RAT communication system (e.g., W-V2X which may be DSRC, ITS-G5, or the like). Additionally or alternatively, the V-ITS-S 110a and/or V-ITS-S 110b may each be employed with one or more V2X RAT communication systems. The RSU 130 may provide V2X RAT translation services among one or more services/capabilities 180 so that individual V-ITS-Ss 110 may communicate with one another even when the V-ITS-Ss 110 implement different V2X RATs, the RSU 130 (or edge compute node 140) may provide VRU services among the one or more services/capabilities 180 wherein the RSU 130 shares CPMs, MCMs, VAMs, DENMs, CAMs, and/or the like, with V-ITS-Ss 110 and/or VRUs for VRU safety purposes including RSS purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. Additionally or alternatively, the NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, and/or the like.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN) node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like).

Additionally or alternatively, CPMs are exchanged in the ITS network 100 between ITS-Ss 110, 130, 116/117, and/or the like, to share information about the perceived environment of an ITS sub-system such as the presence of road users and other objects that have been detected and recognized by ITS sub-systems. These detected road users or objects are potentially not equipped with an ITS-S themselves. Such non-ITS-S equipped objects cannot make other ITS-Ss aware of their existence and current state and can therefore not contribute to the cooperative awareness. A CPM contains status and attribute information of these non-ITS-S equipped users and objects that have been detected by the originating ITS sub-system. The content of a CPM is not limited to non-ITS-S equipped objects but may also include measured status information about ITS-S equipped road users. The content may vary depending on the type of the road user or object and the detection capabilities of the originating ITS sub-system. For vehicular objects, the status information is expected to include at least the actual time, position and motion state. Additional attributes such as the dimensions, vehicle type and role in the road traffic may be provided.

The CPM complements the Cooperative Awareness Message (CAM) to establish and increase cooperative awareness. The CPM contains externally observable information about detected road users or objects and/or free space. The CP service may include methods to reduce duplication of CPMs sent by different ITS-Ss by checking for sent CPMs of other stations. On reception of a CPM, the receiving ITS-S becomes aware of the presence, type, and status of the recognized road user or object that was detected by the transmitting (Tx) ITS-S. The received information can be used by the receiving ITS-S to support ITS applications to increase the safety situation and to improve traffic efficiency or travel time. For example, by comparing the status of the detected road user or received object information, the receiving ITS-S sub-system is able to estimate the collision risk with such a road user or object and may inform the user via the HMI of the receiving ITS sub-system or take corrective actions automatically. Multiple ITS applications may thereby rely on the data provided by CP service. It is assigned to domain application support facilities in [TS102894-1]. Furthermore, [TR103562] provides an analysis of the CPS with further information and simulation results.

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/ or the like. Further, the techniques disclosed herein may relate to other IoT edge network systems and configurations, and other intermediate processing entities and architectures may also be used to practice the techniques herein.

2. Collective Perception Service Enhancements

The CPS supports ITS applications in the domain of road and traffic safety by facilitating information sharing among ITS-Ss. CP reduces the ambient uncertainty of an ITS-S about its current environment, as other ITS-Ss contribute to context information. By reducing ambient uncertainty, it improves efficiency and safety of the ITS. Current CPS provides syntax and semantics of the CPM and specification of the data and message handling to increase the awareness of the environment in a cooperative manner.

According to current CPS specifications, each perceived object (e.g., road user) is reported as a separate object, which can be very inefficient in certain scenarios such as with the presence of large number of objects or overlapping view of objects or occlusion of objects in the field of view (FOV) of sensors at the ITS-S. For example, reporting each individual perceived objects in case of large perceived object creates huge communication over. In case of overlapped view of objects or occlusion of objects in the FOV of sensors, perception of all objects itself is challenging task. In such situations, a layered costmap or an occupancy grid based CP may be bandwidth and computationally efficient. CPS based on Layered Cost Map Sharing is discussed in International App. No. PCT/US2020/038723 filed on Jun. 19, 2020 ("['723]"), the contents of which is hereby incorporated by reference in its entirety. In ['723], sharing of layered costmaps is used to achieve bandwidth and computationally efficient in crowded scenarios with large number of obstacles and/or other objects. The layered cost map (LCM) container may replace or complement the perceived object container and/or the free space addendum container, thereby saving significant communication overhead.

Recently, in ETSI ITS WG1, there was discussion about how efficient Layered Cost Map based CPM can be in terms of message size compared to that CPM based on perceived object containers and Free Space Addendum containers. As message size is crucial for transmission over the air interface, the present disclosure provides size optimized Layered Cost Map Container to reduce message size and/or reduce signaling overhead.

Vulnerable road users (VRUs) 116 are special class of perceived objects which require special safety treatment for safe and secure ITS (see e.g., [TS103300-2]. Details of various classes of VRU and VRU clusters (group of proximity VRUs with similar heading and speed) can be found in ['723].

There are ongoing works in ETSI to enable CPS) for intelligent transportation Systems. It provides basic functionalities to share sensing capabilities and perceived objects among proximity vehicles (see e.g., [TS103324]). Current work provides broadcast based CPMs sharing which can be expensive in terms of network overhead and can be further optimized for CP especially for the scenarios such as presence of large number of objects or overlapping view of objects or occlusion of objects in the FOV of sensors at the ITS-S.

In the existing CPS specifications, each of perceived objects is reported as an individual object which can be very inefficient for the scenarios such as presence of large number of objects or overlapping view of objects or occlusion of objects in the FOV of sensors at the ITS-S due to several reasons discussed previously. For example, reporting each individual perceived objects in case of large perceived object creates huge communication over and also take longer time to report all perceived objects as each CPM message can include limited number of perceived object due to CPM size constraint. In case of overlapped view of objects or occlusion of objects in the FOV of sensors, perception of all objects itself is challenging task. Existing CPS still lacks way to report perceived environment in a more efficient way in terms of communication overhead.

As discussed in more detail infra, VRUs 116 and VRU clusters are reported as a separate cost map layer referred to as a "VRU Layer". Data elements (DEs) and/or data fields (DFs) in the LCM container enable reporting VRU and VRU cluster as a separate cost map layer. Since VRUs 116 can have higher priority for safety compared to other perceived objects, the LCM container allows for frequent sharing of the VRU layer compared to the aggregated perceived obstacles layer.

An originating ITS-S shares cost values with confidence levels for each grid cell for each layer in a reported grid-area based on the presence of obstacle/object in the cell. An ITS-S may not be able to determine cost value of some grid cells, such as due to obstructed FoV for these cells, with sufficient confidence level. In such a case, assistance is requested from neighboring ITS-Ss to get cost values of these cells and to increase confidence level.

The present disclosure also includes further enhancements to the LCM container to enable requesting such collaboration request in effective and flexible way. Procedures for indicating and resolving discrepancy in grid cell cost values among neighbors (e.g., when one or more received values differ with node's own cost value) are also discussed herein. The present disclosure also provides DEs/DFs to enable such discrepancy handling efficiently. The present disclosure also includes: Size optimized Layered Cost Map Container options to share environment perception effectively—message size of the container can be optimized based on situation such as how many cost map layers need to be transmitted, access layer congestion, and/or the like; a new Cost Map layer and required DEs/DFs in the Layered Cost Map Container to enable reporting VRUs and VRU clusters as a separate cost map layer; capability (e.g., new DEs/DFs) for Layered Cost Map Container to enable collaboration request in effective and flexible way to ask Cost Values for selected Grid cells (when ego ITS-S could not determine cost values of these Grid cells (such as due to obstructed FoV for these cells) with sufficient confidence level; and enhanced capability (e.g., new DEs/DFs) for Layered Cost Map Container to enable resolving discrepancy in grid cell cost values among neighbors for selected Grid cells in effective and flexible way.

The existing CPS is extended to enable Layered Cost Map Sharing. This may be beneficial for scenarios involving the presence of a large number of objects, overlapping view of objects, and/or occlusion of objects in the FOV of sensors at the ITS-S. The LCM container is included in CPMs that are exchanged among various V-ITS-S 110, R-ITS-Ss 130, and/or VRU ITS-Ss 117. Various standards such as ETSI and/or 3GPP may adopt and specify various aspects of these messages and message exchange mechanisms. In these ways, CP among proximity (proximate) ITS-Ss is made more safe for a more coordinated driving environment, and signaling efficiencies are improved.

In some implementations, these safety/efficiency services could be implemented in the Multi-access Edge Computing (MEC) network/framework and readily scalable across a city or geographical area. In these implementations, one or more MEC apps may provide the CPS. In various implementations, Open Visual Inference and Neural network Optimization (OpenVINO), OpenNESS, and/or other edge computing frameworks (e.g., Intel® Smart Edge, and/or the like) may be used to provide the CPS. In some implementations, R-ITS-Ss 130 collects semantic information of an environment using sensors, fuses them together, and generates ITS messages for ITS-Ss in the environment. This architecture could be readily implemented using the aforementioned edge computing platforms and machine learning frameworks.

2.1. Collective Perception Message (CPM) Containers

Figure 2:
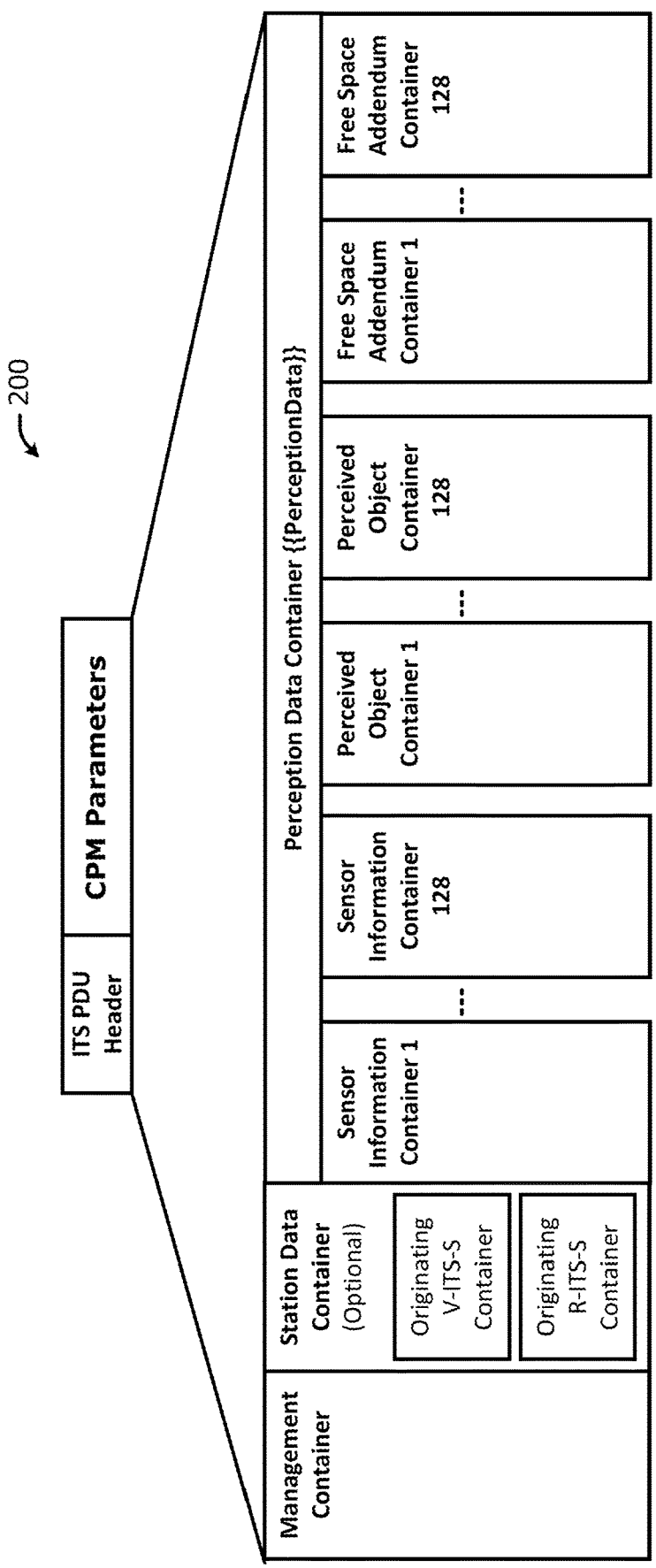
FIGS. 2 and 3 illustrate Collective Perception Message (CPM) structures.
Figure 3:
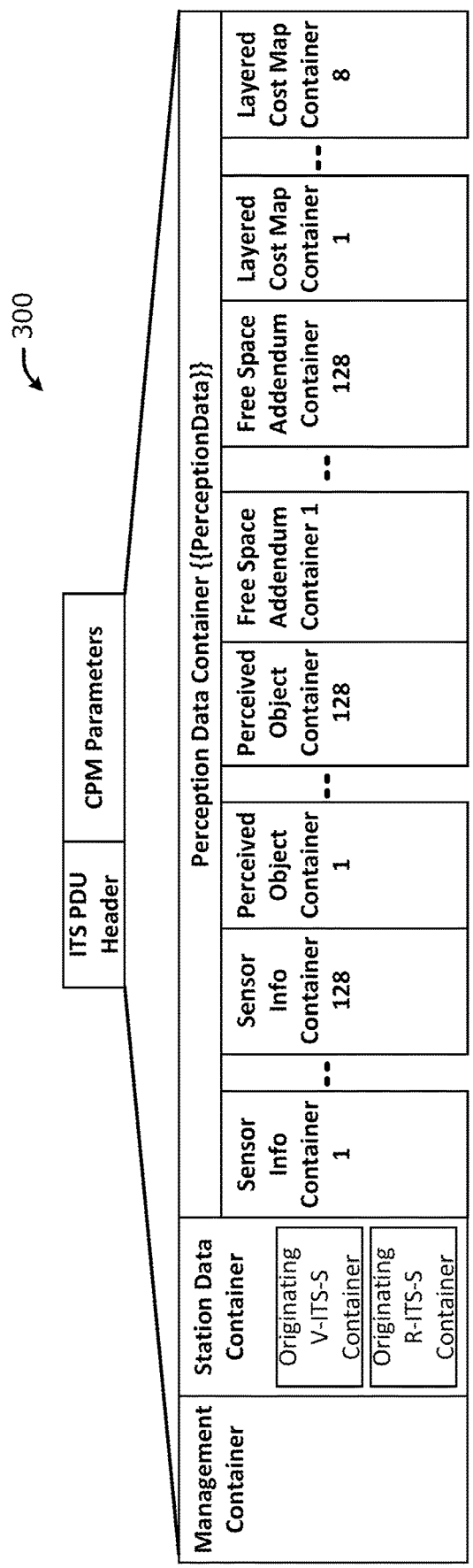

FIGS. 2 and 3 illustrate the structure of a CPM 200 and 300, respectively, which enable ITS-Ss to share sensor information, perceived object lists, free space addenda, and layered costmaps. A CPM 200, 300 comprises a common ITS PDU header and multiple containers, which together constitute a CPM 200, 300. Each container comprises a sequence of optional or mandatory data elements (DEs) and/or data frames (DFs). The DEs and DFs included in the CPM format are based on the ETSI Common Data Dictionary (CDD) (see e.g., ETSI TS 102 894-2 V1.3.1 (2018-08) ("[TS102894-2]")) and/or makes use of certain elements defined in "Intelligent transport systems Cooperative ITS Using V2I and I2V communications for applications related to signalized intersections", International Organization for Standardization (ISO) Technical Committee (TC) 204, Ed. 2 (2019-06) ("[ISO/TS19091]").

The CPM 200, 300 can be disseminated either by a moving ITS-S, such as a V-ITS-S 110, or by a stationary ITS-S, such as an R-ITS-S 130. Support for other types of ITS-Ss can be added later using the ASN.1 extensibility feature.

2.1.1. ITS PDU Header

CPMs 200, 300 include an ITS PDU header. The ITS PDU header is a common header that includes the information of the protocol version, the message type, and the ITS-S identifier (ID) of the originating ITS-S. The ITS PDU header is included as specified in [TS102894-2]. Detailed data presentation rules of the ITS PDU header in the context of a CPM 200, 300 is as specified in Annex A of [TS103324].

2.1.2. CPM Management Container

Regardless of which type of ITS-S disseminates a CPM 200, 300, the (CPM) Management Container provides information regarding the ITS-S Type and the Reference Position of the ITS-S. The management container provides basic information about the originating ITS-S, regardless of whether it is a V-ITS-S 110 or R-ITS-S 130. This container includes the ITS-S type, reference position and optional information about the current message segment as part of the messageSegmentInfo. Message segmentation is managed according to clause 6.1.4 of [TS103324]. The reference position is used for referencing objects relative to a provided global position. The reference point to be provided is detailed in [EN302890-2]. For V-ITS-Ss 110, the reference point refers to the ground position of the centre of the front side of the bounding box of the V-ITS-Ss 110. For R-ITS-Ss 130, the reference point refers to an arbitrary position on a road segment or intersection. This point is used to determine the offset to other data points.

2.1.3. Station Data Container

To allow for simplified future extensibility of the CPM 200, 300, ASN.1 Information Object Classes are employed for the Station Data and Perception Data Container.

In case a CPM 200, 300 is generated by a V-ITS-S 110, the Station Data Container of Type CpmStationDataContainer containing the information object OriginatingVehicleITSSContainer is present and contains dynamic information of the originating ITS-S.

The Originating Vehicle ITS-S Container comprises information about the dynamics of the vehicle ITS sub-system disseminating the CPM 200, 300. It is included in every CPM 200, 300 transmitted by a V-ITS-S 110. Such information is required to transform objects described in the Perceived Object Container of the same CPM 200, 300 into a target reference frame, such as a vehicle centred coordinate system.

The Originating Vehicle ITS-S Container is encoded as specified in Annex A of [TS103324]. More specifically, the following rules apply:

The Vehicle Orientation Angle provides means to transmit the actual orientation of the vehicle opposed to the vehicle heading which references the orientation of the provided velocity vector magnitude only. The container also provides means to include a description for trailers attached to a towing vehicle (e.g., for trucks). Different layouts for attached trailers are possible. Providing the TrailerData is required to transform objects detected by a sensor mounted to a trailer into a receiving ITS-S's reference frame. Every trailer added to the description of a vehicle consists of a TrailerData container which can be added up to two times. Each TrailerData provides a new reference point ID, incrementing from 1. The reference point ID 0 always refers to the reference point of the towing vehicle. An offset to a hitch point in the longitudinal direction according to [ISO-8855: 2011] from the towing vehicle's reference point is provided. The trailer's dimensions are provided by defining the trailer's front and rear overhang with respect to the trailer's hitch point, as depicted. The width of the trailer may be provided optionally. The hitch angle is also optionally available. More configurations for providing reference points for ITS-S can be found in [EN302890-2].

In case a CPM 200, 300 is generated by an R-ITS-S 130, the Originating Roadside ITS-S Container of Type CpmStationDataContainer containing the information object OriginatingRoadsideITSSContainer may be present. If present, it provides references to identification numbers provided by the MAP Message (see e.g., [ISO/TS19091]) disseminated be the same R-ITS-S 130. The Originating Roadside ITS-S Container includes two parameters to reference information received by the MAP message (see e.g., [ISO/TS19091]) disseminated by the same roadside ITS-S. Either, the InterSectionReferenceID or the RoadSegmentID can be used to refer to the road infrastructure provided by the road lane topology service. In case the OriginatingRoadsideITSSContainer is included, the R-ITS-S 130 also transmits a MAP message. In case of R-ITS-S 130 disseminating the CPM 200, 300, the reference position refers to the reference position as defined in [ISO/TS19091] (e.g., an arbitrary point on the intersection).

2.1.4. Sensor Information Container

The Sensor Information Container (or "Sensor Info Container) of type CpmPerceptionDataContainer containing the information object SensorInformationContainer may be present to provide information about the sensory capabilities that are available to an ITS sub-system. Depending on the ITS-S type of the originating ITS-S, different container specifications are available to encode the properties of a sensor. The Sensor Information Containers are attached at a lower frequency than the other containers, as discussed infra and/or as defined in Clause 6.1.3.3 of [TS103324].

The sensor information container lists information about individual sensor(s) of which the data is made available to the disseminating ITS-S and results in the generation of Perceived Object, Layered Cost Map, and/or Free Space Containers. The Sensor Information Container is of type CpmPerceptionDataContainer containing the information object sensorInformationCpmContainer.

The Sensor Information Container is encoded as specified in Annex A of [TS103324]. More specifically, the following rules apply:

This container type offers the possibility to provide descriptive information about the sensory properties that are available to a disseminating ITS-S. Every described sensor is assigned an id which is in turn utilized in the Perceived Object Container to relate measured object information to a particular sensor. Additionally, each provided sensor information DF is accompanied by a sensor categorization to indicate the type of the perception system. This can be a specific sensor type such as a radar or lidar sensor up to a system providing fused object information from multiple sensors. As different sensor types may be attached to an ITS-S (e.g., radar, LIDAR, combined sensor fusion system, and the like), this container provides different possibilities for describing the properties of a sensor-system.

Two types of descriptions are differentiated: sensors that are mounted on vehicles, are described using the vehicleSensor description DF. Sensors that are stationary (e.g., because they are mounted on a roadside infrastructure) are described using a stationarySensor variant DF. The vehicleSensor description DF also indicates the assignment of sensors to stations. The perception area of a perception system can be inferred on the receiving ITS-S by the data provided in the SensorInformationContainer.

Either variant is used to describe the sensory capabilities of the disseminating ITS-S. This can be the actual parameters of a perception-system (e.g., its actual perception range) or the applicable perception area of the perception system (e.g., the area in which objects will be detected by the perception system).

A vehicleSensor type description provides information about sensors mounted to vehicles. The properties of these perception systems are defined by providing the mounting position of a sensor with respect to a specific reference point on the vehicle. The range and horizontal as well as optional vertical opening angles are provided to describe the sensor's frustum. In case a sensor has multiple detection areas, up to ten perception areas for a sensor can be encoded. The provided offset from a reference point on the vehicle serves as the origin of a sensor-specific local Cartesian coordinate system.

In case of a perception system mounted to a roadside infrastructure, the stationarySensorRadial DF provides a similar concept to describe the roadside system's perception capabilities. The position provided by the offset from a reference point serves as the origin of a sensor-specific local Cartesian coordinate system. Being provided with the sensor position and the opening angles, the receivers of the CPM 200, 300 can determine the sensor measurement area by projecting the area defined by the opening angles on the ground.

For stationary sensors, alternative DFs for describing the perception system's perceived area are provided in case the origin of a sensor system should or cannot be revealed. This is particularly useful if the perception area is generated by combining several separate systems which however act as one sensor. A geographical representation of a system's perception area can be expressed in terms of a circular, rectangular, ellipsoidal or a polygon area. Due to their geographical reference of the reference point, these types are applicable to stationary sensors only.

A FreeSpaceConfidence DE may be used to provide information that a particular sensor is able to provide confirmed measurements about detected free space. The indication states an isotropic confidence level that is assumed for the entire detection area. FreeSpaceConfidence is used to indicate the corresponding confidence value(s) (e.g., Object and Free Space Confidences).

In combination with received objects, a receiver may employ the free space confidence indication to compute the resulting free space by applying a ray-tracing algorithm and/or the like. The depicted perception area may be assumed to be free with an isotropic.

FreeSpaceConfidence, generated by the DetectionArea DF. Not all objects known to a transmitter will be reported in every CPM 200, 300. The receiver therefore has to ensure that suitable tracking and prediction mechanisms for previously transmitted objects are employed to update the shadowed area accordingly.

The received geometric extension of a PerceivedObject may be used to compute the resulting shadowed area for each object. For this purpose, a simple ray-tracing approach may be utilized. A ray thereby connects from the origin of a particular sensor to the outermost corner-points of the received object geometry and extends to the perception range of a particular sensor. The area behind the object from the perspective of the sensor mounting point is considered to be "shadowed." No indication about the free space confidence can be given behind a shadowing object. A description in three dimensions may be applied. In case an object is detected by a sensor with a certain height above ground (e.g., a signage gantry), the same ray-tracing approach is employed for a three-dimensional representation.

In case the shadowing model does not apply, the shadowingApplies DE of the SensorInformation is set to False to indicate that no shadowing model can be computed on the receiving side for this sensor. In some implementations, a flag may be added to simplify the description of free spaces for sensors where no shadowing should be computed (e.g., fusion of multiple sensors)

If LayeredCostMapContainer is included in the CPM 200, 300, a receiver may employ the free space confidence indication provided in Cost map grid values to compute the resulting free space. A transmitter (e.g., a disseminating ITS-S) will not report Layered Cost Map for same rectangular grids in every CPM 200, 300. The receiver therefore has to ensure that suitable tracking and prediction mechanisms for previously transmitted layered cost maps are employed to update the computed free area accordingly.

2.1.5. Perceived Object Container

A perceived object container of type CpmPerceptionDataContainer containing the information object PerceivedObjectContainer may be present for objects that have been perceived by an ITS sub-system. It provides information about the detected object with respect to the disseminating ITS-S. Classifications and positions matched to road data can also be provided. This container is only added for objects that have been detected according to the inclusion rules defined in clause 6.1.3.2 of [TS103324].

A perceived object container is added to the CPM 200, 300 for each detected object as defined in clause 6.1.3.2 of [TS103324]. The perceived object container is of type CpmPerceptionDataContainer containing the information object PerceivedObjectContainer.

The total number of perceived objects is provided in the variable numberOfPerceivedObjects in the PerceivedObjectContainer. Due to the message generation rule as specified in clause 6.1.3 of [TS103324] and the associated object inclusion scheme, the number of included objects does not have to equal the numberOfPerceivedObjects of the received CPM 200, 300.

A receiving ITS-S does not assume that the received PerceivedObjects in the perceived object container represents all objects known to the transmitter. A receiver has to listen for further CPMs 200, 300 from the same transmitter for at least one second until all objects have been received. The container enables a detailed description of the dynamic state and properties of a detected object. The information regarding the location and dynamic state of the perceived object is provided in a coordinate system as specified by [ISO-8855:2011]. The coordinate system is used for the description of the object's state variables in case of a vehicle sharing information about a detected object.

In case of R-ITS-S 130 disseminating the CPM 200, 300, the reference position refers to the reference position as defined in [ISO/TS19091]. In one example, the reference position is an arbitrary point in/on an intersection.

Every object is described by at least providing the distance and speed in the x/y plane of the respective coordinate system with respect to an ITS-S's reference point. The reference point of a measurement is also provided as part of the message (e.g., CPM 200, 300).

The Perceived Object Container is encoded as specified in Annex A of [TS103324]. More specifically, the following rules apply:

An objectID is assigned to each detected object. This ID is taken from a range of monotonously increasing numbers and is maintained per object, as long as an object is perceived and new sensor measurements are assigned to the object. The range of allowed objectIDs is between 0 and 255. As soon as objectID 255 has been assigned to an object, the next object is assigned the next free ID, starting from ID 0 in a round-robin fashion.

A time of measurement (ToM) is provided for each object as the time difference for the provided measurement information with respect to the generation delta time stated in the management container. An interpretation for the ToM which is relative to the GenerationDeltaTime encoded in the message and the time which corresponds to when the state space information about a detected object is made available. The GenerationDeltaTime always corresponds to the latest point in time when the latest reference position is available on the Tx side. Upon receiving the message, the receiver computes its own local GenerationDeltaTime based on its current absolute timestamp. The difference between the encoded GenerationDeltaTime in the received CPM 200, 300 and the local GenerationDeltaTime represents the age of the CPM 200, 300. The received encoded ToM is then added to the age of the CPM 200, 300 to compute the age of the encoded object. Positive ToMs thereby indicate that the ToM needs to be added to the message age on the receiver side, as the state space of the object has been created before the transmitter's GenerationDeltaTime and is therefore older. Negative time values indicate that the ToM needs to be subtracted from the age of the CPM 200, 300 as the state space of the described object has been determined after the transmitter's GenerationDeltaTime has been created. The ToM includes any processing time of a sensor or data fusion system. In case the fused object state information is transmitted, the ToM references the point in time to which the state space has been predicted.

2.1.6. Free Space Addendum Container

The Free Space Addendum Container of type CpmPerceptionDataContainer containing the information object FreeSpaceAddendumContainer may be present to describe changes to a computed free space description.

The Free Space Addendum Container may be attached to express different confidence levels for certain areas within the DetectionArea of a particular sensor. The Free Space Addendum Container is of type CpmPerceptionDataContainer containing the information object FreeSpaceAddendumContainer.

The Free Space Addendum Container in the context of a CPM 200, 300 is encoded as specified in Annex A of [TS103324]. More specifically, the following rules apply: This container is only added if the confidence indication needs to be altered with respect to the isotropic confidence level indication provided in the SensorInformationContainer. If a free space area falls inside a reported cost map grid area specified in the LayeredCostMapContainer, it is up to ITS-S implementation to include or not to include a FreeSpaceAddendum DF to the FreeSpaceAddendumContainer for this free space area. As such, the Free Space Addendum Container may be interpreted even if a received CPM 200, 300 does not contain the SensorInformationContainer. This can be the case when a sensor cannot utilize its entire DetectionArea to reliably provide a free space indication, or in case the shadowing model detailed in clause 7.5 of [TS103324] does not apply for a particular object (e.g., in case of a radar sensor measuring two vehicles driving behind each other).

There are two possible applications of the free space addendum container: The isotropic free space confidence provided in the SensorInformationContainer of level $l_1$ does not apply to the entire DetectionArea of the sensor. Instead, part of the computed shadowed area behind one of the object has a different free space confidence of level $l_2$ (e.g., as a result of sensor fusion processes). This area is described by providing a FreeSpaceArea DF as part of the FreeSpaceAddendum container. Additionally, the sensor system is only able to provide a free space confidence indication for a confined area within its DetectionArea. A different confidence level $l_3$ applies to the depicted grey area, expressed as an additional FreeSpaceAddendum container.

The shadowingApplies DE of the FreeSpaceAddendum container is used to indicate if the simple tracing approach to compute the shadowed area behind objects also applies for the areas described in the FreeSpaceAddendum container.

In case of a transmitter also providing its own dimensions, the area occupied by the Tx ITS-S is also considered to be occupied.

Information about the geometric dimensions of a Tx ITS-S may be provided in the CPM 200, 300 or additional transmitted messages such as the CAM.

The order given by the freeSpaceID of provided FreeSpaceAddendum containers for each sensor in one or several messages is thereby overwriting the confidence level indication of an overlapping FreeSpaceAddendum container of the same sensor in an ascending fashion. The confidence level indication $l_3$ with freeSpaceID 2 overlaps the confidence levels $l_1$ (from the SensorInformationContainer) and $l_2$ (from the first FreeSpaceAddendum container with freeSpaceID 1), and therefore, represents the dominating confidence level indication within the prescribed area. In some cases, the FreeSpaceAddendum may be added in another CPM 200, 300. In these cases, the overlapping CPMs 200, 300 may be managed by using the same freeSpaceID to give a number to each freeSpace and to describe the overlapping order between the freeSpaces A FreeSpaceAddendumContainer may be located partially outside of the detectionArea. Additionally or alternatively, the simplification of the shape description may be valid for a confidence level higher than 0. By providing a FreeSpaceAddendum container outside of the detectionArea, simpler shapes for the FreeSpaceArea may be leveraged to decrease the message size.

The mandatory freeSpaceConfidence DE of the FreeSpaceAddendum container expresses the free space confidence that applies to the area provided in thefreeSpaceArea DF.

An optional list of sensorIds links to the corresponding sensorInformationContainer and may be provided to indicate which sensor provided the corresponding free space confidence indication.

2.1.7. Layered Cost Map (LCM) Container

As shown by FIG. 3, The CPM 300 includes a Layered Cost Map Container. A Layered Cost Map Container of type CpmPerceptionDataContainer containing the information object LayeredCostMapContainer may be present to share the environment perceived by the ITS-S as a cost-based occupancy grid. It provides information about the perceived environment for a rectangular area around the disseminating ITS-S with respect to the disseminating ITS-S. Layered cost map container may be more efficient in certain situations such as presence of large number of objects or overlapping view of objects or occlusion of objects in the FOV of sensors at the ITS-S. In some implementations, this container is only added for cost map layers that have been selected according to the inclusion rules defined in clause 6.1.3.5 of [TS103324].

A layered cost map container may be added to the CPM 300 to share the environment perceived by the Tx ITS-S as a cost-based occupancy grid with corresponding confidence values. The layered cost map container is of type CpmPerceptionDataContainer containing the information object LayeredCostMapContainer. The layered cost map container is only added for cost map layers that have been selected according to the inclusion rules discussed infra and/or as defined in clause 6.1.3.5 of [TS103324]. The layered cost map container provides information about the perceived overall environment for an area (e.g., a rectangular area) around the disseminating ITS-S with respect to the disseminating ITS-S.

The container considers grid-based representation of the cost map where each cell carries a cost (e.g., indicating safe/caution/lethal to drive through the cell) or occupancy indication that specific types of obstacles/objects/VRUs 116 are present in the cell with a corresponding confidence level. All vehicles 110 may follow a global grid with the same size (or hierarchical grid sizes) of cell representation.

The layered cost map container is encoded as specified in Annex A of [TS103324]. More specifically, the following rules apply:

Each ITS-S prepares a cost map for an area (e.g., a rectangular area) of specified dimensions in its FOV to share with neighbours where the area (e.g., a rectangular area) is further divided into smaller cells (e.g., rectangular cells, where the rectangular area is divided into n cells by m cells where n and m are numbers). This area (e.g., a rectangular area) is described by providing ReportedCostMapGridArea DF as part of the LayeredCostMapContainer. Dimensions of each cell is described by GridCellSizeX and GridCellSizeY-DEs. The center of the reported grid area (e.g., rectangular grid area) is specified with respect to the reference position of the disseminating ITS-S. One or more layers of a cost map can be included in LayeredCostMapContainer. The number of cost map layers included in the LayeredCostMapContainer is specified by NumberOfLayeredCostMap DF. All reported cost map layers are prepared for the same grid area (e.g., rectangular grid area) specified by ReportedCostMapGridArea DF. Information of each reported cost map layer is provided by including one LayeredCostMap DF for each reported cost map layer.

The cost of each cell for each cost map layer is calculated by the disseminating ITS-S based on its local sensors, information shared by neighbours (e.g., perceived objects shared by neighbours through CPM 200, 300) and static map available to the transmitter. The cost of each cell for each cost map layer is specified along with a confidence level. The cost and confidence level for cells can be specified in different formats where formats are specified by PerGridCellCostValueConfigType, PerGridCellConfidenceLevelConfigType DFs for cost and confidence level, respectively. For example, the cost value can be a 1 bit flag or indicator (e.g., Occupied, notOccupied) or several bits specifying a probability of the presence of an object/obstacle in the cell. Similarly, the confidence level can be a 1 bit indicator or flag (e.g., belowAThreshold, aboveOrEqualToAThreshold) or several bits specifying confidence levels (e.g., a range from 0 to oneHundredPercent). Various cost map layers reported in the same LayeredCostMapContainer can have different cost and confidence level formats to optimize the size of the CPM 300.

A Tx ITS-S may maintain cost map layers of different size (usually of bigger size) for its own use compared to the size of cost map layers prepared for sharing with neighbors. Additionally or alternatively, the Tx ITS-S may select larger cost map cell size to reduce size of a LayeredCostMapContainer in case of network congestion. The Tx ITS-S may also select size optimized formats (requiring lower bits per cell) for cost and confidence level for one or more reported cost map layer(s) in case of network congestion. An example LayeredCostMapContainer in ASN.1 format is shown by table 2.1.7-1.

TABLE 2.1.7-1

CPM-LayeredCostMap-Descriptions {
itu-t (0) identified-organization (4) etsi (0) itsDomain (5) wg1 (1) ts (103324)
layeredCostMap (7) version1 (1)
}
DEFINITIONS AUTOMATIC TAGS ::=
BEGIN
IMPORTS
TimeOfMeasurement, WGS84AngleValue, OffsetPoint
FROM CPM-CommonDataTypes-Descriptions {itu-t (0) identified-organization (4) etsi (0)
itsDomain (5) wg1 (1) ts (103324) commonDataTypes (2) version1 (1)};
-- @brief Layered Cost Map Container
-- A list of perceived Layered Cost Maps. Each Cost Map layer shall be described as TABLE 2.1.7-1-continued

```
provided by
-- @see LayeredCostMap.
LayeredCostMapContainer ::= SEQUENCE {
    -- @details numberOfSupportingLayerCostMap
    -- The total number of Cost Map layers calculated by the station at the time of generating
the message to be shared by CPM.
    -- Due to the dynamic message generation rules (due to size constraint of the CPM), this
number does not have to reflect the number
    -- of Cost Map layers included in this message but states the number of LayeredCostMap
available at the sender at
    -- the time of generating the message.
        -- if LayeredCostMapContainer is transmitted, first Cost Map Layer is always
AggregatedCostMapLayer.
        -- Default is 1 (Aggregated layer only). Sometimes sender's AggregatedCostMapLayer may
be same as reported by one or more neighbors. So sender may not need to share it.
        numberOfLayeredCostMap  NumberOfLayeredCostMap DEFAULT 1,
    layeredCostMap SEQUENCE SIZE(1..8, ...) OF LayeredCostMap OPTIONAL,
        reportedCostMapGridArea ReportedCostMapGridArea,
...
}
ReportedCostMapGridArea            ::= SEQUENCE {
    --@details of GridCellSize
    -- ReportedCostMapGridArea is integer multiples of Grid Cell Size.
    -- That is length and width of Reported Cost Map Grid Area are integer multiples of
gridCellSizeX and gridCellSizeY respectively
        gridCellSizeX              GridCellSizeX OPTIONAL,
        gridCellSizeY              GridCellSizeY OPTIONAL,
    -- @details SizeofReportedGridArea
    -- It provides length and width of reported grid area
        sizeofReportedGridArea        SizeofReportedGridArea OPTIONAL,
    -- @details gridAreaCenterPoint
    -- Optional offset point about which the rectangle is centred with respect to the
reference
    -- position of the ITS-S.
        -- gridAreaCenterPoint can be partially pre-defined. For example, originating ITS-S can
be always be made in the middle of Grid Area lengthwise,
        -- so the offset is needed only widthwise.
        gridAreaCenterPoint OffsetPoint,
    -- @details semiMajorRangeOrientation
    -- Orientation of the semiMajorRangeLength of the rectangular Grid Area in the WGS84
coordinate system.
        semiMajorRangeOrientation WGS84AngleValue
        -- @details of Grid cell Counting Reference
        -- It provides start point of cell for counting and direction of counting cells in the
grid. We assume Grid cell Counting Reference is predefined.
        -- Pre-defined start point of cell is bottomLeft cell as cell # 1 in the repoted Cost
Map Grid Area;
        -- and direction of counting is left to right in the direction of vehicle along x-axis
        -- and then move to leftmost cell in next row in y-axis (going from bottom to top
direction)
}
-- @brief number of reported Cost map layers
-- @unit n/a
NumberOfLayeredCostMap ::= INTEGER (1..8)
-- @brief GridCellSizeX
-- The length of an axis of a rectangle, used to describe the extension in a
-- particular direction.
GridCellSizeX ::= INTEGER {
    zeroPointFiveMeter (1),
    oneMeter (2),
    twoMeter (3),
    threeMeter (4),
    fourMeter (5),
    fiveMeter (6)
} (1..8)
-- @brief GridCellSizeY
-- The length of an axis of a rectangle, used to describe the extension in a
-- particular direction.
GridCellSizeY ::= INTEGER {
    zeroPointFiveMeter (1),
    oneMeter (2),
    twoMeter (3),
    threeMeter (4)
} (1..4)
-- @brief number of reported Cost map grid cells in the Reported Cost map Grid Area
-- @unit n/a
SizeofReportedGridArea ::= SEQUENCE {
-- Length and width of Reported Grid Area in terms of number of cells
nGridCellsSizeLength            INTEGER (1..200),
nGridCellsSizeWidth             INTEGER (1..50)
```

TABLE 2.1.7-1-continued

```
}
-- @brief LayeredCostMap
-- Cost Map can be monolithic where there is a single Occupancy Grid with each cell in the
2D Grid has an occupancy probability value (or a cost/penalty).
-- However, an enhanced Cost Map may implement Layered Cost Maps - where Aggregated Layer
Cost Map is similar to Occupancy Grid of Monolithic Cost Map.
-- Instead of storing data directly in the Aggregated layer, the layered costmap maintains
an ordered list of layers, each of which tracks the data related to a specific
functionality.
--The data from each of the layers is then accumulated into the Aggregated costmap.
--For example, Static Map Layer, Obstacles Layer, Inflation Layer (inflation process
inserts a buffer zone around each lethal obstacle),
-- Proxemic Layer (creates areas around detected people more costly), etc.
LayeredCostMap ::= SEQUENCE {
     -- @details costMapLayerType
     -- It provides type of Cost Map layer, @see costMapLayerType
     costMapLayerType           CostMapLayerType,
     -- @details timeOfCostMapUpdate
     -- Provides the time difference from the message's generation delta time to the time of
the
     -- last update of the Cost map Layer.
     timeOfCostMapUpdate          TimeOfMeasurement,
     -- @details of perGridCellCostMapValueConfigType
     -- It provides various options to indicate format of cost map.
     --These formats also vary in size (number of bits) required to specify cost value per
grid cell
     perGridCellCostValueConfigType PerGridCellCostValueConfigType,
     -- @details of perGridCellConfidenceLevelConfigType
     -- It provides various options to select format of cofidence level value.
     --These formats also vary in size (number of bits) required to specify confidence level
per grid cell
     perGridCellConfidenceLevelConfigType PerGridCellConfidenceLevelConfigType OPTIONAL, --
It may not be needed in case of Collaboration Request Layer and Discrepancy Handling Layer
     perGridCellCostMapValueWithConfidenceLevel    SEQUENCE SIZE(1..1024, ...) OF
PerGridCellCostMapValueWithConfidenceLevel,
         ...
}
PerGridCellCostValueConfigType ::= INTEGER (1..4)
PerGridCellConfidenceLevelConfigType ::= INTEGER (1..4)
-- @brief CostMapLayerType
-- It provides type of the Cost Map layer
CostMapLayerType ::= INTEGER {
   aggregatedCostMapLayer            (0), -- overall cost values after merging cost values of all
other layers
     staticCostMapLayer             (1),
     perceivedObstacleCostMapLayer (2),
   inflationCostMapLayer            (3),
   confirmationCostMapLayer          (4), -- informing discrepancy in cost values with neighbors
for some grid cells
     ambiguityCostMapLayer           (5), -- sender request neighbors to help enhancing the cost
of some cells for which the vehicle may not have high confidence level to determine a value
     collectivePerceptionCostMapLayer(6) -- cost values of cells based on perceived objects
or cost values received from neighbors through CPM
   }(0..8)
PerGridCellCostMapValueWithConfidenceLevel ::= SEQUENCE {
     perGridCellCostValue          PerGridCellCostValue,
     perGridCellConfidenceLevel         PerGridCellConfidenceLevel OPTIONAL -- It may not be needed
in case of Collaboration Request Layer and Discrepancy Handling Layer
     }
-- @brief costMapGridValue
-- cost value of each cell normalized to 0-100.
-- it is of one format (indicated by perGridCellCostValueConfigType) among several option
-- @unit n/a
PerGridCellCostValue ::= CHOICE {
     costMapGridValueConfig1         CostMapGridValueConfig1,
     costMapGridValueConfig2         CostMapGridValueConfig2,
     -- @details perGridCellCollaborationRequestIndication
     -- used by Collaboration Request Layer. 1 bit is used per grid cell to indicate
     -- whether a cost map velue for this grid cell is requested or not. A vehicle can
request neighbors
     -- to help enhancing the cost of some cells for which the vehicle may not have high
confidence level to determine a value
     perGridCellCostCollaborationRequestIndication
     PerGridCellCostCollaborationRequestIndication,
     -- @details perGridCellDiscripancyIndication
     -- used by Discrepancy Handling Layer. 1 bit is used per grid cell to indicate
     -- discripancy of received cost value for a grid cell from the ego vehicle's cost value
for the cell.
     -- The 'Discrepancy Handling Layer' is to indicate discrepancy among cost values of
neighbors.
```

TABLE 2.1.7-1-continued

```
    perGridCellCostDiscripancyIndication    PerGridCellCostDiscripancyIndication
}
CostMapGridValueConfig1 ::= INTEGER {
    unknown (0), -- cost is unknown
    onePercent (1),
    oneHundredPercent (100),
    unavailable (101) -- cost could not be computed and does not apply
}(0..101)
CostMapGridValueConfig2 ::= INTEGER {
    unknown (0), -- cost is unknown
    occupied (1),    -- occupied by a detected object
    notOccupied (2),
    unavailable (3) -- cost could not be computed or does not apply
}(0..3)
PerGridCellCostCollaborationRequestIndication ::= INTEGER {
    costValueRequested (0), -- Cost value for this Grid Cell requested
    costValueNotRequested (1)
} (0..1)
PerGridCellCostDiscripancyIndication ::= INTEGER {
    costDiscrepancyReported (0), -- indicates Yes for discripancy of received cost value for
a grid cell from the ego vehicle's cost value
    costDiscrepancyNotReported (1),
    unknown                (2) -- discrepancy cannot be computed or unknown
}(0..3)
-- @brief Cost Grid Value Confidence
-- The confidence in determination of CostGridValue of each cell
-- It can be specified in one format (as indicated by perGridCellConfidenceLevelConfigType)
among multiple formats
-- @unit n/a
PerGridCellConfidenceLevel ::= CHOICE {
costMapGridValueConfidenceConfig1      CostMapGridValueConfidenceConfig1,
costMapGridValueConfidenceConfig2      CostMapGridValueConfidenceConfig2,
...
}
CostMapGridValueConfidenceConfig1 ::= INTEGER {
    unknown       (0), -- Object confidence is unknown
    zeroToTenPercent    (1),
    tenToTwentyPercent            (2),
    twentyToThirtyPercent (3),
    thirtyToFourtyPercent         (4),
    fortyToFiftyPercent (5),
    fiftyToSixtyPercent              (6),
    sixtyToSeventyPercent         (7),
    seventyOnePercent             (8),   -- Confidence 71% to 100% is in step of 1
        seventyTwoPercent             (9),
        oneHundredPercent             (37),
    unavailable    (38) -- Confidence could not be computed and does not apply
} (0..38)
CostMapGridValueConfidenceConfig2 ::= INTEGER {
    unknown       (0), -- Cost confidence is unknown
    belowAThreshold (1), -- Threshold can be specified in Spec
    aboveOrEqualToAThreshold (2),
    unavailable    (3) -- Confidence could not be computed or does
--not apply
} (0..3)
END
```

2.2. Layered Cost Maps

Figure 4:
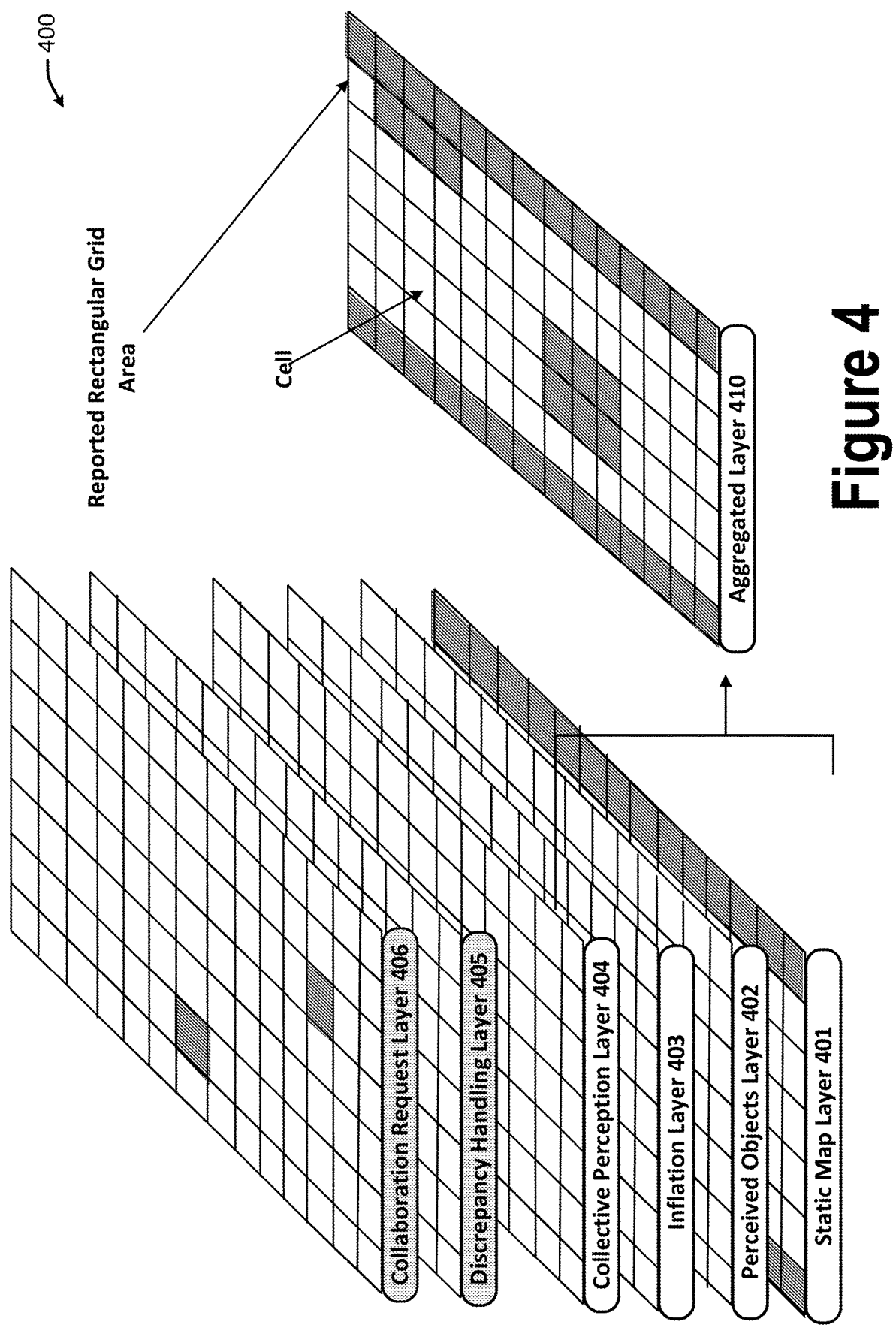
FIGS. 4 and 5 illustrate layered cost maps for perception.
Figure 5:
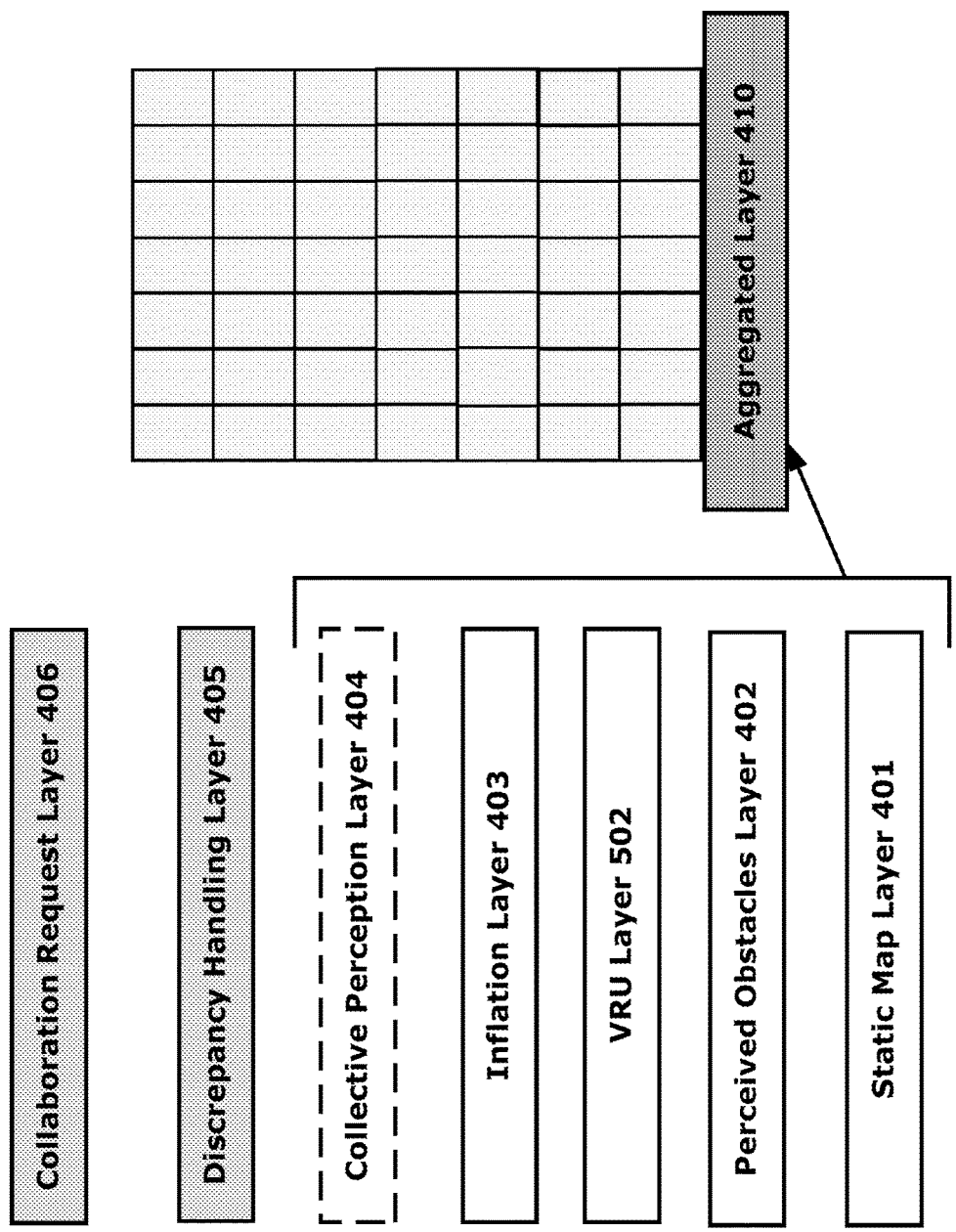

FIGS. 4 and 5 show Layered Cost Map (LCM) 400 and 500 for CP. A cost map (or "costmap") is a data structure that contains a 2D grid of costs (or "cost values") that is/are used for path planning. In other words, a costmap represents the planning search space around a V-ITS-S 110, VRU 116/117, robot, drone, or other movable object. The grid or cell values in the costmap are cost values associated with entering or traveling through respective grids or cells. Costmaps are used for navigating or otherwise traveling through dynamic environments populated with objects. For many use cases, such as CA/AD vehicles and/or (semi-)autonomous robotics, the travel path not only takes into account the starting and ending destinations, but also depends on having additional information about the larger contexts. Information about the environment that the path planners use is stored in the costmap. Traditional costmaps (also referred to as "monolithic costmaps") store all of the data (costs) in a singular grid. The LCMs 400, 500 maintain an ordered list of layers, each of which tracks the data related to a specific functionality and/or sensor type. The data for each layer is then accumulated into an aggregated layer 410 (sometimes referred to as a "master costmap 410").

As mentioned previously, reporting each of the perceived objects as an individual object can be very inefficient for the scenarios such as when there are a large number of objects, there is an overlapping view of objects, and/or when there is an occlusion of objects in the sensors' FOV. A new container called 'LayeredCostMapContainer' is added to the CPM 200, 300 to share LCM 400 to enable compact and efficient sharing of perceived environment among proximity ITS-Ss under CPS.

A Layered Cost Map Container (LayeredCostMapContainer) of type PerceptionData is added to the CPM 200, 300 to share overall dynamic environment perceived by a Tx ITS-S as a cost-based occupancy grid.

The "cost" or cost value in each cell of the costmap represents a cost of navigating through a that grid cell. The LayeredCostMapContainer considers grid-based representation of a cost map where each cell carries a cost (or cost value) or a probability that specific types of obstacles, objects, and/or VRU(s) 116/117 is/are present in the cell. In some implementations, the state of each grid cell is one of free, occupied, or unknown. In these implementations, the cost value refers to a probability or likelihood that a given cell is free (unoccupied), occupied by an object, or unknown. In some implementations, the state of each grid cell may be one of safe, caution, or lethal to drive through the cell. In these implementations, the cost value refers to a probability or likelihood that a given cell is safe to drive through, lethal to drive through, or somewhere in between safe and lethal (e.g., caution). Additionally, the "costs" of the cost map can be a cost as perceived by the station at a current time and/or a cost predicted at a specific future time (e.g., at a future time when the station intends to move to a new lane under a lane change maneuver). The ITS-Ss may follow a global grid with the same size cell representations and/or hierarchical grid sizes of cell representations. In hierarchical cell size, cell sizes are integer multiples of each other's.

Each ITS-S prepares and updates more than one layer or types of cost maps as shown in FIGS. 4 and 5. A disseminating ITS-S may have prepared more than one layer or type (e.g., up to 8) of a cost map as shown in FIGS. 4 and 5. The LCM 400 maintains an ordered list of layers, each of which tracks the data related to a specific functionality and/or sensor type, and the data for each layer is then accumulated into the aggregated cost map layer 410. Different layers have different rates of change, and therefore, different layers are updated at different frequencies based on factors such as the speed of the vehicle, weather, environmental conditions, and/or the like.

The aggregated layer 410 is prepared from other cost map layers (static layer 401, perceived objects layer 402, inflation layer 403, and collective perception (CP) layer 404) as shown in FIGS. 4 and 5. The layers are updated upwards from 'Static Map Layer' 401 in the order as shown in FIGS. 4 and 5 while preparing or updating Aggregated Cost Map Layer 410. That is, information in Static cost map layer 401 is first incorporated in the aggregated cost map layer 410 followed by adding information from perceived object layer 402, inflation layer 403, and CP layer 404.

Static Cost Map layer 401 maintains information about static or semi-static objects and roadside infrastructure, while other Layers of the cost map 400, 500 maintain costs due to dynamic objects and safety requirements of these objects. For example, the Static Map Layer 401 occupancy grid represents the permanent structures on the road and roadside; the Perceived Object Layer 402 occupancy grid represents the obstacles (dynamic/static) on the road and roadside perceived by local sensors; the Inflation Layer 403 occupancy grid represents buffer zone around obstacles or permanent structures; the CP Layer 404 occupancy grid represents perceived objects received from one or more neighbors; the Discrepancy Handling Layer 405 occupancy grid shows the grid cells where there are discrepancies between received and own cost values or confidence levels for grid cells; and the Collaboration Request Layer 406 occupancy grid indicates grid cells where the ego ITS-S could not determine the perception with required confidence level.

The static map layer 401 includes a static map of various static and/or semi-static objects (e.g., roadside infrastructure, buildings, and/or the like), which is used for global planning. The static map 401 is an occupancy grid that represents the permanent structures on road/road-side. The static map layer 401 is pre-determined a priori based on static structures on the road and/or at the road-side.

The static map 401 can be generated with a simultaneous localization and mapping (SLAM) algorithm a priori or can be created from an architectural diagram. Since the static map is the bottom layer of the global LCM, the values in the static map may be copied into the aggregated costmap directly. If the station or robot is running SLAM while using the generated map for navigation, the LCM approach allows the static map layer to update without losing information in the other layers. In monolithic costmaps, the entire costmap would be overwritten. The other layers of the LCM maintain costs due to dynamic objects, as well as safety and personal privacy requirements of these objects.

The perceived objects (obstacles) layer 402 includes determine perceived objects that are obstacles to be considered during driving. The perceived objects (obstacles) layer 402 collects data from high accuracy sensors such as lasers (e.g., LiDAR), Red Blue Green and Depth (RGB-D) cameras, and/or the like, and places the collected high accuracy sensor data in its own 2D grid. In some implementations, the space between the sensor and the sensor reading is marked as "free," and the sensor reading's location is marked as "occupied." The method used to combine the perceived obstacles layer's values with those already in the costmap can vary depending on the desired level of trust for the sensor data. In some implementations, the static map data may be over-written with the collected sensor data, which may be beneficial for scenarios where the static map may be inaccurate. In other implementations, the obstacles layer can be configured to only add lethal or VRU-related obstacles to the aggregated costmap.

The inflation layer 403 implements an inflation process, which inserts a buffer zone around lethal obstacles and/or objects that could move. Locations where the VDU would definitely be in collision are marked with a lethal cost, and the immediately surrounding areas have a small non-lethal cost. These values ensure that that VDU does not collide with lethal obstacles, and attempts to avoid such objects. The updateBounds method increases the previous bounding box to ensure that new lethal obstacles will be inflated, and that old lethal obstacles outside the previous bounding box that could inflate into the bounding box are inflated as well.

The Collective Perception Layer 404 includes the cumulative Cost Map/Occupancy Grid(s) received from one or more neighbor ITS-Ss. determines the costs of cells based on perceived objects indicated by CPMs 200, 300 received from neighbor stations. The Collective Perception Layer enables the ITS-S to update its cost map for the region where its own (on-board) sensors may not have a "good" view or any view.

The Collaboration Request Cost Map Layer 406 and Discrepancy Handling Cost Map Layer 405 enable collaboration among neighbors to achieve better and reliable cost map layers. The Discrepancy Handling Layer 405 enables indicating and resolving discrepancies in perception among neighboring ITS-Ss. The Discrepancy Handling Layer 405 specifies cells where on-board sensor cannot determine perception with a confidence level higher than a threshold. In some implementations, a majority voting mechanism may be used for this purpose, where the cost value of each cell is agreed on by majority voting among participating ITS-Ss.

The Collaboration RequestLayer 406 enables the Tx ITS-S to request neighbors to help enhancing the cost of some cells for which the Tx ITS-S does not have high confidence level to determine a value. The Collaboration Request Layer 406 determines and specifies any discrepancy between cost maps received from neighbor ITS-Ss with that perceived by local sensors. The Collaboration Request Layer 406 specifies cells where on-board sensors cannot determine perception with a confidence level at and/or higher than a threshold.

In some cases, vehicles in a proximity may observe different cost values for some cell(s) (e.g., due to sensing errors at one or more stations, different levels of angle of views of the sensors at vehicles to these cells, and/or the like). In such a scenario, CP can help in correcting any discrepancy in the costmap. The Discrepancy Handling Layer 405 is to indicate discrepancy among cost values of neighbors. After receiving such indication of discrepancy in the Discrepancy Handling Layer 405, nodes may re-evaluate sensing and cost map calculations for these cells and share among neighbors.

The Collaboration Request Layer 406 allows a station to request neighbors to help to enhance the cost of some cells for which the station may not have high confidence levels to determine a cost value. One or more neighbors may include the perceived cost value (and other information like perceived object at these cells) in its CPM 200, 300. If available, neighbors may respond by sending a unicast CPM 200, 300 in this case.

Additionally or alternatively, a proxemics layer may be included (not shown by FIG. 4), which may be used to detect objects and/or spaces surrounding individual objects. The proxemics layer may also collect data from high accuracy sensors such as lasers (e.g., LiDAR), RGB-D cameras, and/or the like. In some implementations, the proxemics layer may use lower accuracy cameras or other like sensors. The proxemics layer may use the same or different sensor data or sensor types as the perceived obstacles layer. The proxemics layer uses the location/position and velocity of detected objects (e.g., extracted from the sensor data representative of individual VRUs) to write values into the proxemics layer's costmap, which are then added into the aggregated costmap along with the other layer's costmap values. In some implementations, the proxemics layer uses a mixture of Gaussians models and writes the Gaussian values for each object into the proxemics layer's private costmap. In some implementations, the generated values may be scaled according to the amplitude, the variance, and/or some other suitable parameter(s).

The aggregated cost map layer 410 is updated periodically with a period T_Agg_CML_Update. T_Aggregated_CML_Update is selected smaller than or equal to the CPM generation event periodicity (T_GenCpm). Static cost map layer 401 is updated immediately whenever a change in static or semi-static objects and roadside infrastructure is identified. The CP layer 404 is updated whenever a new cost map layer or anew detected object is received from one or more neighbours. The CP layer 404 is also updated periodically to remove obsolete information such as an object reported by neighbour(s) is no more being reported by neighbour(s). Inflation cost map layer 403 is updated whenever an object is detected by local sensor or received from neighbour(s) CPM 200, 300, where the object requires buffer zone around it for safe driving. Periodic update of inflation cost map layer can be performed to reduce obsolete entry. Collaboration Request Cost Map Layer 406 and Discrepancy Handling Cost Map Layer 405 are not maintained at the ITS-S and are created on-demand whenever they are selected to be included in the CPM 200, 300. The ITS-S may check need for Collaboration Request Cost Map Layer 406 and Discrepancy Handling Cost Map Layer 405 at each opportunity of including a LayeredCostMapContainer in the CPM 200, 300.

The disseminating ITS-S shares Aggregated Cost Map Layer 410 and may share one or more of the other layers depending on the bandwidth or access layer congestion information. Each Shared Cost Map Layer type is specified by CostMapLayerType DF. The Collaboration Request Cost Map Layer 406 enables the disseminating ITS-S to request neighbor ITS-Ss to help enhancing the confidence of some cells for which the disseminating ITS-S does not have high confidence level to determine a value. The Discrepancy Handling Cost Map Layer 405 enables indicating and resolving discrepancy in perception among neighbors.

Majority voting is one option where cost value of each cell is agreed on majority voting. That is, the cost indicated by majority neighbors (or the average of nearby majority costs) is considered as correct/agreed. Such agreement is performed for each cell with discrepancy individually. All neighbors will update the correct/agreed cost. Here, the votes of neighbors can be skewed based on their trustworthiness and/or based on other criteria/parameters. Additionally or alternatively, neighbors having a better angle of view, quality of data, or the like, can be given more weight(s) to select correct/agreed cost for a cell. In case of discrepancy in Cost Maps among neighbors, how to utilize neighbors cost map reports is up to ITS-S fusion algorithm implementation.

2.2.1. Size Optimized LCM Containers

Recently, in ETSI ITS WG1, there was discussion about how efficient Layered Cost Map based CPM 200, 300 can be in terms of message size compared to that CPM 200, 300 based on perceived object containers and Free Space Addendum containers. In order to reduce message size for transmission over the air interface thereby reducing signaling overhead and conserving resources, new capabilities (e.g., DEs/DFs) are included for the layered cost map container providing size optimized Layered Cost Map Container options.

The DEs perGridCellCostValueConfigType and perGridCellConfidenceLevelConfigType (in the LayeredCostMap) are added to enable reduced size configuration for the Layered Cost Map Container. For example, CostMapGridValueConfig2 and CostMapGridValueConfidenceConfig2 can be used to specify Cost Value and Confidence level of each grid cell in the reported rectangular grid area with smaller number of bits, as shown by table 2.2.1-1.

TABLE 2.2.1-1

```
PerGridCellCostMapValueWithConfidenceLevel ::= SEQUENCE {
    perGridCellCostValue         PerGridCellCostValue,
    perGridCellConfidenceLevel   PerGridCellConfidenceLevel OPTIONAL, -- It may not
be needed in case of Collaboration Request Layer and Discrepancy Handling Layer
}
PerGridCellCostValue ::= CHOICE {
    costMapGridValueConfig1      CostMapGridValueConfig1,
```

TABLE 2.2.1-1-continued

```
  costMapGridValueConfig2        CostMapGridValueConfig2,
  perGridCellCostCollaborationRequestIndication
     PerGridCellCostCollaborationRequestIndication,
  perGridCellCostDiscripancyIndication     PerGridCellCostDiscripancyIndication
}
CostMapGridValueConfig1 ::= INTEGER {
  unknown (0), -- cost is unknown
  onePercent (1),
  oneHundredPercent (100),
  unavailable (101) -- cost could not be computed and does not apply
}(0..101)
CostMapGridValueConfig2 ::= INTEGER {
  unknown (0), -- cost is unknown
  occupied (1),              -- occupied by a detected object
  notOccupied (2),
  unavailable (3) -- cost could not be computed or does not apply
}(0..3)
PerGridCellConfidenceLevel ::= CHOICE {
  costMapGridValueConfidenceConfig1   CostMapGridValueConfidenceConfig1,
  costMapGridValueConfidenceConfig2   CostMapGridValueConfidenceConfig2,
  ...
}
CostMapGridValueConfidenceConfig1 ::= INTEGER {
  unknown     (0), -- Object confidence is unknown
  zeroToTenPercent          (1),
  tenToTwentyPercent        (2),
  twentyToThirtyPercent (3),
  thirtyToFourtyPercent     (4),
  fortyToFiftyPercent (5),
  fiftyToSixtyPercent       (6),
  sixtyToSeventyPercent     (7),
  seventyOnePercent         (8), -- Confidence 71% to 100% is in step of 1
  seventyTwoPercent         (9),
  oneHundredPercent         (37),
  unavailable    (38) -- Confidence could not be computed and does not apply
} (0..38)
CostMapGridValueConfidenceConfig2 ::= INTEGER {
  unknown     (0), -- Cost confidence is unknown
  belowAThreshold           (1), -- Threshold can be specified in Spec
  aboveOrEqualToThreshold   (2),
  unavailable    (3) -- Confidence could not be computed or does not apply
} (0..3)
```

These DEs enable to optimize size of the Layered Cost Map Container based on the situation. For example, when the access layer indicates congestion (e.g., if access layer congestion is detected), reduced size configuration (e.g., CostMapGridValueConfig2 and CostMapGridValueConfidenceConfig2) for Layered Cost Map Container can be selected to reduce message overhead at access layer.

Additionally or alternatively, when smaller size grid cells are reported, there are higher number of cells to be reported to cover reported total Grid Area. In such a case, a reduced size configuration (e.g., CostMapGridValueConfig2 and CostMapGridValueConfidenceConfig2) for Layered Cost Map Container can be used. While with bigger size of Grid cell, there are 50 smaller number of cells to be reported. Therefore, regular size configuration (e.g., CostMapGridValueConfig1 and CostMapGridValueConfidenceConfig1) for Layered Cost Map Container can be selected.

Additionally or alternatively, when only one cost map layer (e.g., the aggregated cost map layer 410) is reported regular size configuration (e.g., CostMapGridValueConfig1 and CostMapGridValueConfidenceConfig1) for Layered Cost Map Container can be selected. While when multiple layers of cost map are reported, a reduced size configuration (e.g., CostMapGridValueConfig2 and CostMapGridValueConfidenceConfig2) for Layered Cost Map Container can be used.

In some cases, selecting regular size configuration (e.g., CostMapGridValueConfig1 and CostMapGridValueConfidenceConfig1) for Layered Cost Map Container may result in bigger size layered Cost Map Container requiring segmentation of the CPM 200, 300. In such a case, a reduced size configuration (e.g., CostMapGridValueConfig2 and CostMapGridValueConfidenceConfig2) for Layered Cost Map Container can be selected to avoid segmentation or to reduce number of segments of the CPM 200, 300.

The flexibility also allows different layers of cost map to use different configuration to optimize overall Layered Cost Map Container size. For example, Aggregated Layer can be reported with regular size configuration (e.g., CostMapGridValueConfig1 and CostMapGridValueConfidenceConfig1) to provide more granular cost values. While other layers can be reported using a reduced size configuration (e.g., CostMapGridValueConfig2 and CostMapGridValueConfidenceConfig2). The range of gridCellSizeX and gridCellSizeY values are also optimized to reduce the message size. An example is shown by table 2.2.1-2.

TABLE 2.2.1-2

```
GridCellSizeX ::= INTEGER {
  zeroPointFiveMeter (1),
  oneMeter (2),
  twoMeter (3),
  threeMeter (4),
  fourMeter (5),
  fiveMeter (6)
} (1..8)
-- @brief GridCellSizeY
```

TABLE 2.2.1-2-continued

-- The length of an axis of a rectangle, used to describe the extension in a
-- particular direction.
GridCellSizeY ::= INTEGER {
  zeroPointFiveMeter (1),
  oneMeter (2),
  twoMeter (3),
  threeMeter (4)
} (1..4)

As shown by the example of table 2.2.1-3, the length of the reported Grid Area is in terms of number of reported cells lengthwise (or as integer multiples of gridCellSizeX), and the width of the reported Grid Area is in terms of number of reported cells widthwise (e.g., as integer multiples of gridCellSizeY) in order to reduce number of bits needed to represent them. Absolute unit for specifying length and width of reported Grid area requires higher number of bits. Moreover, length and width of the rectangular reported grid area is expected to be integer multiples of cell size.

TABLE 2.2.1-3

-- @brief number of reported Cost map grid cells in the Reported Cost
map Grid Area
-- @unit n/a
SizeofReportedGridArea ::= SEQUENCE {
-- Length and width of Reported Grid Area in terms of number of cells
nGridCellsSizeLength            INTEGER (1..200),
nGridCellsSizeWidth             INTEGER (1..50)
}

A pre-define Grid cell Counting Reference in the spec to skip reporting it in Layered Cost Map Container. It provides start point of cell for counting and direction of counting cells in the grid. For example, one of the ways to pre-define the Grid cell Counting Reference can be as follows: Pre-defined start point of cell is bottomLeft cell as cell #1 in the reported Cost Map Grid Area; and/or Pre-defined direction of counting is left to right in the direction of vehicle along x-axis and then move to leftmost cell in next row in y-axis (going from bottom to top direction).

TABLE 2.2.1-4

GridcellCountingReference ::= SEQUENCE {
gridcellCountingStartPoint GridcellCountingStartPoint,
gridcellCountingDirection GridcellCountingDirection,
...
}

TABLE 2.2.1-4-continued

-- @brief GridcellCountingStartPoint
-- It provides start point of cell for counting (e.g., bottomLeft cell as cell #
1) within the reported Cost Map Grid Area
-- The point is included in the plane perpendicular to the direction of the
@see yawAngleValue.
-- DEFAULT or predefined value can be 0
GridcellCountingStartPoint ::= INTEGER {
  bottomLeft (0),
  topLeft (1),
  bottomRight (2),
  topRight (3)
} (0..3)
-- @brief GridcellCountingDirection
-- It also provides direction of counting e.g., left to right in the direction
of
vehicle along x-axis first then move one step up in y-axis and agian count
from leftmost cell,
-- Default or predefined value can be 0
GridcellCountingDirection ::= INTEGER {
  leftToRightThenBottomToTop (0),
  leftToRightThenTopToBottom (1),
  rightToLeftThenBottomToTop (2),
  righttoLeftThenTopToBottom (3),
    bottomToTopThenLeftToRight (4),
    bottomToTopThenRightToLeft          (5),
  topToBottomThenLeftToRight (6),
    topToBottomThenRightToLeft          (7)
} (0..7)

2.2.2. Reporting VRU Cost Map Layer as a Separate Layer in Layered Cost Map Container VRUs 116 are special class of perceived objects which require special safety treatment for safe and secure ITS. Details of various classes of VRU 116 and VRU clusters (group of proximity VRUs with similar heading and speed) can be found in ['723] and [TS103300-3].

FIG. 5 shows a modified layered cost map 500 that includes the various layers discussed previously with respect to FIG. 4 and also includes a separate layer 502 for detected VRU and/or VRU cluster reporting. Here, detected VRUs and VRU clusters are reported as a separate cost map layer 502 with DEs/DFs in the Layered Cost Map Container to enable reporting VRU and VRU cluster as a separate cost layer. Since VRUs 116 can have higher priority for safety compared to other perceived objects, the VRU layer may be shared more frequently than the aggregated perceived obstacles layer and/or other layers in the cost map 400, 500.

Changes to the Layered Cost Map container for VRU Layer are shown by table 2.2.2-1 in ASN.1 coding format as defined in [SAE-J2735]. In this example, the vruCostMapLayer is added to the CostMapLayerType to indicate VRU Cost Map Layer.

TABLE 2.2.2-1

CostMapLayerType ::= INTEGER {
  masterCostMapLayer           (0), -- overall cost values after merging cost values of
all other layers
  staticCostMapLayer              (1),
  perceivedObstacleCostMapLayer   (2),
  inflationCostMapLayer           (3),
  confirmationCostMapLayer        (4), -- informing discrepancy in cost values with
neighbors for some grid cells
  ambiguityCostMapLayer           (5), -- sender request neighbors to help enhancing
the cost of some cells for which the vehicle may not have high confidence level to
determine a value
  collectivePerceptionCostMapLayer (6) -- Cost values of cells based on perceived
objects or cost values received from neighbors through CPM
  vruCostMapLayer (7) -- cost values of cells based on perceived VRU and/or VRU
Cluster
}(0..7)

To specify presence of various types of VRU and/or VRU cluster in the grid cells, two new Cost Configuration types are defined including DFs PerGridCellCostVruOccupancyConfig1 and PerGridCellCostVruOccupancyConfig2 in the DF PerGridCellCostValue, as shown by the example of table 2.2.2-2.

2.2.3. Layered Cost Map Container CP Requests and Cost Value Discrepancy Handling In the layered cost map, an originating node shares cost value with confidence level for each grid cell in the reported Grid-Area based on the presence of obstacle/object in the cell. An ITS-S may not be able to determine cost value of

TABLE 2.2.2-2

```
PerGridCellCostValue ::= CHOICE {
    costMapGridValueConfig1        CostMapGridValueConfig1,
    costMapGridValueConfig2        CostMapGridValueConfig2,
    -- @details perGridCellCollaborationRequestIndication
    -- used by Collaboration Request Layer. 1 bit is used per grid cell to indicate
    -- whether a cost map velue for this grid cell is requested or not. A vehicle
can request neighbors
    -- to help enhancing the cost of some cells for which the vehicle may not have
high confidence level to determine a value
    perGridCellCostCollaborationRequestIndication
    PerGridCellCostCollaborationRequestIndication,
    -- @details perGridCellDiscripancyIndication
    -- used by Discrepancy Handling Layer. 1 bit is used per grid cell to indicate
    -- discripancy of received cost value for a grid cell from the ego vehicle's
cost value for the cell.
    -- The 'Discrepancy Handling Layer' is to indicate discrepancy among cost values
of neighbors.
    perGridCellCostDiscripancyIndication       PerGridCellCostDiscripancyIndication,
-- @details PerGridCellCostVruOccupancyConfig1
-- used by VRU Cost Map Layer.
-- Specify presence of VRU or VRU Cluster of specific VRU type
    perGridCellCostVruOccupancyConfig1     PerGridCellCostVruOccupancyConfig1,
-- @details PerGridCellCostVruOccupancyConfig2
-- used by VRU Cost Map Layer.
-- Specify presence of VRU or VRU Cluster of specific VRU type
    perGridCellCostVruOccupancyConfig2 PerGridCellCostVruOccupancyConfig2
}
--@brief PerGridCellCostVruOccupancy1
PerGridCellCostVruOccupancy1 ::= INTEGER {
    free             (0), -- free of VRU and --VRU Cluster
    equippedVruProfile1PedestrianPresent (1),
    equippedVruProfile2BicyclistPresent                    (2),
    equippedVruProfile3MotorcyclistPresent                 (3),
    equippedVruProfile4AnimalsPresent                      (4),
    nonEquippedVruProfile1PedestrianPresent (5),
    nonEquippedVruProfile2BicyclistPresent                 (6),
    nonEquippedVruProfile3MotorcyclistPresent   (7),
    nonEquippedVruProfile4AnimalsPresent                   (8),
    moreThanOneVruProfileTypesPresent                      (9),
    vruClusterPresent           (10),
    vruClusterAndEquippedVrusPresent                       (11),
    vruClusterAndNonEquippedVrusPresent                    (12),
    vruClusterAndEquippedNonEquippedBothVrusPresent (13),
    unknown           (14) -- occupancy is not known
    unavailable          (15) -- occupancy could not be computed and does not apply
}(0..15)
-- @brief PerGridCellCostVruOccupancy2
PerGridCellCostVruOccupancy2 ::= INTEGER {
   free   (0), -- free of VRU and VRU Cluster
   equippedVruPresent (1),
   nonEquippedVruPresent (2),
   vruClusterPresent   (3),
   vruClusterAndEquippedVrusPresent (4),
   vruClusterAndNonEquippedVrusPresent (5),
   vruClusterAndEquippedNonEquippedBothVrusPresent (6),
     unknownOrUnavailable         (7) -- occupancy is not known or occupancy could not
be computed and does not apply
}(0..7)
``` some Grid cells (e.g., due to obstructed FoV 55 for these cells) with sufficient confidence level. In such a case, an ITS-S may request help from neighboring ITS-Ss to get cost values of these cells and to increase confidence level. The layered cost map container is further enhanced to enable requesting such collaboration request more precisely and effectively. The ITS-Ss indicate and resolve discrepancies in grid cell cost values among neighbors (e.g., when one or more received values differ with node's own cost value). New DEs/DFs are provided herein to enable such discrepancy handling efficiently.

Additionally or alternatively, a new PerGridCellCostValue type by providing a DF PerGridCellCostCollaborationRequest for effective collaboration request. Collaboration request at least indicate the grid cells for which ego node is requesting help to get cost values and the cost map layer for which such request is made. A node can ask for collaboration request one or more cost map layers (such as Aggregated Layer, VRU Layer, Inflation Layer, and/or the like). If cost map type is not specified, it is assumed to be for aggregated cost map layer 410. Additionally, the DF allows to send ego node's current determination of cost values with its confidence level for these requested grid cells. The additional information reduces number of responses from the neighbors. For example, only neighbors with higher confidence levels for cost values of these grid cells should respond.

The PerGridCellCostValue type is provided by a PerGridCellCostDiscripancyReport DF for effective handling of discrepancy in cost values among neighbor ITS-Ss. Discrepancy reporting should at least indicate the grid cells for which ego node is reporting discrepancy with neighbors reported cost values and the cost map layer for which such report is transmitted. A node can ask for discrepancy handling for one or more cost map layers (e.g., Aggregated Layer, VRU Layer, Inflation Layer, and/or the like. If cost map type is not specified, it is assumed to be for aggregated cost map layer 410. Additionally, the new DF allows to send ego node's IDs of the neighbors with whom ago node has discrepancy in cost values for at least one reported grid cell. The additional information may trigger indicated neighbors to re-evaluate and/or update cost values for these grid cells.

TABLE 2.2.3-1

```
PerGridCellCostValue ::= CHOICE {
    costMapGridValueConfig1         CostMapGridValueConfig1,
    costMapGridValueConfig1         CostMapGridValueConfig2,
    -- @details perGridCellCollaborationRequest
    -- used by Collaboration Request Layer. A vehicle can request neighbors
    -- to help enhancing the cost of some cells for which the vehicle may not have
high confidence level to determine a value
    -- request can be made for one or more layers
    perGridCellCostCollaborationRequest    SEQUENCE SIZE(1..Max, ...) OF
PerGridCellCostCollaborationRequest,
    -- @details perGridCellDiscripancyIndication
    -- used by Discrepancy Handling Layer.
    -- The 'Discrepancy Handling Layer' is to indicate discrepancy among cost values
of neighbors.
    -- discrepancy report can be for one or more cost map layers
    perGridCellCostDiscripancyReport      SEQUENCE SIZE(1..Max, ...) OF
PerGridCellCostDiscripancyReport,
    -- @details PerGridCellCostVruOccupancyConfig1
    -- used by VRU Cost Map Layer.
    -- Specify presence of VRU or VRU Cluster of specific VRU type
    perGridCellCostVruOccupancyConfig1    PerGridCellCostVruOccupancyConfig1,
    -- @details PerGridCellCostVruOccupancyConfig2
    -- used by VRU Cost Map Layer.
    -- Specify presence of VRU or VRU Cluster of specific VRU type
    perGridCellCostVruOccupancyConfig2    PerGridCellCostVruOccupancyConfig2
}
PerGridCellCostCollaborationRequest ::= SEQUENCE {
    -- @details collaborationRequestForCostMapLayerType
    -- It specifies layer for which this request is made default is for aggregated
layer
    collaborationRequestForCostMapLayerType    CostMapLayerType,
    -- @details perGridCellCollaborationRequestIndication
    -- used by Collaboration Request Layer. 1 bit for each Grid Cell to indicate
collaboration request.
    perGridCellCostCollaborationRequestIndication
    PerGridCellCostCollaborationRequestIndication,
    --@details selfDeterminedCostValue
    -- It provides ego node's current cost determination which is not with
sufficient confidence level
    selfDeterminedCostValue    SelfDeterminedCostValue OPTIONAL,
    --@details selfDeterminedConfidenceLevel
    -- It provides ego node's confidence level for current cost determination
-- This confidence level is below acceptable level
    selfDeterminedConfidenceLevel PerGridCellConfidenceLevel OPTIONAL,
}
SelfDeterminedCostValue ::= CHOICE {
    costMapGridValueConfig1         CostMapGridValueConfig1,
    costMapGridValueConfig2         CostMapGridValueConfig2,
}
PerGridCellCostDiscripancyReport ::= SEQUENCE {
    -- @details discrepancyReportForCostMapLayerType
    -- It specifies layer for which this request is made
    -- default is for aggregated layer
```

TABLE 2.2.3-1-continued

```
discrepancyReportForCostMapLayerType    CostMapLayerType,
    -- @details perGridCellDiscrepancyIndication
    -- used by Discrepancy Handling Layer. 1 bit is used per grid cell to indicate
    -- discrepancy of received cost value for a grid cell from the ego vehicle's
cost value for the cell.
    perGridCellCostDiscripancyIndication PerGridCellCostDiscripancyIndication,
    -- @details neighborList
    -- It provides list of neighbors in discrepancy of cost value for at least one
reported cell. Max can be 8 or 16
    neighborList   SEQUENCE SIZE(1..Max, ...) OF StationID OPTIONAL,
}
```

If the Tx ITS-S identifies that cost map values for the cells corresponding to more than x % of its current cost map cells differ from values reported by neighbors by more than a threshold and such discrepancy has not been reported by neighbors since Tx ITS-S's last CPM 200, 300 transmission, ITS-S sends Discrepancy Handling Cost Map Layer in the current CPM 200, 300.

If the Tx ITS-S identifies that cost map values of its current cells corresponding to detected VRU (e.g., person or animal) by the perception system differ from neighbors reported values by more than a threshold and such discrepancy has not been reported by neighbors since Tx ITS-S's last CPM 200, 300 transmission, ITS-S sends Discrepancy Handling Cost Map Layer in the current CPM 200, 300.

If the on-board sensors at Tx ITS-S did not determine perception with a confidence level higher than a threshold for more than y % of its current Cost map cells and Tx ITS-S has not included Collaboration Request Cost map Layer in its last CPM 200, 300 transmission, ITS-S sends Collaboration Request Cost map Layer in the current CPM 200, 300.

If a neighbor has requested help in determining cost values of some cells in a specific Cost Map Layer by sending 'Collaboration Request Cost map Layer' after Tx ITS-S's last CPM 200, 300 transmission, the ITS-S has values for some or all requested cells and confidence levels of these cost values are higher than any other response from other neighbors for this collaboration request, the ITS-S includes that specific Cost Map Layer in the current CPM 200, 300.

Consecutive inclusion of one or more Layered Cost maps (or cost map layers) in the LayeredCostMapContainer in the CPM 200, 300 may take place if/when one or more of the following conditions is/are met: (1) A LayeredCostMapContainer DF is added to the current CPM 200, 300 if the difference between the current Euclidian distance of the NodeCenterPoint of the Rectangular Cost Map Grid Area to be reported and the Euclidian distance of the NodeCenterPoint of the same reported Rectangular Cost Map Grid Area and lastly included in a CPM 200, 300 exceeds a predefined or configured threshold (e.g., 4 meters (m) or the like); (2) ALayeredCostMapContainer DF is added to the current CPM 200, 300 if the difference between the current SemiRangeLength of the Rectangular Cost Map Grid Area to be reported and the SemiRangeLength of the same reported Rectangular Cost Map Grid Area lastly included in a CPM 200, 300 exceeds a predefined or configured threshold (e.g., 4 m or the like); and/or A LayeredCostMapContainer DF is added to the current CPM 200, 300 if the difference between the current semiMajorRangeOrientation of the Rectangular Cost Map Grid Area to be reported and the semiMajorRangeOrientation of the same reported Rectangular Cost Map Grid Area lastly included in a CPM 200, 300 exceeds a predefined or configured threshold (e.g., 4 degrees or the like).

2.2.4. CPM Segmentation and Layered Cost Map Container Inclusion Priority in CPM Segments In case the size of the ASN.1 UPER encoded CPM 200, 300 including all perceived object and Cost Map Layer candidates selected for transmission exceeds MTU_CPM, message segmentation may occur. Each message segment should be interpreted without the need to receive all segments. Currently, selected perceived object candidates are included in a CPM segment in a descending order of the product of an object's confidence (if available) and speed. In case the object confidence is unavailable, only the object speed is used for sorting in a descending fashion.

When cost map sharing is enabled, the provisions for including perceived objects and cost map layer candidates in CPM segments may be as follows: (i) Aggregated Cost Map Layer 410 is selected to be included in the first segment; (ii) Then perceived object candidates are included based on the existing provision—in a descending order of the product of an object's confidence (if available) and speed; (iii) Remaining cost map layers are included once all selected objects are included in the segments; (vi) Remaining cost map layers are either included in the last segment with perceived object if size allows, otherwise, one or more new segments are generated to include all the remaining cost map layers; and (v) Cost map layers inclusion order in the Segments are in the following descending priority order: aggregated cost map layer 410, perceived objects (obstacles) cost map layer 402, inflation cost map layer 403, discrepancy cost map layer 405, collaboration request cost map layer 406, CP cost map layer 402, and static cost map layer 401.

Additionally or alternatively, if CPM segmentation is required to include all perceived object and cost map layer candidates, one or more of the following actions is/are taken:

Additionally or alternatively, only aggregated cost map layer 410 is included in the CPM 200, 300 without segmentation. Perceived object and remaining cost map layer candidates are excluded from transmission. The Tx ITS-S may need to select larger cost map cell size to reduce size of the aggregated cost map layer 410 in order to fit in the CPM 200, 300.

Additionally or alternatively, all cost map layer candidates are included in the CPM 200, 300 with minimum number of CPM segments. Perceived object candidates are excluded from transmission. Note that a cost map layer must be entirely included in a segment (e.g., a cost map layer cannot be divided in two CPM segments) so that each segment can be self-interpretable. Two or more Cost map layers can be included in the same segment if size permits. The Tx ITS-S may need to select larger cost map cell size to reduce size of a cost map layer in order to fit in a single CPM segment. Each CPM segment should be self-interpretable without the need to receive all or other segments.

2.3. ASN.1 Implementation of LayeredCostMapContainer

The following layered cost map DFs and DEs in CPMs 200, 300 based on the format defined in SAE International, "Dedicated Short Range Communications (DSRC) Message Set Dictionary", V2X Core Technical Committee, SAE Ground Vehicle Standard J2735, DOI: https://doi.org/10.4271/J2735_202007 (23 Jul. 2020) ("[SAE-J2735]").

A first CPM 200, 300 with DEs and DFs for a layered cost map container for optimizing the size of this container is provided by table 2.3-1.

TABLE 2.3-1

```
CPM-LayeredCostMap-Descriptions {
itu-t (0) identified-organization (4) etsi (0) itsDomain (5) wg1 (1) ts (103324)
freeSpaceAddendum (6) version1 (1)
}
DEFINITIONS AUTOMATIC TAGS ::=
BEGIN
IMPORTS
TimeOfMeasurement
FROM CPM-CommonDataTypes-Descriptions {itu-t (0) identified-organization (4) etsi
(0) itsDomain (5) wg1 (1) ts (103324) commonDataTypes (2) version1 (1)};
-- @brief Layered Cost Map Container
-- A list of perceived Layered Cost Maps. Each Cost Map layer shall be described as
provided by
-- @see LayeredCostMap.
LayeredCostMapContainer ::= SEQUENCE {
    -- @details numberOfSupportingLayerCostMap
    -- The total number of Cost Map layers calculated by the station at the time of
generating the message to be shared by CPM.
    -- Due to the dynamic message generation rules (due to size constraint of the
CPM), this number does not have to reflect the number
    -- of Cost Map layers included in this message but states the number of
LayeredCostMap available at the sender at
    -- the time of generating the message.
        -- if LayeredCostMapContainer is transmitted, first Cost Map Layer is always
MasterCostMapLayer.
        -- Default is 1 (Master layer). Sometimes sender's MasterCostMapLayer may be
same as reported by one or more neighbors. So sender may not need to share it.
        numberOfLayeredCostMap NumberOfLayeredCostMap DEFAULT 1,
    layeredCostMap SEQUENCE SIZE(1..8, ...) OF LayeredCostMap OPTIONAL,
        reportedCostMapGridArea    ReportedCostMapGridArea,
    ...
}
ReportedCostMapGridArea                ::= SEQUENCE {
    --@details of GridCellSize
    -- ReportedCostMapGridArea is integer multiples of Grid Cell Size.
    -- That is length and width of Reported Cost Map Grid Area are integer multiples
of gridCellSizeX and gridCellSizeY respectively
        gridCellSizeX                    GridCellSizeX OPTIONAL,
        gridCellSizeY                    GridCellSizeY OPTIONAL,
        -- @details SizeofReportedGridArea
        -- It provides length and width of reported grid area
        sizeofReportedGridArea           SizeofReportedGridArea OPTIONAL,
        -- @details gridAreaCenterPoint
    -- Optional offset point about which the rectangle is centred with respect to the
reference
        -- position of the ITS-S.
        -- gridAreaCenterPoint can be partially pre-defined. For example, originating
ITS-S can be always be made in the middle of Grid Area lengthwise,
        -- so the offset is needed only widthwise.
    gridAreaCenterPoint OffsetPoint,
    -- @details semiMajorRangeOrientation
    -- Orientation of the semiMajorRangeLength of the rectangular Grid Area in the
WGS84 coordinate system.
    semiMajorRangeOrientation WGS84AngleValue,
        -- @details of GridcellCountingReference
        -- It provides start point of cell for counting and direction of counting cells
in the grid.
        -- DEFAULT or Pre-defined start point of cell can be bottomLeft cell as cell # 1
in the repoted Cost Map Grid Area
        -- and DEFAULT direction of counting can be left to right in the direction of
vehicle along x-axis first then move to leftmost next cell in y-axis
        gridcellCountingReference GridcellCountingReference OPTIONAL,
}
-- @brief number of reported Cost map layers
-- @unit n/a
NumberOfLayeredCostMap ::= INTEGER (1..8)
-- @brief GridCellSizeX
-- The length of an axis of a rectangle, used to describe the extension in a
-- particular direction.
GridCellSizeX ::= INTEGER {
    zeroPointFiveMeter (1),
    oneMeter (2),
```

TABLE 2.3-1-continued

```
    twoMeter (3),
    threeMeter (4),
    fourMeter (5),
    fiveMeter (6)
} (1..8)
-- @brief GridCellSizeY
-- The length of an axis of a rectangle, used to describe the extension in a
-- particular direction.
GridCellSizeY ::= INTEGER {
    zeroPointFiveMeter (1),
    oneMeter (2),
    twoMeter (3),
    threeMeter (4)
} (1..4)
-- @brief number of reported Cost map grid cells in the Reported Cost map Grid Area
-- @unit n/a
SizeofReportedGridArea ::= SEQUENCE {
-- Length and width of Reported Grid Area in terms of number of cells
nGridCellsSizeLength              INTEGER (1..200),
nGridCellsSizeWidth               INTEGER (1..50)
}
-- @brief GridcellCountingReference
-- It provides start point of cell for counting, e.g., bottomLeft cell as cell # 1
in the repoted Cost Map Grid Area @see GridcellCountingStartPoint
-- It also provides direction of counting e.g., left to right in the direction of
vehicle along x-axis first then move to leftmost next cell in y-axis, @see
GridcellCountingDirection
-- DEFAULT start point of cell is bottomLeft cell as cell # 1 in the repoted Cost
Map Grid Area
-- and DEFAULT direction of counting is left to right in the direction of vehicle
along x-axis first then move to leftmost next cell in y-axis
GridcellCountingReference ::= SEQUENCE {
gridcellCountingStartPoint GridcellCountingStartPoint,
gridcellCountingDirection GridcellCountingDirection,
...
}
-- @brief GridcellCountingStartPoint
-- It provides start point of cell for counting (e.g., bottomLeft cell as cell # 1)
within the reported Cost Map Grid Area
-- The point is included in the plane perpendicular to the direction of the @see
yawAngleValue.
-- DEFAULT or predefined value can be 0
GridcellCountingStartPoint ::= INTEGER {
    bottomLeft (0),
    topLeft (1),
    bottomRight (2),
    topRight (3)
} (0..3)
-- @brief GridcellCountingDirection
-- It also provides direction of counting e.g., left to right in the direction of
vehicle along x-axis first then move one step up in y-axis and agian count from
leftmost cell,
-- Default or predefined value can be 0
GridcellCountingDirection ::= INTEGER {
    leftToRightThenBottomToTop (0),
    leftToRightThenTopToBottom (1),
    rightToLeftThenBottomToTop (2),
    righttoLeftThenTopToBottom (3),
        bottomToTopThenLeftToRight (4),
        bottomToTopThenRightToLeft       (5),
    topToBottomThenLeftToRight (6),
        topToBottomThenRightToLeft       (7)
} (0..7)
-- @brief LayeredCostMap
-- Cost Map can be monolithic where there is a single Occupancy Grid with each cell
in the 2D Grid has an occupancy probability value (or a cost/penalty).
-- However, an enhanced Cost Map may implement Layered Cost Maps - where Master
Layer Cost Map is similar to Occupancy Grid of Monolithic Cost Map.
-- Instead of storing data directly in the Master layer, the layered costmap
maintains an ordered list of layers, each of which tracks the data related to a
specific functionality.
--The data from each of the layers is then accumulated into the master costmap.
--For example, Static Map Layer, Obstacles Layer, Inflation Layer (inflation
process inserts a buffer zone around each lethal obstacle),
-- Proxemic Layer (creates areas around detected people more costly), etc.
LayeredCostMap ::= SEQUENCE {
        -- @details costMapLayerType
        -- It provides type of Cost Map layer, @see costMapLayerType
        costMapLayerType            CostMapLayerType,
        -- @details timeOfCostMapUpdate
```

TABLE 2.3-1-continued

```
    -- Provides the time difference from the message's generation delta time to the
time of the
    -- last update of the Cost map Layer.
    timeOfCostMapUpdate              TimeOfMeasurement,
    -- @details of perGridCellCostMapValueConfigType
    -- It provides various options to indicate format of cost map.
    --These formats also vary in size (number of bits) required to specify cost map
value per grid cell
    perGridCellCostValueConfigType ::= INTEGER (1..Max), -- Max can be 4 or 8.
    -- @details of perGridCellConfidenceLevelConfigType
    -- It provides various options to select format of cofidence level value.
    --These formats also vary in size (number of bits) required to specify
confidence level per grid cell
    PerGridCellConfidenceLevelConfigType ::= INTEGER (1..Max) OPTIONAL, -- Max can
be 4. It may not be needed in case of Collaboration Request Layer and Discrepancy
Handling Layer
    perGridCellCostMapValueWithConfidenceLevel      SEQUENCE SIZE(1..1024, ...) OF
PerGridCellCostMapValueWithConfidenceLevel,
        ...
}
-- @brief CostMapLayerType
-- It provides type of the Cost Map layer
CostMapLayerType ::= INTEGER {
    masterCostMapLayer               (0), -- overall cost values after merging cost values of
all other layers
    staticCostMapLayer               (1),
    perceivedObstacleCostMapLayer (2),
    inflationCostMapLayer            (3),
    confirmationCostMapLayer         (4), -- informing discrepancy in cost values with
neighbors for some grid cells
    ambiguityCostMapLayer            (5), -- sender request neighbors to help enhancing
the cost of some cells for which the vehicle may not have high confidence level to
determine a value
    collectivePerceptionCostMapLayer   (6) -- cost values of cells based on perceived
objects or cost values received from neighbors through CPM
    }(0..8)
PerGridCellCostMapValueWithConfidenceLevel ::= SEQUENCE {
    perGridCellCostValue             PerGridCellCostValue,
    perGridCellConfidenceLevel       PerGridCellConfidenceLevel OPTIONAL, -- It may not
be needed in case of Collaboration Request Layer and Discrepancy Handling Layer
    }
-- @brief costMapGridValue
-- cost value of each cell normalized to 0-100.
-- it is of one format (indicated by perGridCellCostValueConfigType) among several
option
-- @unit n/a
PerGridCellCostValue ::= CHOICE {
    costMapGridValueConfig1        CostMapGridValueConfig1,
    costMapGridValueConfig1        CostMapGridValueConfig2,
    -- @details perGridCellCollaborationRequestIndication
    -- used by Collaboration Request Layer. 1 bit is used per grid cell to indicate
    -- whether a cost map velue for this grid cell is requested or not. A vehicle
can request neighbors
    -- to help enhancing the cost of some cells for which the vehicle may not have
high confidence level to determine a value
    perGridCellCostCollaborationRequestIndication
    PerGridCellCostCollaborationRequestIndication,
    -- @details perGridCellDiscripancyIndication
    -- used by Discrepancy Handling Layer. 1 bit is used per grid cell to indicate
    -- discripancy of received cost value for a grid cell from the ego vehicle's
cost value for the cell.
    -- The 'Discrepancy Handling Layer' is to indicate discrepancy among cost values
of neighbors.
    perGridCellCostDiscripancyIndication    PerGridCellCostDiscripancyIndication
}
CostMapGridValueConfig1 ::= INTEGER {
    unknown (0), -- cost is unknown
    onePercent (1),
    oneHundredPercent (100),
    unavailable (101) -- cost could not be computed and does not apply
}(0..101)
CostMapGridValueConfig2 ::= INTEGER {
    unknown (0), -- cost is unknown
    occupied (1),                    -- occupied by a detected object
    notOccupied (2),
    unavailable (3) -- cost could not be computed or does not apply
}(0..3)
PerGridCellCostCollaborationRequestIndication ::= INTEGER {
    costValueRequested (0), -- Cost value for this Grid Cell requested
    costValueNotRequested (1),
```

TABLE 2.3-1-continued

```
} (0..1)
PerGridCellCostDiscripancyIndication ::= INTEGER {
       CostDiscrepancyReported (0), -- indicates Yes for discripancy of received cost
value for a grid cell from the ego vehicle's cost value
    costDiscrepancyNotReported (1),
    unknown                           (2), -- discrepancy cannot be computed or unknown
}(0..3)
-- @brief Cost Grid Value Confidence
-- The confidence in determination of CostGridValue of each cell
-- It can be specified in one format (as indicated by
perGridCellConfidenceLevelConfigType) among multiple formats
-- @unit n/a
PerGridCellConfidenceLevel ::= CHOICE {
costMapGridValueConfidenceConfig1     CostMapGridValueConfidenceConfig1,
costMapGridValueConfidenceConfig2     CostMapGridValueConfidenceConfig2,
...
}
CostMapGridValueConfidenceConfig1 ::= INTEGER {
    unknown     (0), -- Object confidence is unknown
    zeroToTenPercent              (1),
    tenToTwentyPercent            (2),
    twentyToThirtyPercent (3),
    thirtyToFourtyPercent         (4),
    fortyToFiftyPercent (5),
    fiftyToSixtyPercent           (6),
    sixtyToSeventyPercent         (7),
    seventyOnePercent             (8), -- Confidence 71% to 100% is in step of 1
       seventyTwoPercent          (9),
       oneHundredPercent               (37),
    unavailable     (38) -- Confidence could not be computed and does not apply
} (0..38)
CostMapGridValueConfidenceConfig2 ::= INTEGER {
    unknown     (0), -- Cost confidence is unknown
    belowAThreshold               (1), -- Threshold can be specified in Spec
    aboveOrEqualToThreshold           (2),
    unavailable     (3) -- Confidence could not be computed or does
--not apply
} (0..3)
END
```

35

Alternatively CPM DEs and DFs for a layered cost map containers with a separate VRU Cost Map Layer 502 and objective of optimizing size of layered cost map container is provided by table 2.3-2.

TABLE 2.3-2

```
CPM-LayeredCostMap-Descriptions {
itu-t (0) identified-organization (4) etsi (0) itsDomain (5) wg1 (1) ts (103324)
freeSpaceAddendum (6) version1 (1)
}
DEFINITIONS AUTOMATIC TAGS ::=
BEGIN
IMPORTS
TimeOfMeasurement
FROM CPM-CommonDataTypes-Descriptions {itu-t (0) identified-organization (4) etsi
(0) itsDomain (5) wg1 (1) ts (103324) commonDataTypes (2) version1 (1)};
-- @brief Layered Cost Map Container
-- A list of perceived Layered Cost Maps. Each Cost Map layer shall be described as
provided by
-- @see LayeredCostMap.
LayeredCostMapContainer ::= SEQUENCE {
    -- @details numberOfSupportingLayerCostMap
    -- The total number of Cost Map layers calculated by the station at the time of
generating the message to be shared by CPM.
    -- Due to the dynamic message generation rules (due to size constraint of the
CPM), this number does not have to reflect the number
    -- of Cost Map layers included in this message but states the number of
LayeredCostMap available at the sender at
    -- the time of generating the message.
       -- if LayeredCostMapContainer is transmitted, first Cost Map Layer is always
MasterCostMapLayer.
       -- Default is 1 (Master layer). Sometimes sender's MasterCostMapLayer may be
same as reported by one or more neighbors. So sender may not need to share it.
       numberOfLayeredCostMap NumberOfLayeredCostMap DEFAULT 1,
    layeredCostMap SEQUENCE SIZE(1..8, ...) OF LayeredCostMap OPTIONAL,
       reportedCostMapGridArea    ReportedCostMapGridArea,
```

TABLE 2.3-2-continued

```
...
}
ReportedCostMapGridArea                      ::= SEQUENCE {
    --@details of GridCellSize
    -- ReportedCostMapGridArea is integer multiples of Grid Cell Size.
    -- That is length and width of Reported Cost Map Grid Area are integer multiples
of gridCellSizeX and gridCellSizeY respectively
        gridCellSizeX                        GridCellSizeX OPTIONAL,
        gridCellSizeY                        GridCellSizeY OPTIONAL,
    -- @details SizeofReportedGridArea
    -- It provides length and width of reported grid area
        sizeofReportedGridArea               SizeofReportedGridArea OPTIONAL,
    -- @details gridAreaCenterPoint
    -- Optional offset point about which the rectangle is centred with respect to the
reference
    -- position of the ITS-S.
    -- gridAreaCenterPoint can be partially pre-defined. For example, originating
ITS-S can be always be made in the middle of Grid Area lengthwise,
        -- so the offset is needed only widthwise.
        gridAreaCenterPoint OffsetPoint,
    -- @details semiMajorRangeOrientation
    -- Orientation of the semiMajorRangeLength of the rectangular Grid Area in the
WGS84 coordinate system.
        semiMajorRangeOrientation WGS84AngleValue,
        -- @details of GridcellCountingReference
        -- It provides start point of cell for counting and direction of counting cells
in the grid.
        -- DEFAULT or Pre-defined start point of cell can be bottomLeft cell as cell # 1
in the repoted Cost Map Grid Area
        -- and DEFAULT direction of counting can be left to right in the direction of
vehicle along x-axis first then move to leftmost next cell in y-axis
            gridcellCountingReference GridcellCountingReference OPTIONAL,
}
-- @brief number of reported Cost map layers
-- @unit n/a
NumberOfLayeredCostMap ::= INTEGER (1..8)
-- @brief GridCellSizeX
-- The length of an axis of a rectangle, used to describe the extension in a
-- particular direction.
GridCellSizeX ::= INTEGER {
    zeroPointFiveMeter (1),
    oneMeter (2),
    twoMeter (3),
    threeMeter (4),
    fourMeter (5),
    fiveMeter (6)
} (1..8)
-- @brief GridCellSizeY
-- The length of an axis of a rectangle, used to describe the extension in a
-- particular direction.
GridCellSizeY ::= INTEGER {
    zeroPointFiveMeter (1),
    oneMeter (2),
    twoMeter (3),
    threeMeter (4)
} (1..4)
-- @brief number of reported Cost map grid cells in the Reported Cost map Grid Area
-- @unit n/a
SizeofReportedGridArea ::= SEQUENCE {
-- Length and width of Reported Grid Area in terms of number of cells
nGridCellsSizeLength                     INTEGER (1..200),
nGridCellsSizeWidth                      INTEGER (1..50)
}
-- @brief GridcellCountingReference
-- It provides start point of cell for counting, e.g., bottomLeft cell as cell # 1
in the repoted Cost Map Grid Area @see GridcellCountingStartPoint
-- It also provides direction of counting e.g., left to right in the direction of
vehicle along x-axis first then move to leftmost next cell in y-axis, @see
GridcellCountingDirection
-- DEFAULT start point of cell is bottomLeft cell as cell # 1 in the repoted Cost
Map Grid Area
-- and DEFAULT direction of counting is left to right in the direction of vehicle
along x-axis first then move to leftmost next cell in y-axis
GridcellCountingReference ::= SEQUENCE {
gridcellCountingStartPoint GridcellCountingStartPoint,
gridcellCountingDirection GridcellCountingDirection,
...
}
-- @brief GridcellCountingStartPoint
-- It provides start point of cell for counting (e.g., bottomLeft cell as cell # 1)
```

TABLE 2.3-2-continued

```
within the reported Cost Map Grid Area
-- The point is included in the plane perpendicular to the direction of the @see
yawAngleValue.
-- DEFAULT or predefined value can be 0
GridcellCountingStartPoint ::= INTEGER {
   bottomLeft (0),
   topLeft (1),
   bottomRight (2),
   topRight (3)
} (0..3)
-- @brief GridcellCountingDirection
-- It also provides direction of counting e.g., left to right in the direction of
vehicle along x-axis first then move one step up in y-axis and agian count from
leftmost cell,
-- Default or predefined value can be 0
GridcellCountingDirection ::= INTEGER {
   leftToRightThenBottomToTop (0),
   leftToRightThenTopToBottom (1),
   rightToLeftThenBottomToTop (2),
   righttoLeftThenTopToBottom (3),
      bottomToTopThenLeftToRight (4),
      bottomToTopThenRightToLeft              (5),
   topToBottomThenLeftToRight (6),
      topToBottomThenRightToLeft              (7)
} (0..7)
-- @brief LayeredCostMap
-- Cost Map can be monolithic where there is a single Occupancy Grid with each cell
in the 2D Grid has an occupancy probability value (or a cost/penalty).
-- However, an enhanced Cost Map may implement Layered Cost Maps - where Master
Layer Cost Map is similar to Occupancy Grid of Monolithic Cost Map.
-- Instead of storing data directly in the Master layer, the layered costmap
maintains an ordered list of layers, each of which tracks the data related to a
specific functionality.
--The data from each of the layers is then accumulated into the master costmap.
--For example, Static Map Layer, Obstacles Layer, Inflation Layer (inflation
process inserts a buffer zone around each lethal obstacle),
-- Proxemic Layer (creates areas around detected people more costly), etc.
LayeredCostMap ::= SEQUENCE {
      -- @details costMapLayerType
      -- It provides type of Cost Map layer, @see costMapLayerType
      costMapLayerType                  CostMapLayerType,
      -- @details timeOfCostMapUpdate
      -- Provides the time difference from the message's generation delta time to the
time of the
      -- last update of the Cost map Layer.
      timeOfCostMapUpdate               TimeOfMeasurement,
      -- @details of perGridCellCostMapValueConfigType
      -- It provides various options to indicate format of cost map.
      --These formats also vary in size (number of bits) required to specify cost map
value per grid cell
      perGridCellCostValueConfigType ::= INTEGER (1..Max), -- Max can be 4 or 8.
      -- @details of perGridCellConfidenceLevelConfigType
      -- It provides various options to select format of cofidence level value.
      --These formats also vary in size (number of bits) required to specify
confidence level per grid cell
      perGridCellConfidenceLevelConfigType ::= INTEGER (1..Max) OPTIONAL, -- Max can
be 4. It may not be needed in case of Collaboration Request Layer and Discrepancy
Handling Layer
      perGridCellCostMapValueWithConfidenceLevel     SEQUENCE SIZE(1..1024, ...) OF
PerGridCellCostMapValueWithConfidenceLevel,
         ...
}
-- @brief CostMapLayerType
-- It provides type of the Cost Map layer
CostMapLayerType ::= INTEGER {
   masterCostMapLayer                    (0), -- overall cost values after merging cost values of
all other layers
      staticCostMapLayer                 (1),
      perceivedObstacleCostMapLayer (2),
   inflationCostMapLayer                 (3),
      confirmationCostMapLayer           (4), -- informing discrepancy in cost values with
neighbors for some grid cells
      ambiguityCostMapLayer                 (5), -- sender request neighbors to help enhancing
the cost of some cells for which the vehicle may not have high confidence level to
determine a value
      collectivePerceptionCostMapLayer   (6) -- cost values of cells based on perceived
objects or cost values received from neighbors through CPM
vruCostMapLayer (7) -- cost values of cells based on perceived VRU and/or VRU
Cluster
   }(0..7)
```

TABLE 2.3-2-continued

```
PerGridCellCostMapValueWithConfidenceLevel ::= SEQUENCE {
    perGridCellCostValue            PerGridCellCostValue,
    perGridCellConfidenceLevel      PerGridCellConfidenceLevel OPTIONAL, -- It may not
be needed in case of Collaboration Request Layer and Discrepancy Handling Layer
    }
-- @brief costMapGridValue
-- cost value of each cell normalized to 0-100.
-- it is of one format (indicated by perGridCellCostValueConfigType) among several
option
-- @unit n/a
PerGridCellCostValue ::= CHOICE {
    costMapGridValueConfig1         CostMapGridValueConfig1,
    costMapGridValueConfig2         CostMapGridValueConfig2,
    -- @details perGridCellCollaborationRequestIndication
    -- used by Collaboration Request Layer. 1 bit is used per grid cell to indicate
    -- whether a cost map velue for this grid cell is requested or not. A vehicle
can request neighbors
    -- to help enhancing the cost of some cells for which the vehicle may not have
high confidence level to determine a value
    perGridCellCostCollaborationRequestIndication
    PerGridCellCostCollaborationRequestIndication,
    -- @details perGridCellDiscripancyIndication
    -- used by Discrepancy Handling Layer. 1 bit is used per grid cell to indicate
    -- discripancy of received cost value for a grid cell from the ego vehicle's
cost value for the cell.
    -- The 'Discrepancy Handling Layer' is to indicate discrepancy among cost values
of neighbors.
    perGridCellCostDiscripancyIndication    PerGridCellCostDiscripancyIndication,
-- @details PerGridCellCostVruOccupancyConfig1
-- used by VRU Cost Map Layer.
-- Specify presence of VRU or VRU Cluster of specific VRU type
    perGridCellCostVruOccupancyConfig1      PerGridCellCostVruOccupancyConfig1,
-- @details PerGridCellCostVruOccupancyConfig2
-- used by VRU Cost Map Layer.
-- Specify presence of VRU or VRU Cluster of specific VRU type
    perGridCellCostVruOccupancyConfig2      PerGridCellCostVruOccupancyConfig2
}
CostMapGridValueConfig1 ::= INTEGER {
    unknown (0), -- cost is unknown
    onePercent (1),
    oneHundredPercent (100),
    unavailable (101) -- cost could not be computed and does not apply
}(0..101)
CostMapGridValueConfig2 ::= INTEGER {
    unknown (0), -- cost is unknown
    occupied (1),       -- occupied by a detected object
    notOccupied (2),
    unavailable (3) -- cost could not be computed or does not apply
}(0..3)
PerGridCellCostCollaborationRequestIndication ::= INTEGER {
    costValueRequested (0), -- Cost value for this Grid Cell requested
    costValueNotRequested (1),
} (0..1)
PerGridCellCostDiscripancyIndication ::= INTEGER {
    costDiscrepancyReported (0), -- indicates Yes for discrepancy of received cost
value for a grid cell from the ego vehicle's cost value
    costDiscrepancyNotReported (1),
    unknown                          (2), -- discrepancy cannot be computed or unknown
}(0..3)
--@brief PerGridCellCostVruOccupancy1
PerGridCellCostVruOccupancy1 ::= INTEGER {
    free            (0), -- free of VRU and VRU Cluster
    equippedVruProfile1PedestrianPresent        (1),
    equippedVruProfile2BicyclistPresent         (2),
    equippedVruProfile3MotorcyclistPresent      (3),
    equippedVruProfile4AnimalsPresent           (4),
    nonEquippedVruProfile1PedestrianPresent     (5),
    nonEquippedVruProfile2BicyclistPresent      (6),
    nonEquippedVruProfile3MotorcyclistPresent   (7),
    nonEquippedVruProfile4AnimalsPresent        (8),
    moreThanOneVruProfileTypesPresent           (9),
    vruClusterPresent                           (10),
    vruClusterAndEquippedVrusPresent            (11),
    vruClusterAndNonEquippedVrusPresent         (12),
    vruClusterAndEquippedNonEquippedBothVrusPresent (13),
    unknown             (14) -- occupancy is not known
    unavailable         (15) -- occupancy could not be computed and does not apply
}(0..15)
-- @brief PerGridCellCostVruOccupancy2
PerGridCellCostVruOccupancy2 ::= INTEGER {
```

TABLE 2.3-2-continued

```
    free     (0), -- free of VRU and VRU Cluster
    equippedVruPresent (1),
    nonEquippedVruPresent  (2),
    vruClusterPresent                          (3),
    vruClusterAndEquippedVrusPresent (4),
    vruClusterAndNonEquippedVrusPresent (5),
    vruClusterAndEquippedNonEquippedBothVrusPresent (6),
    unknownOrUnavailable                       (7) -- occupancy is not known or
    -- occupancy could not be computed and does not apply
}(0..7)
-- @brief Cost Grid Value Confidence
-- The confidence in determination of CostGridValue of each cell
-- It can be specified in one format (as indicated by
perGridCellConfidenceLevelConfigType) among multiple formats
-- @unit n/a
PerGridCellConfidenceLevel ::= CHOICE {
costMapGridValueConfidenceConfig1      CostMapGridValueConfidenceConfig1,
costMapGridValueConfidenceConfig2      CostMapGridValueConfidenceConfig2,
...
}
CostMapGridValueConfidenceConfig1 ::= INTEGER {
    unknown     (0), -- Object confidence is unknown
    zeroToTenPercent                 (1),
    tenToTwentyPercent               (2),
    twentyToThirtyPercent (3),
    thirtyToFourtyPercent            (4),
    fortyToFiftyPercent (5),
    fiftyToSixtyPercent              (6),
    sixtyToSeventyPercent            (7),
    seventyOnePercent                (8), -- Confidence 71% to 100% is in step of 1
       seventyTwoPercent             (9),
         oneHundredPercent                (37),
    unavailable    (38) -- Confidence could not be computed and does not apply
} (0..38)
CostMapGridValueConfidenceConfig2 ::= INTEGER {
    unknown     (0), -- Cost confidence is unknown
    belowAThreshold                  (1), -- Threshold can be specified in Spec
    aboveOrEqualToThreshold                (2),
    unavailable    (3) -- Confidence could not be computed or does
--not apply
} (0..3)
END
```

Another Layered Cost Map Container providing a Collaboration Request for Perception and Efficient Handling of Discrepancy in Cost Values Among Neighbors is given below.

TABLE 2.3-3

```
CPM-LayeredCostMap-Descriptions {
itu-t (0) identified-organization (4) etsi (0) itsDomain (5) wg1 (1) ts (103324)
freeSpaceAddendum (6) version1 (1)
}
DEFINITIONS AUTOMATIC TAGS ::=
BEGIN
IMPORTS
TimeOfMeasurement, StationID
FROM CPM-CommonDataTypes-Descriptions {itu-t (0) identified-organization (4) etsi
(0) itsDomain (5) wg1 (1) ts (103324) commonDataTypes (2) version1 (1)};
-- @brief Layered Cost Map Container
-- A list of perceived Layered Cost Maps. Each Cost Map layer shall be described as
provided by
-- @see LayeredCostMap.
LayeredCostMapContainer ::= SEQUENCE {
    -- @details numberOfSupportingLayerCostMap
    -- The total number of Cost Map layers calculated by the station at the time of
generating the message to be shared by CPM.
    -- Due to the dynamic message generation rules (due to size constraint of the
CPM), this number does not have to reflect the number
    -- of Cost Map layers included in this message but states the number of
LayeredCostMap available at the sender at
    -- the time of generating the message.
      -- if LayeredCostMapContainer is transmitted, first Cost Map Layer is always
MasterCostMapLayer.
      -- Default is 1 (Master layer). Sometimes sender's MasterCostMapLayer may be
same as reported by one or more neighbors. So sender may not need to share it.
```

TABLE 2.3-3-continued

```
    numberOfLayeredCostMap  NumberOfLayeredCostMap DEFAULT 1,
  layeredCostMap SEQUENCE SIZE(1..8, ...) OF LayeredCostMap OPTIONAL,
    reportedCostMapGridArea   ReportedCostMapGridArea,
  ...
}
ReportedCostMapGridArea                    ::= SEQUENCE {
    --@details of GridCellSize
    -- ReportedCostMapGridArea is integer multiples of Grid Cell Size.
    -- That is length and width of Reported Cost Map Grid Area are integer multiples
of gridCellSizeX and gridCellSizeY respectively
    gridCellSizeX                    GridCellSizeX OPTIONAL,
    gridCellSizeY                    GridCellSizeY OPTIONAL,
    -- @details SizeofReportedGridArea
    -- It provides length and width of reported grid area
    sizeofReportedGridArea                SizeofReportedGridArea OPTIONAL,
    -- @details gridAreaCenterPoint
  -- Optional offset point about which the rectangle is centred with respect to the
reference
  -- position of the ITS-S.
    -- gridAreaCenterPoint can be partially pre-defined. For example, originating
ITS-S can be always be made in the middle of Grid Area lengthwise,
    -- so the offset is needed only widthwise.
    gridAreaCenterPoint OffsetPoint,
    -- @details semiMajorRangeOrientation
    -- Orientation of the semiMajorRangeLength of the rectangular Grid Area in the
WGS84 coordinate system.
    semiMajorRangeOrientation WGS84AngleValue,
       -- @details of GridcellCountingReference
       -- It provides start point of cell for counting and direction of counting cells
in the grid.
       -- DEFAULT or Pre-defined start point of cell can be bottomLeft cell as cell # 1
in the repoted Cost Map Grid Area
       -- and DEFAULT direction of counting can be left to right in the direction of
vehicle along x-axis first then move to leftmost next cell in y-axis
       gridcellCountingReference GridcellCountingReference OPTIONAL,
}
-- @brief number of reported Cost map layers
-- @unit n/a
NumberOfLayeredCostMap ::= INTEGER (1..8)
-- @brief GridCellSizeX
-- The length of an axis of a rectangle, used to describe the extension in a
-- particular direction.
GridCellSizeX ::= INTEGER {
  zeroPointFiveMeter (1),
  oneMeter (2),
  twoMeter (3),
  threeMeter (4),
  fourMeter (5),
  fiveMeter (6)
} (1..8)
-- @brief GridCellSizeY
-- The length of an axis of a rectangle, used to describe the extension in a
-- particular direction.
GridCellSizeY ::= INTEGER {
  zeroPointFiveMeter (1),
  oneMeter (2),
  twoMeter (3),
  threeMeter (4)
} (1..4)
-- @brief number of reported Cost map grid cells in the Reported Cost map Grid Area
-- @unit n/a
SizeofReportedGridArea ::= SEQUENCE {
-- Length and width of Reported Grid Area in terms of number of cells
nGridCellsSizeLength              INTEGER (1..200),
nGridCellsSizeWidth               INTEGER (1..50)
}
-- @brief GridcellCountingReference
-- It provides start point of cell for counting, e.g., bottomLeft cell as cell # 1
in the repoted Cost Map Grid Area @see GridcellCountingStartPoint
-- It also provides direction of counting e.g., left to right in the direction of
vehicle along x-axis first then move to leftmost next cell in y-axis, @see
GridcellCountingDirection
-- DEFAULT start point of cell is bottomLeft cell as cell # 1 in the repoted Cost
Map Grid Area
-- and DEFAULT direction of counting is left to right in the direction of vehicle
along x-axis first then move to leftmost next cell in y-axis
GridcellCountingReference ::= SEQUENCE {
gridcellCountingStartPoint GridcellCountingStartPoint,
gridcellCountingDirection GridcellCountingDirection,
...
```

TABLE 2.3-3-continued

```
}
-- @brief GridcellCountingStartPoint
-- It provides start point of cell for counting (e.g., bottomLeft cell as cell # 1)
within the reported Cost Map Grid Area
-- The point is included in the plane perpendicular to the direction of the @see
yawAngleValue.
-- DEFAULT or predefined value can be 0
GridcellCountingStartPoint ::= INTEGER {
    bottomLeft (0),
    topLeft (1),
    bottomRight (2),
    topRight (3)
} (0..3)
-- @brief GridcellCountingDirection
-- It also provides direction of counting e.g., left to right in the direction of
vehicle along x-axis first then move one step up in y-axis and agian count from
leftmost cell,
-- Default or predefined value can be 0
GridcellCountingDirection ::= INTEGER {
    leftToRightThenBottomToTop (0),
    leftToRightThenTopToBottom (1),
    rightToLeftThenBottomToTop (2),
    righttoLeftThenTopToBottom (3),
        bottomToTopThenLeftToRight (4),
        bottomToTopThenRightToLeft           (5),
    topToBottomThenLeftToRight (6),
        topToBottomThenRightToLeft           (7)
} (0..7)
-- @brief LayeredCostMap
-- Cost Map can be monolithic where there is a single Occupancy Grid with each cell
in the 2D Grid has an occupancy probability value (or a cost/penalty).
-- However, an enhanced Cost Map may implement Layered Cost Maps - where Master
Layer Cost Map is similar to Occupancy Grid of Monolithic Cost Map.
-- Instead of storing data directly in the Master layer, the layered costmap
maintains an ordered list of layers, each of which tracks the data related to a
specific functionality.
--The data from each of the layers is then accumulated into the master costmap.
--For example, Static Map Layer, Obstacles Layer, Inflation Layer (inflation
process inserts a buffer zone around each lethal obstacle),
-- Proxemic Layer (creates areas around detected people more costly), etc.
LayeredCostMap ::= SEQUENCE {
    -- @details costMapLayerType
    -- It provides type of Cost Map layer, @see costMapLayerType
    costMapLayerType                    CostMapLayerType,
    -- @details timeOfCostMapUpdate
    -- Provides the time difference from the message's generation delta time to the
time of the
    -- last update of the Cost map Layer.
    timeOfCostMapUpdate                 TimeOfMeasurement,
    -- @details of perGridCellCostMapValueConfigType
    -- It provides various options to indicate format of cost map.
    --These formats also vary in size (number of bits) required to specify cost map
value per grid cell
    perGridCellCostValueConfigType ::= INTEGER (1..Max), -- Max can be 4 or 8.
    -- @details of perGridCellConfidenceLevelConfigType
    -- It provides various options to select format of cofidence level value.
    --These formats also vary in size (number of bits) required to specify
confidence level per grid cell
    perGridCellConfidenceLevelConfigType ::= INTEGER (1..Max) OPTIONAL, -- Max can
be 4. It may not be needed in case of Collaboration Request Layer and Discrepancy
Handling Layer
    perGridCellCostMapValueWithConfidenceLevel    SEQUENCE SIZE(1..1024, ...) OF
PerGridCellCostMapValueWithConfidenceLevel,
    ...
}
-- @brief CostMapLayerType
-- It provides type of the Cost Map layer
CostMapLayerType ::= INTEGER {
    masterCostMapLayer                  (0), -- overall cost values after merging cost values of
all other layers
        staticCostMapLayer              (1),
        perceivedObstacleCostMapLayer (2),
    inflationCostMapLayer               (3),
    confirmationCostMapLayer            (4), -- informing discrepancy in cost values with
neighbors for some grid cells
        ambiguityCostMapLayer           (5), -- sender request neighbors to help enhancing
the cost of some cells for which the vehicle may not have high confidence level to
determine a value
        collectivePerceptionCostMapLayer   (6) -- cost values of cells based on perceived
objects or cost values received from neighbors through CPM
```

TABLE 2.3-3-continued

```
vruCostMapLayer (7) -- cost values of cells based on perceived VRU and/or VRU
Cluster
    }(0..7)
PerGridCellCostMapValueWithConfidenceLevel ::= SEQUENCE {
    perGridCellCostValue               PerGridCellCostValue,
    perGridCellConfidenceLevel         PerGridCellConfidenceLevel OPTIONAL, -- It may not
be needed in case of Collaboration Request Layer and Discrepancy Handling Layer
    }
-- @brief CostMapGridValue
-- cost value of each cell normalized to 0-100.
-- it is of one format (indicated by perGridCellCostValueConfigType) among several
option
-- @unit n/a
PerGridCellCostValue ::= CHOICE {
        costMapGridValueConfig1        CostMapGridValueConfig1,
        costMapGridValueConfig2        CostMapGridValueConfig2,
        -- @details perGridCellCollaborationRequest
        -- used by Collaboration Request Layer. A vehicle can request neighbors
        -- to help enhancing the cost of some cells for which the vehicle may not have
high confidence level to determine a value
-- request can be made for one or more layers
        perGridCellCostCollaborationRequest        SEQUENCE SIZE(1..Max, ...) OF
PerGridCellCostCollaborationRequest,
        -- @details perGridCellDiscripancyIndication
        -- used by Discrepancy Handling Layer.
        -- The 'Discrepancy Handling Layer' is to indicate discrepancy among cost values
of neighbors.
-- discrepancy report can be for one or more cost map layers
        perGridCellCostDiscripancyReport           SEQUENCE SIZE(1..Max, ...) OF
PerGridCellCostDiscripancyReport,
-- @details PerGridCellCostVruOccupancyConfig1
-- used by VRU Cost Map Layer.
-- Specify presence of VRU or VRU Cluster of specific VRU type
        perGridCellCostVruOccupancyConfig1         PerGridCellCostVruOccupancyConfig1,
-- @details PerGridCellCostVruOccupancyConfig2
-- used by VRU Cost Map Layer.
-- Specify presence of VRU or VRU Cluster of specific VRU type
        perGridCellCostVruOccupancyConfig2         PerGridCellCostVruOccupancyConfig2
}
PerGridCellCostCollaborationRequest ::= SEQUENCE {
-- @details collaborationRequestForCostMapLayerType
-- It specifies layer for which this request is made
-- default is for master layer
collaborationRequestForCostMapLayerType    CostMapLayerType,
-- @details perGridCellCollaborationRequestIndication
    -- used by Collaboration Request Layer. 1 bit for each Grid Cell to indicate
collaboration request.
    perGridCellCostCollaborationRequestIndication
    PerGridCellCostCollaborationRequestIndication,
--@details selfDeterminedCostValue
-- It provides ego node's current cost determination
-- which is not with sufficient confidence level
    selfDeterminedCostValue                    SelfDeterminedCostValue OPTIONAL,
--@details selfDeterminedConfidenceLevel
-- It provides ego node's confidence level for current cost determination
-- This confidence level is below acceptable level
    selfDeterminedConfidenceLevelPerGridCellConfidenceLevel OPTIONAL,
}
SelfDeterminedCostValue ::= CHOICE {
    costMapGridValueConfig1        CostMapGridValueConfig1,
    costMapGridValueConfig2        CostMapGridValueConfig2,
}
PerGridCellCostDiscripancyReport ::= SEQUENCE {
-- @details discrepancyReportForCostMapLayerType
-- It specifies layer for which this request is made
-- default is for master layer
discrepancyReportForCostMapLayerType       CostMapLayerType,
-- @details perGridCellDiscripancyIndication
    -- used by Discrepancy Handling Layer. 1 bit is used per grid cell to indicate
    -- discripancy of received cost value for a grid cell from the ego vehicle's
cost value for the cell.
    perGridCellCostDiscripancyIndication       PerGridCellCostDiscripancyIndication,
    -- @details neighborList
    -- It provides list of neighbors in discrepancy of cost value for
        -- at least one reported cell. Max can be 8 or 16
    neighborList                               SEQUENCE SIZE(1..Max, ...) OF StationID OPTIONAL,
}
CostMapGridValueConfig1 ::= INTEGER {
    unknown (0), -- cost is unknown
    onePercent (1),
```

TABLE 2.3-3-continued

```
    oneHundredPercent (100),
    unavailable (101) -- cost could not be computed and does not apply
}(0..101)
CostMapGridValueConfig1 ::= INTEGER {
    unknown (0), -- cost is unknown
    occupied (1),                            -- occupied by a detected object
    notOccupied (2),
    unavailable (3) -- cost could not be computed or does not apply
}(0..3)
PerGridCellCostCollaborationRequestIndication ::= INTEGER {
    costValueRequested (0), -- Cost value for this Grid Cell requested
    costValueNotRequested (1),
} (0..1)
PerGridCellCostDiscripancyIndication ::= INTEGER {
    costDiscrepancyReported (0), -- indicates Yes for discripancy of received cost
value for a grid cell from the ego vehicle's cost value
    costDiscrepancyNotReported (1),
    unknown                              (2), -- discrepancy cannot be computed or unknown
}(0..3)
--@brief PerGridCellCostVruOccupancy1
PerGridCellCostVruOccupancy1 ::= INTEGER {
    free          (0), -- free of VRU and VRU Cluster
    equippedVruProfile1PedestrianPresent (1),
    equippedVruProfile2BicyclistPresent              (2),
    equippedVruProfile3MotorcyclistPresent           (3),
    equippedVruProfile4AnimalsPresent                (4),
    nonEquippedVruProfile1PedestrianPresent          (5),
    nonEquippedVruProfile2BicyclistPresent           (6),
    nonEquippedVruProfile3MotorcyclistPresent   (7),
    nonEquippedVruProfile4AnimalsPresent             (8),
    moreThanOneVruProfileTypesPresent                (9),
    vruClusterPresent                           (10),
    vruClusterAndEquippedVrusPresent                 (11),
    vruClusterAndNonEquippedVrusPresent              (12),
    vruClusterAndEquippedNonEquippedBothVrusPresent (13),
    unknown          (14) -- occupancy is not known
    unavailable        (15) -- occupancy could not be
-- computed and does not apply
}(0..15)
-- @brief PerGridCellCostVruOccupancy2
PerGridCellCostVruOccupancy2 ::= INTEGER {
    free    (0), -- free of VRU and VRU Cluster
    equippedVruPresent (1),
    nonEquippedVruPresent    (2),
    vruClusterPresent     (3),
    vruClusterAndEquippedVrusPresent (4),
    vruClusterAndNonEquippedVrusPresent (5),
    vruClusterAndEquippedNonEquippedBothVrusPresent (6),
    unknownOrUnavailable                       (7) -- occupancy is not known or
-- occupancy could not be computed and does not apply
}(0..7)
-- @brief Cost Grid Value Confidence
-- The confidence in determination of CostGridValue of each cell
-- It can be specified in one format (as indicated by
perGridCellConfidenceLevelConfigType) among multiple formats
-- @unit n/a
PerGridCellConfidenceLevel ::= CHOICE {
costMapGridValueConfidenceConfig1     CostMapGridValueConfidenceConfig1,
costMapGridValueConfidenceConfig2     CostMapGridValueConfidenceConfig2,
...
}
CostMapGridValueConfidenceConfig1 ::= INTEGER {
    unknown     (0), -- Object confidence is unknown
    zeroToTenPercent                    (1),
    tenToTwentyPercent                  (2),
    twentyToThirtyPercent (3),
    thirtyToFourtyPercent               (4),
    fortyToFiftyPercent (5),
    fiftyToSixtyPercent                 (6),
    sixtyToSeventyPercent               (7),
    seventyOnePercent                   (8), -- Confidence 71% to 100% is in step of 1
      seventyTwoPercent                 (9),
       oneHundredPercent                  (37),
    unavailable    (38) -- Confidence could not be computed and does not apply
} (0..38)
CostMapGridValueConfidenceConfig2 ::= INTEGER {
    unknown     (0), -- Cost confidence is unknown
    belowAThreshold                     (1), -- Threshold can be specified in Spec
    aboveOrEqualToThreshold             (2),
    unavailable    (3) -- Confidence could not be computed or does
```

TABLE 2.3-3-continued

```
--not apply
} (0..3)
END
```

2.4. CPM Dissemination

Point-to-multipoint communication, specified in ETSI EN 302 636-3 V1.1.2 (2014-03) is used for transmitting CPMs 200, 300.

2.4.1. CPM Generation

2.4.1.1. CPM Generation Frequency Management

A CPM generation event results in the generation of one CPM 200, 300. The generated CPM 200, 300 may be segmented according to clause 6.1.4 of [TS103324] and/or as modified as discussed herein. The minimum time elapsed between the start of consecutive CPM generation events is equal to or larger than T_GenCpm. T_GenCpm is limited to T_GenCpmMin≤T_GenCpm≤T_GenCpmMax, where T_GenCpmMin=100 ms and T_GenCpmMax=1000 ins.

In case of ITS-G5, T_GenCpm should be managed according to the channel usage requirements of Decentralized Congestion Control (DCC) as specified in ETSI TS 102 724. The parameter T_GenCpm should be provided by the management entity in the unit of milliseconds. If the management entity provides this parameter with a value above T_GenCpmMax, T_GenCpm should be set to T_GenCpmMax and if the value is below T_GenCpmMin or if this parameter is not provided, the T_GenCpm should be set to T_GenCpmMin. The parameter T_GenCpm represents the currently valid lower limit for the time elapsed between consecutive CPM generation events. T_GenCpm represents the minimum time to elapse between two transmission events.

In case of LTE-V2X PC5, T_GenCpm is managed in accordance to the congestion control mechanism defined by the access layer in ETSI TS 103 574.

2.4.1.2. Perceived Object Container Inclusion Management

A CPM 200, 300 generated as part of a generation event includes information about perceived objects currently known to the Tx ITS-S by adding a PerceivedObject DF to the perceivedObjectContainer. An object with a sufficient confidence level and not subject to redundancy mitigation techniques is selected for transmission from the object list as a result of the current CPM generation event if the object complies with any of the following conditions: (1) If the assigned object class of highest confidence does not correspond to either the person or animal class: (1.a) The object has first been detected by the perception system after the last CPM generation event, (1.b) The Euclidian absolute distance between a current estimated position of the reference point of the object and the estimated position of the reference point of this object lastly included in a CPM 200, 300 exceeds minReferencePointPositionChangeThreshold, and (1.c) The difference between the current estimated ground speed of the reference point of the object and the estimated absolute speed of the reference point of this object lastly included in a CPM 200, 300 exceeds minGroundSpeedChange Threshold The difference between the orientation of the vector of the current estimated ground velocity of the reference point of the object and the estimated orientation of the vector of the ground velocity of the reference point of this object lastly included in a CPM 200, 300 exceeds minGroundVelocityOrientationChangeThreshold; (2) If the assigned object class of highest confidence corresponds to either the person or animal class: (2.a) A new object (of class person or animal) is detected after the last CPM generation event; and (2.b) If the object list contains at least one object of class person or animal which has not been included in a CPM 200, 300 in a predefined or configured amount of time (e.g., in the past 500 ms), all objects of class person or animal should be included in the currently generated CPM 200, 300.

The generation rules for objects of class person or animal ensure that there are no individual inclusion cycles for previously included objects of these two classes to reduce message generation frequency.

To further reduce the number of generated messages, at each message generation event, objects not belonging to either the person or animal class to be included in a CPM 200, 300 in the next generation event (i.e. after T_GenCpm) can already be included in the currently generated CPM 200, 300. For this purpose, objects that are not selected for transmission in the currently generated CP message may be predicted to the next CP message generation event (i.e. after T_GenCpm), for example, assuming a constant velocity model. Following this prediction, all objects that would then need to be included in a CPM 200, 300 in the next generation event may also be selected for inclusion in the currently generated CPM 200, 300.

To further optimize the size of CPM 200, 300 and the number of CPM message segments, a CPM 200, 300 is generated as part of a generation event that includes Layered cost Map by adding a LayeredCostMapContainer. Inclusion of perceivedObjectContainer or LayeredCostMapContainer or both is up to the ITS-S implementation.

2.4.1.3. Sensor Information Container Inclusion Management

A CPM 200, 300 generated as part of a generation event includes a SensorInformationContainer whenever the time elapsed since the last time a CPM 200, 300 included a SensorInformationContainer is equal or greater than T_AddSensorInformation, where T_AddSensorInformation is some predefined or configured value (e.g., T_AddSensorInformation=1000 ms).

2.4.1.4. Free Space Addendum Container Inclusion Management

Confirmed free space in a CPM 200, 300 may be indicated as part of the SensorInformationContainer. Clause 7.7 of [TS103324] details how the combination of the free space indication (FreeSpaceConfidence DE in the SensorInformationContainer) and described objects is combined to derive the free space by using a tracing and shadowing approach. If LayeredCostMapContainer is included in the CPM 200, 300, cost map grid values are also be considered to derive the free space as described in clause 7.7 of [TS103324]. The FreeSpaceAddendumContainer is added whenever a free space area as would be computed on the receiver side using the simple tracing approach detailed in clauses 7.5 and 7.7 of [TS103324] does not reflect the detected free space of the ITS sub-system generating the CPM 200, 300.

In case of static information, such as a permanently shadowed region, the FreeSpaceAddendumContainer is added whenever the SensorInformationContainer is added to the currently generated CPM 200, 300. If a free space area falls inside a reported cost map grid in the LayeredCost- MapContainer, it is up to ITS-S implementation to include or not to include a FreeSpaceAddendum DF to the FreeSpaceAddendumContainer for that free space area.

A CPM 200, 300 generated as part of a generation event may include additional information about monitored free space areas known to the Tx ITS-S by adding a FreeSpaceAddendum DF to the freeSpaceAddendumContainer.

A particular FreeSpaceAddendum is added to the CPM 200, 300 if the simple tracing approach to compute free space areas on a receiving ITS-S does not match the representation of the detected free space on the Tx ITS-S.

Consecutive inclusion of a FreeSpaceAddendum in the CPM 200, 300 is contingent to: (1) In case the particular FreeSpaceAddendum DF employs the AreaPolygon DF: A FreeSpaceAddendum DF is added to the current CPM 200, 300 if the Eucledian relative distance of any OffsetPoint of the polygon relative to the corresponding OffsetPoint of this polygon lastly included in a CPM 200, 300 exceeds minOffsetPointPositionChangeThreshold or if the number of OffsetPoints to describe the polygon changes; and/or (2) in case the particular FreeSpaceAddendum DF employs the AreaCircular DF, AreaEllipse DF or AreaRectangle DF: (2.a) a FreeSpaceAddendum DF is added to the current CPM 200, 300 if the difference between the current Euclidian distance of the NodeCenterPoint of the described free space area and the Euclidian distance of the NodeCenterPoint of the same described free space area and lastly included in a CPM 200, 300 exceeds minNodeCenterPointPositionChangeThreshold; and/or (2.b) a FreeSpaceAddendum DF is added to the current CPM 200, 300 if the difference between the current Radius or SemiRangeLength of the described free space area and the Radius or SemiRangeLength of the same described free space area lastly included in a CPM 200, 300 exceeds minRadiusOrSemiRangeLengthChangeThreshold.

A FreeSpaceAddendum DF is added to the current CPM 200, 300 if the difference between the current semiMajorRangeOrientation of the described free space area and the semiMajorRangeOrientation of the same described free space area lastly included in a CPM 200, 300 exceeds minSemiMajorRangeOrientationChangeThreshold. 2.4.1.5. Layered Cost Map Container Inclusion Management A CPM 200, 300 is generated as part of a generation event and it may include the updated Layered cost Map available at the Tx ITS-S by adding a LayeredCostMapContainer. aggregated cost map layer 410 is included along with zero or more other cost map layers such as the static cost map layer 401, the perceived objects cost map layer 402, the inflation cost map layer 403, the CP cost map layer 404, the discrepancy handling cost map layer 405, and/or the collaboration request cost map layer 406 in the LayeredCostMapContainer in a CPM 200, 300.

The aggregated cost map layer 410 is selected for transmission as a result of the current CPM generation event under one or more of the following conditions: (1) the aggregated cost map layer 410 is added to the current CPM 200, 300 if grid cell cost values or grid cell confidence levels or both of cells changes for more than a minPercentageOfCellsWithAggregatedCostOrConfidenceChangeThreshold of total cells in the ReportedCostMapGridArea compared to the grid cell cost values or grid cell confidence levels reported lastly in a CPM 200, 300; and/or (2) a LayeredCostMapContainer DF with the aggregated cost map layer 410 is added to the current CPM 200, 300 if the difference between the current Euclidian distance of the NodeCenterPoint of the reported Rectangular Cost Map Grid Area and the Euclidian distance of the NodeCenterPoint of the reported Rectangular Cost Map Grid Area lastly included in a CPM 200, 300 exceeds minNodeCenterPointOfCostMapGridAreaPositionChangeThreshold; (3) a LayeredCostMapContainer DF with the aggregated cost map layer 410 is added to the current CPM 200, 300 if the difference between the current Length (or width) of the Rectangular Cost Map Grid Area to be reported and the Length (or width) of the reported Rectangular Cost Map Grid Area lastly included in a CPM 200, 300 exceeds minLengthOrWidthChangeThreshold; (4) LayeredCostMapContainer DF with the aggregated cost map layer 410 is added to the current CPM 200, 300 if the difference between the current orientation (semiMajorRangeOrientation) of the reported Rectangular Cost Map Grid Area and the semiMajorRangeOrientation of the reported Rectangular Cost Map Grid Area lastly included in a CPM 200, 300 exceeds minSemiMajorRangeOfCostMapGridAreaOrientationChangeThreshold; and/or (5) the aggregated cost map layer 410 is added to the current CPM 200, 300 if the time elapsed since the last time the aggregated cost map layer 410 was included in a CPM 200, 300 exceeds T_GenCpmMax.

The discrepancy handling cost map layer 405 and/or the collaboration request cost map layer 406 are selected for transmission as a result of the current CPM generation event under one or more of the following conditions: (1) if the Tx ITS-S identifies that grid cell cost values or grid cell confidence levels or both for more than a minPercentageOfCellsWithCostOrConfidenceDiscrepancyThreshold of total cells in the Reported Cost Map Grid Area differ from grid cell cost values or grid cell confidence levels reported by neighbors for the same cost map grid area and such discrepancy has not been reported by neighbors since last CPM 200, 300 transmission by this ITS-S, ITS-S may transmit the discrepancy handling cost map layer 405 in the current CPM 200, 300; and/or (2) if the on-board sensors at Tx ITS-S could not determine perception with a confidence level higher than minConfidenceLevelThreshold for more than a minPercentageOfCellsWithLowConfidenceLevelForCollaborationRequestThreshold of total cells in its current aggregated cost map layer 410 and the Tx ITS-S has not included the collaboration request cost map layer 406 in its last CPM 200, 300 transmission, the ITS-S may send the collaboration request cost map layer 406 in the current CPM 200, 300.

Other cost map layers (e.g., static cost map layer 401, perceived objects cost map layer 402, inflation cost map layer 403, and/or CP cost map layer 404 as described previously and/or in section 7.8 of [TS103324]) are optionally selected for transmission as a result of the current CPM 200, 300 generation event under one or more of the following conditions: (1) a cost map layer (e.g., static cost map layer 401, perceived objects cost map layer 402, inflation cost map layer 403, and/or CP cost map layer 404 as described previously and/or in section 7.8 of [TS103324]) is added to the current CPM 200, 300 if cost values or confidence levels or both of cells in the cost map layer changes for more than minPercentageOfCellsWithCostOrConfidenceChangeThreshold of total cells in the ReportedCostMapGridArea compared to the grid cell cost values or grid cell confidence levels reported lastly in a CPM 200, 300 for the same cost map layer; and/or (2) a cost map layer is added to the current CPM 200, 300 if the time elapsed since the last time the cost map layer was included in a CPM 200, 300 exceeds maxTimesSkipCostMapTransmission times T_GenCpmMax.

2.4.2. CPM Segmentation

The size of a generated CPM 200, 300 should not exceed MTU_CPM which the CPS supports via the NF-SAP. The parameters of MTU_CPM (e.g., size) depends on the MTU of the access layer technology (MTU_AL) over which the CPM 200, 300 is transported. MTU_CPM should be less than or equal to MTU_AL reduced by the header size of the facilities layer protocol (HD_CPM) and the header size of the networking and transport layer protocol (HD_NT) with MTU_CPM≤MTU_AL−HD_CPM−HD_NT.

The MTU_AL per access layer technology is defined in [EN302663], ETSI TS 103 613, and their references. The header of the networking and transport layer protocol includes the BTP header and the GeoNetworking header. The size of BTP header is defined in ETSI EN 302 636-5-1 and the size of GeoNetworking protocol header per intended packet transport type is defined in ETSI EN 302 636-4-1.

Message segmentation occurs when the size of the ASN.1 UPER encoded CPM 200, 300 including all perceived object and cost map layer candidates selected for transmission exceeds MTU_CPM. The order of including layered cost map container versus perceived object container is left up to ITS-S implementation. The selected perceived object candidates is/are included in a CPM 200, 300 segment in a descending order of a per-object utility function defined as the sum of the following parameters: $p_{conf}$ (0 if the object confidence is unknown, unavailable or equal to the minimum object confidence level, 1 if it is 100%, linear interpolation between the minimum object confidence level and 100%); pros (0 if the Euclidian absolute distance between the current estimated position of the reference point of the object and the estimated position of the reference point of this object lastly included in a CPM 200, 300 is 0 m, 1 if it is equal or greater than 8 m, linear interpolation between 0 and 8 m); $p_{speed}$ (0 if the difference between the current estimated ground speed of the reference point of the object and the estimated absolute speed of the reference point of this object lastly included in a CPM 200, 300 is 0 m/s, 1 if it is equal or greater than 1 m/s, linear interpolation between 0 and 1 m/s); $p_{head}$ (0 if the difference between the orientation of the vector of the current estimated ground velocity of the reference point of the object and the estimated orientation of the vector of the ground velocity of the reference point of this object lastly included in a CPM 200, 300 is 0 degrees, 1 if it is equal or greater than 8 degrees, linear interpolation between 0 and 8 degrees); and/or prime (0 if time elapsed since the last time the object was included in a CPM 200, 300 is less or equal than 0.1 s, 1 if it is equal or greater than 1 s, linear interpolation between 0.1 and 1 s).

The selected cost map layer candidates are included in a CPM segment in the descending order of aggregated cost map layer 410, perceived objects cost map layer 402, inflation cost map layer 403, discrepancy handling cost map layer 405, collaborative request cost map layer 406, CP cost map layer 404, and static cost map layer 401.

A segment should be populated with selected objects as long as the resulting ASN.1 UPER encoded message size of the segment to be generated does not exceed MTU_CPM. Segments are generated in this fashion until all selected perceived objects and selected cost map layers are included in a CPM segment. Each segment is transmitted at the next transmission opportunity.

In case the SensorInformationContainer also needs to be transmitted, it should be added to a CPM segment if the resulting ASN.1 UPER encoded CPM segment size does not exceed MTU_CPM.

This procedure may result in the generation of a CPM segment only including the SensorInformationContainer. Message segmentation is indicated by populating the perceivedObjectContainerSegmentInfo DF. All message segments should indicate the same generationDeltaTime DE. Message segments should be transmitted in the same order in which they have been generated. This is to ensure that segments containing objects of higher priority are not deferred in favour of segments containing objects of lower priority by lower layer mechanisms.

2.4.3. CPM Time Requirements

2.4.3.1. CPM Generation Time

Besides the CPM generation frequency, the time required for the CPM generation and the timeliness of the data taken for the message construction are decisive for the applicability of data in the receiving ITS-Ss. In order to ensure proper interpretation of received CPMs 200, 300, each CPM 200, 300 is time-stamped. An acceptable time synchronization between the different ITS-Ss is expected.

The time required for a CPM generation is less than 50 ms. The time required for a CPM generation refers to the time difference between time at which a CPM generation is triggered and the time at which the CPM 200, 300 is delivered to the Networking & Transport layer.

2.4.3.2. CPM timestamp

A reference timestamp provided in a CPM 200, 300 disseminated by an ITS-S corresponds to the time at which the reference position of the originating ITS-S provided in the CpmManagementContainer DF was determined. The format and range of the timestamp is defined in clause B.3 of ETSI EN 302 637-2.

The difference between CPM generation time and reference timestamp should be less than 32 767 ms. The reference timestamp selection can depend on the architecture of the road side equipment. For example, the reference timestamp could be selected by the sensor fusion system before requesting the generation of the CPM 200, 300. This requirement is set to avoid timestamp wrap-around complications.

2.4.4. CPM Dissemination Constraints

2.4.4.1. General Confidence Constraints

Several data elements of the CPM 200, 300 may vary with regard to accuracy and confidence. For these data elements, data frames are specified providing data elements together with confidence information.

2.4.4.2. Security Constraints

The security mechanisms for ITS consider the authentication of messages transferred between ITS-Ss with certificates. A certificate indicates its holder's permissions to send a certain set of messages and optional privileges for specific DEs within these messages. The format for the certificates is specified in ETSI TS 103 097.

Within the certificate, the permissions and privileges are indicated by a pair of identifiers, the ITS-AID and the SSP.

The ITS-Application Identifier (ITS-AID) as given in ETSI TR 102 965 indicates the overall type of permissions being granted. For example, there is an ITS-AID that indicates that the sender is entitled to send CPMs 200, 300.

The Service Specific Permissions (SSP) is a field that indicates specific sets of permissions within the overall permissions indicated by the ITS-AID. For example, there may be an SSP value associated with the ITS-AID for CPM 200, 300 that indicates that the sender is entitled to send CPMs 200, 300 for a specific role.

An incoming signed CPM 200, 300 is accepted by the receiver if the certificate is valid and the CPM 200, 300 is consistent with the ITS-AID and SSP in its certificate.

2.4.4.3. General Priority Constraints

The priority constraint is given by the Traffic Class as specified in ETSI EN 302 636-4-1.

2.4.4.4. Quality and Confidence Indication of Provided Data

2.4.4.4.1. Object Inclusion and Confidence

Objects to be included in the CP message should be shared with other ITS-Ss with the objective of increasing traffic safety. Shared objects are therefore used by safety applications on receiving ITS-S. Objects relevant for traffic safety are either static, i.e. do not move but are located on the driving lanes, or dynamic, i.e. move or have the ability to move.

The objective of transmitted objects as part of the CP Message is not to share and to compare traffic-regulation information such as traffic signs and traffic light information. Instead, data about objects which cannot be available to other ITS-Ss as their presence is only temporary (e.g., traffic participants or temporary obstacles) need to be given priority.

Objects need to be located on the driving lanes or adjacent to lanes (e.g., pedestrian walks). Map matching algorithms on the disseminating ITS-Ss may be used for determining whether an object is located on a lane.

The methodology to compute object confidence will be unanimous between Tx ITS-S to ensure that upon reception of a CPM 200, 300, the confidence indication can be clearly interpreted. In sensor fusion systems, confidence computation is usually proprietary to the implementation and therefore contradicts the requirements when sharing sensor data. Therefore, suitable confidence metrics should be identified (e.g., in ISO/AUTOSAR), to provide a harmonized description.

2.4.4.4.2. Freespace Confidence

Receivers (Rx ITS-Ss) are able to combine the reported detection area of the SensorInformationContainer and the reported objects to derive free space between the objects. To advertise that the Tx ITS-S is able to provide measurements about actual confirmed empty space that a receiving moving ITS-S may drive into, the optionalfreeSpaceConfidence DE of a particular SensorInformation should be used.

A semantic segmentation process is a key step in identifying objects and free space within the field of view of a sensor Schumann et al., "Semantic segmentation on radar point clouds," 2018 21st International Conference on Information Fusion (FUSION) (10 Jul. 2018) ("[Schumann]"), Yuan Wang et al.: "PointSeg: Real-Time Semantic Segmentation Based on 3D LiDAR Point Cloud", arXiv: 1807.06288v8 (25 Sep. 2018) ("[YuanWang]"). Depending on the employed sensor measurement and object fusion principles, detected objects can be described with bounding boxes of fixed size. By combining the knowledge about the Tx ITS-S's sensory capabilities, i.e. its detection area, with received detected objects, free space can be can be computed by a receiving ITS-S. When objects and free space are classified, applicable confidence levels should be determined by using an applicable methodology (e.g., AI/ML techniques; see e.g., Brotcm et al., "Determining the Confidence Levels of Sensor Outputs using Neural Networks", Department of Electrical Engineering, University of Saskatchwan (1995), https://inis.iaea.org/collection/NCLCollectionStore/_Public/28/075/28075825.pdf).

The confidence level of a free space can be defined as the ratio of the number of detected evidences of free space with respect to the total number of detection attempts within a specified time period such as T_GenCpmMax. The specific technique for sematic segmentation, multi sensor data fusion, and confidence level calculations for object/free space are out of scope for the present document and any feasible technique should be used.

2.4.4.5. Redundancy Mitigation Techniques

Various redundancy techniques as discussed in ETSI TS 103 324 V0.0.17 (2020-04) ("[TS103324]") and/or ETSI TR 103 562 V2.1.1 (2019-12) ("[TR103562]") may be used.

2.5. CPM Parameters Values

The values to be used for the parameters discussed herein are provided by Table 2.5-1 and Table 2.5-2. Table 2.5-1 shows parameters for CPM generation. The parameters may be set on individual devices or system wide and may depend on external conditions or be independent of them.

TABLE 2.5-1

Parameters for CPM generation

| Parameter | Type | Meaning | Example Value |
|---|---|---|---|
| T_GenCpmMin | Time in ms | The minimum time elapsed between the start of consecutive CPM generation events. | 100 |
| T_GenCpmMax | Time in ms | The maximum time elapsed between the start of consecutive CPM generation events | 1 000 |
| T_AddSensorInformation | Time in ms | The maximum time elapsed between consecutive inclusion of SensorInformationContainer in the CPM. | 1000 |
| minReferencePointPositionChangeThreshold | distance (in m) | Minimum change in Euclidian absolute distance between the current estimated position of the reference point of the object and the estimated position of the reference point of this object lastly included in a CPM in order to select the object for transmission in the current CPM. This restricts inclusion of perceived object in CPM too frequently. | 4 |
| minGroundSpeedChangeThreshold | Speed (in m/s) | Minimum change in ground speed of the reference point of the object and the estimated absolute speed of the reference point of this object lastly included in a CPM in order to select the object for transmission in the current CPM. This restricts inclusion of perceived object in CPM too frequently. | 0.5 |
| minGroundVelocityOrientationChangeThreshold | orientation (in degrees) | Minimum change in the orientation of the vector of the current estimated ground velocity of the reference point of the object and the estimated orientation of the vector of the ground velocity of the reference point of this object lastly included in a CPM in order to select the object for transmission in the current CPM. This restricts inclusion of perceived object in CPM too frequently. | 4 |

TABLE 2.5-1-continued

Parameters for CPM generation

| Parameter | Type | Meaning | Example Value |
|---|---|---|---|
| minOffsetPointPositionChangeThreshold | distance (in m) | Minimum change in Euclidian relative distance of any OffsetPoint of the polygon describing polygon free space area and the corresponding OffsetPoint of this polygon lastly included in a CPM in order to add a FreeSpaceAddendum DF in the current CPM corresponding to this polygon free space area. This restricts inclusion of FreeSpaceAddendum DF in CPM for a free space area too frequently. | 4 |
| minNodeCenterPointPositionChangeThreshold | distance (in m) | Minimum change in Euclidian distance of the NodeCenterPoint of the described circular or ellipse free space area and the Euclidian distance of the NodeCenterPoint of the same described free space area lastly included in a CPM in order to add a FreeSpaceAddendum DF in the current CPM corresponding to this circular or ellipse free space area. This restricts inclusion of FreeSpaceAddendum DF in CPM for a free space area too frequently. | 4 |
| minRadiusOrSemiRangeLengthChangeThreshold | length (in m) | Minimum change in Radius or SemiRangeLength of the described free space area and the Radius or SemiRangeLength of the same described free space area lastly included in a CPM in order to add a FreeSpaceAddendum DF in the current CPM corresponding to this free space area. This restricts inclusion of FreeSpaceAddendum DF in CPM for a free space area too frequently. | 4 |
| minSemiMajorRangeOrientationChangeThreshold | orientation (in degrees) | Minimum change in the current semiMajorRangeOrientation of the described free space area and the semiMajorRangeOrientation of the same described free space area lastly included in a CPM in order to add a FreeSpaceAddendum DF in the current CPM corresponding to this free space area. This restricts inclusion of FreeSpaceAddendum DF in CPM for a free space area too frequently. | 4 |
| minPercentageOfCellsWithAggregatedCostOrConfidenceChangeThreshold | Percentage (in %) | Minimum fraction of total cells in the ReportedCostMapGridArea for which cost values or confidence levels or both change(s) in the Aggregated Cost map Layer compared to the cost values or confidence levels in the Aggregated Cost map Layer reported lastly in a CPM in order to include LayeredCostMapContainer with Aggregated cost map layer in the current CPM. This restricts inclusion of Aggregated Cost map layer in CPM too frequently. | 10 to 30 |
| minNodeCenterPointOfCostMapGridAreaPositionChangeThreshold | distance (in m) | Minimum change in Euclidian distance of the NodeCenterPoint of the Reported Cost Map Grid Area and the Euclidian distance of the NodeCenterPoint of the same Reported Cost Map Grid Area lastly included in a CPM in order to include LayeredCostMapContainer with Aggregated cost map layer in the current CPM. This restricts inclusion of Aggregated Cost map layer in CPM too frequently. | 4 |
| minLengthOrWidthChangeThreshold | length (in m) | Minimum change in Length (or width) of the Reported Cost Map Grid Area and the Length (or width) of the same Reported Cost Map Grid Area lastly included in a CPM in order to include LayeredCostMapContainer with Aggregated cost map layer in the current CPM. This restricts inclusion of Aggregated Cost map layer in CPM too frequently. | 2 |
| minSemiMajorRangeOfCostMapGridAreaOrientationChangeThreshold | orientation (in degrees) | Minimum change in the current semiMajorRangeOrientation of the Reported Cost Map Grid Area and the semiMajorRangeOrientation of the Reported Cost Map Grid Area lastly included in a CPM in order to include LayeredCostMapContainer with Aggregated cost map layer in the current CPM. This restricts inclusion of Aggregated Cost map layer in CPM too frequently. | 4 |
| minPercentageOfCellsWithCostOrConfidenceDiscrepancyThreshold | Percentage (in %) | Minimum fraction of total cells in the ReportedCostMapGridArea for which grid cell cost values or grid cell confidence levels or both change(s) compared to the grid cell cost values or grid cell confidence levels reported lastly in a CPM in order to include LayeredCostMapContainer with Discrepancy Handling Cost Map Layer in the current CPM. This restricts inclusion of Discrepancy Handling Cost Map Layer in CPM too frequently. | 10 to 30 |
| minConfidenceLevelThreshold | Percentage (in %) | Minimum confidence level for calculated cost value of a cell in cost map grid to be considered acceptable. | 70-90 |
| minPercentageOfCellsWithLowConfidenceLevelForCollaborationRequestThreshold | Percentage (in %) | Minimum fraction of total cells in the ReportedCostMapGridArea for which transmitting ITS-S could not determine perception with a confidence level higher than minConfidenceLevelThreshold in order to include Collaboration Request Cost Map Layer in the current CPM. | 10 to 30 |

TABLE 2.5-1-continued

Parameters for CPM generation

| Parameter | Type | Meaning | Example Value |
|---|---|---|---|
| minPercentageOfCellsWithCostOrConfidenceChangeThreshold | Percentage (in %) | This restricts inclusion of Collaboration Request Cost Map Layer in CPM too frequently. Minimum fraction of total cells in the ReportedCostMapGridArea for which cost values or confidence levels or both change(s) in a Cost map Layer compared to the cost values or confidence levels in the Cost map Layer reported lastly in a CPM in order to include this cost map layer in the current CPM. This restricts inclusion of Cost map layer (such as Static, Perceived Objects, Inflation and collective Perception cost map layers) in CPM too frequently. | 10 to 30 |
| maxTimesSkipCostMapTransmission | Integer | It specifies maximum time that can be elapsed between the consecutive inclusion of any cost map layer (such as Static, Perceived Objects, Inflation or collective Perception cost map layer) other than Aggregated Cost map layer in CPM as (maxTimesSkipCostMapTransmission * T_GenCpmMax). | 1 to 5 |

The parameters in Table 2.5-2 govern the ITS-S decision to update various cost map layers. The parameters may be set on individual stations or system wide and may depend on external conditions or be independent of them.

TABLE 2.5-2

Parameters for Cost Map Layers Update

| Parameter | Type | Meaning | Example Range |
|---|---|---|---|
| T_Aggregated_CML_Update | Time (in ms) | Periodicity to update Aggregated cost map layer periodically | [100 ms to 1000 ms] |
| T_CollectivePerception_CML_Update | Time (in ms) | Periodicity to update Collective Perception Cost map layer periodically | [100 ms to 1000 ms] |
| T_Inflation_CML_Update | Time (in ms) | Periodicity to update Inflation cost map layer periodically | [100 ms to 1000 ms] |

3. ITS-Station Configurations and Arrangements

Figure 6:
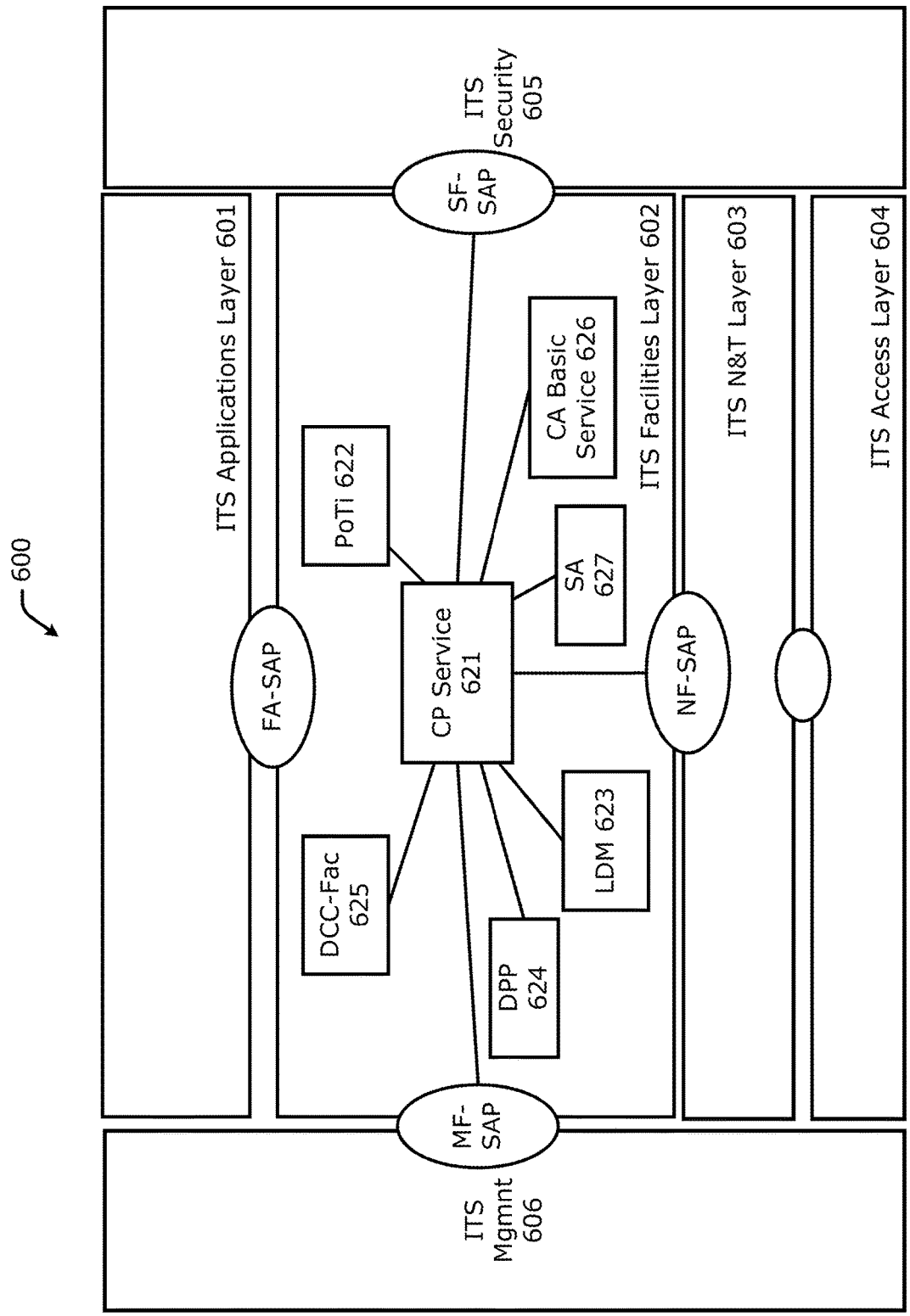
FIG. 6 depicts an ITS-S reference architecture.

FIG. 6 shows an ITS-S reference architecture 600. Some or all of the components depicted by FIG. 6 follows the ITSC protocol, which is based on the principles of the OSI model for layered communication protocols extended for ITS applications. The ITSC 600 includes an access layer 604 that corresponds with the OSI layers 1 and 2, a networking & transport (N&T) layer 603 that corresponds with OSI layers 3 and 4, the facilities layer which corresponds with OSI layers 5, 6, and at least some functionality of OSI layer 7, and an applications layer 601 that corresponds with some or all of OSI layer 7. Each of these layers are interconnected via respective interfaces, SAPs, APIs, and/or other like connectors or interfaces.

The applications layer 601 provides ITS services, and ITS applications are defined within the application layer 601. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S 110 provides ITS applications to vehicle drivers and/or passengers, and may require an interface for accessing in-vehicle data from the in-vehicle network or in-vehicle system. For deployment and performances needs, specific instances of a V-ITS-S 110 may contain groupings of Applications and/or Facilities.

The facilities layer 602 comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Collective Perception Services (CPS), Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VBS), Decentralized Environmental Notification (DEN) basic service, maneuver coordination services (MCS), and/or the like. For a V-ITS-S 110, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[TS102894-1]").

The CP Service (CPS) (also referred to as a "CP Basic Service" or the like) is a facilities layer entity in the ITS-S architecture as defined in [EN302665]. The CPS may interface with other entities of the Facilities layer and with ITS applications to collect relevant information for CPM generation and for forwarding received CPM 200, 300 content for further processing. FIG. 6 depicts the CPS within the ITS-S architecture along with the logical interfaces to other layers and entities within the Facilities layer.

Collective Perception (CP) is the concept of sharing a perceived environment of an ITS-S based on perception sensors. In contrast to Cooperative Awareness (CA), an ITS-S broadcasts information about its current (e.g., driving) environment rather than about its current state. Hence, CP is the concept of actively exchanging locally perceived objects between different ITS-Ss by means of V2X communication technology (or V2X RAT). CP decreases the ambient uncertainty of ITS-Ss by contributing information to their mutual Field-of-Views. The CPM 200, 300 enables ITS-Ss to share information about objects in the surrounding, which have been detected by sensors, cameras, or other information sources mounted or otherwise accessible to the Tx ITS-S.

The CPS differs fundamentally from the CA basic service (see e.g., ETSI EN 302 637-2 V1.4.1 (2019-04) ("[EN302637-2]")), as it does not focus on Tx data about the current state of the disseminating ITS-S but about its perceived environment. To avoid broadcasting CPMs 200, 300 about the same object by multiple ITS-Ss, the CP service may filter detected objects to be included in CPMs 200, 300 (see e.g., clause 6.1 of [TS103324]).

FIG. 6 shows the CPS-specific functionality, including interfaces mapped to the ITS-S architecture. The CPS-specific functionality is centered around the CPS Basic Service 621 located in the facilities layer. The CP Basic Service 621 is a facility at the ITS-S facilities layer 602 configurable or operable to generate, receive, and process CPMs.

The CP Basic Service 621 may operate a CPM protocol, which is an ITS facilities layer protocol for the operation of the CPM 200, 300 transmission (Tx) and reception (Rx). The CPM 200, 300 is a CP basic service PDU including CPM data and an ITS PDU header. The CPM data comprises a partial or complete CPM payload, and may include the various data containers and associated values/parameters as discussed herein. The CPS Basic Service 621 consumes data from other services located in the facilities layer, and is linked with others application support facilities. The CPS Basic Service 621 is responsible for Tx of CPMs 200, 300.

The entities for the collection of data to generate a CPM 200, 300 include the Device Data Provider (DDP) 624, the PoTi 622, and the LDM 623. For subsystems of V-ITS-Ss 110, the DDP 624 is connected with the in-vehicle network and provides the vehicle state information. For subsystems of R-ITS-Ss 130, the DDP 624 is connected to sensors mounted on the roadside infrastructure such as poles, gantries, gates, signage, and the like.

The PoTi 622 provides the position of the ITS-S and time information. The LDM 623 is a database in the ITS-S, which in addition to on-board sensor data may be updated with received CAM and CPM data (see e.g., ETSI TR 102 863 v1.1.1 (2011-06)). ITS applications may retrieve information from the LDM 623 for further processing. The CPS 621 may also interface with the Service Announcement (SA) service 627 to indicate an ITS-S's ability to generate CPMs 200, 300 and to provide details about the communication technology (e.g., RAT) used. Message dissemination-specific information related to the current channel utilization are received by interfacing with the DCC-Fac entity 625. The DCC-FAC 625 provides access network congestion information to the CPS 621.

Although not shown, the CPS 621 could interface with other facility layer functions (or simply a "facilities"), such as MCS, and/or the like, for coordinating respective services/data to/from other layers. As examples, the other facilities/services may include the collaborative awareness basic service (CABS) and/or cooperative awareness basic service (CABS), signal phase and timing service (SPATS), vulnerable road user basic service (VBS), Decentralized Environmental Notification (DEN) basic service, maneuver coordination services (MCS), and/or the like. The CPS 621 may also interact with a CPS profile management entity in the management layer to CPS-related purposes.

The CPS 621 interfaces through the Network—Transport/Facilities (NF)-Service Access Point (SAP) with the N&T layer 603 for exchanging of CPMs 200, 300 with other ITS-Ss. The CPS interfaces through the Security—Facilities (SF)-SAP with the Security entity to access security services for CPM 200, 300 Tx and CPM 200, 300 Rx. The CPS interfaces through the Management-Facilities (MF)-SAP with the Management entity and through the Facilities—Application (FA)-SAP with the application layer if received CPM data is provided directly to the applications. Each of the aforementioned interfaces/SAPs may provide the full duplex exchange of data with the facilities layer, and may implement suitable APIs to enable communication between the various entities/elements.

The CPS 621 resides or operates in the facilities layer 602, generates CPS rules, checks related services/messages to coordinate transmission of CPMs 200, 300 with other ITS service messages generated by other facilities and/or other entities within the ITS-S, which are then passed to the N&T layer 603 and access layers 604 for transmission to other proximate ITS-Ss. The CPMs 200, 300 are included in ITS packets, which are facilities layer PDUs that are passed to the access layer 604 via the N&T layer 603 or passed to the application layer 601 for consumption by one or more ITS applications. In this way, the CPM format is agnostic to the underlying access layer 604 and is designed to allow CPMs 200, 300 to be shared regardless of the underlying access technology/RAT.

Each of the aforementioned interfaces/Service Access Points (SAPs) may provide the full duplex exchange of data with the facilities layer, and may implement suitable APIs to enable communication between the various entities/elements.

For a V-ITS-S 110, the facilities layer 602 is connected to an in-vehicle network via an in-vehicle data gateway as shown and described in [TS102894-1]. The facilities and applications of a V-ITS-S 110 receive required in-vehicle data from the data gateway in order to construct messages (e.g., CSMs, VAMs, CAMs, DENMs, MCMs, and/or CPMs 200, 300) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity 606. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., V-ITS-S 110, R-ITS-S 130, P-ITS-S, or central ITS-S), a role of the ITS-S, and detection capabilities and status (e.g., the ITS-S's positioning capabilities, sensing capabilities, and/or the like). The station type/capabilities facility may store sensor capabilities of various connected/coupled sensors and sensor data obtained from such sensors.

The Position and Time management entity (PoTi) 622 manages the position and time information for use by ITS applications, facility, network, management, and security layers. For this purpose, the PoTi 622 gets information from sub-system entities such as GNSS, sensors and other sub-system of the ITS-S. The PoTi 622 ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity 622 may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi 622 may use augmentation services to improve the position and time accuracy. Various augmentation methods may be applied. PoTi 622 may support these augmentation services by providing messages services broadcasting augmentation data. For instance, an R-ITS-S 130 may broadcast correction information for GNSS to oncoming V-ITS-S 110; ITS-Ss may exchange raw GPS data or may exchange terrestrial radio position and time relevant information. PoTi 622 maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi 622 should also maintain information on the confidence of the kinematic and attitude state variables.

Collective perception (CP) involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 116, obstacles, and the like) detected by local perception sensors by means of one or more V2X RATs. In some implementations, CP includes a perception chain that can be the fusion of results of several perception functions at predefined times. These perception functions may include local perception and remote perception functions.

The local perception is provided by the collection of information from the environment of the considered ITS element (e.g., VRU device, vehicle, infrastructure, and/or the like). This information collection is achieved using relevant sensors (optical camera, thermal camera, radar, LIDAR, and/or the like). The remote perception is provided by the provision of perception data via C-ITS (mainly V2X communication). Existing basic services like the Cooperative Awareness (CA) or more recent services such as the Collective Perception Service (CPS) can be used to transfer a remote perception.

Several perception sources may then be used to achieve the cooperative perception function. The consistency of these sources may be verified at predefined instants, and if not consistent, the CP function may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g., risk analysis) of the CP result.

The perception functions from the device local sensors processing to the end result at the cooperative perception level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy.

Additionally or alternatively, existing infrastructure services, such as those described herein, can be used in the context of the CPS 621. For example, the broadcast of the Signal Phase And Timing (SPAT) and SPAT relevance delimited area (MAP) is already standardized and used by vehicles at intersection level. In principle they protect VRUs 116/117 crossing. However, signal violation warnings may exist and can be detected and signaled using DENM. This signal violation indication using DENMs is very relevant to VRU devices 117 as indicating an increase of the collision risk with the vehicle which violates the signal. If it uses local captors or detects and analyses VAMs, the traffic light controller may delay the red phase change to green and allow the VRU 116/117 to safely terminate its road crossing. The contextual speed limit using In-Vehicle Information (IVI) can be adapted when a large cluster of VRUs 116/117 is detected (e.g., limiting the vehicles' speed to 30 km/hour). At such reduced speed a vehicle 110 may act efficiently when perceiving the VRUs by means of its own local perception system.

The ITS management (mgmnt) layer includes a VRU profile mgmnt entity. The VRU profile management function is an important support element for the VBS 621 as managing the VRU profile during a VRU active session. The profile management is part of the ITS-S configuration management and is then initialized with necessary typical parameters' values to be able to fulfil its operation. The ITS-S configuration management is also responsible for updates (for example: new standard versions) which are necessary during the whole life cycle of the system.

Referring back to FIG. 6, the N&T layer 603 provides functionality of the OSI network layer and the OSI transport layer and includes one or more networking protocols, one or more transport protocols, and network and transport layer management. Additionally, sensor interfaces and communication interfaces may be part of the N&T layer 603 and access layer 604. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) 604 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 604 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other implementations.

Figure 11:
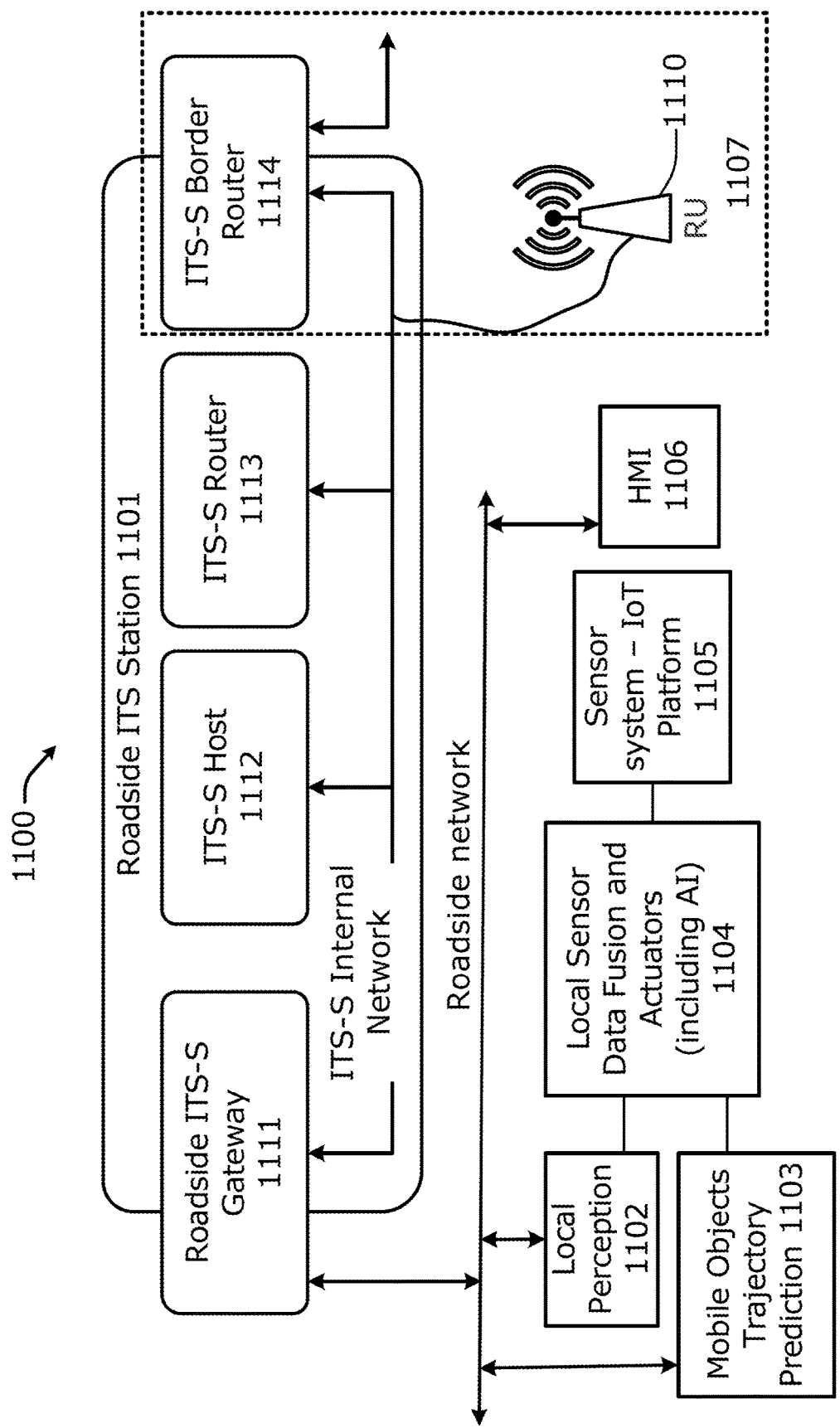
FIG. 11 depicts a roadside ITS-S in a roadside infrastructure node.

The ITS-S reference architecture 600 may be applicable to the elements of FIGS. 9 and 11. The ITS-S gateway 911, 1111 (see e.g., FIGS. 9 and 11) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 911, 1111 (see e.g., FIGS. 9 and 11) is capable of converting protocols. This allows an ITS-S to communicate with external elements of the system in which it is implemented. The ITS-S router 911, 1111 provides the functionality the ITS-S reference architecture 600 excluding the Applications and Facilities layers. The ITS-S router 911, 1111 interconnects two different ITS protocol stacks at layer 3. The ITS-S router 911, 1111 may be capable to convert protocols. One of these protocol stacks typically is connected to the ITS station-internal network. The ITS-S border router 1114 (see e.g., FIG. 11) provides the same functionality as the ITS-S router 911, 1111, but includes a protocol stack related to an external network that may not follow the management and security principles of ITS (e.g., the ITS Mgmnt and ITS Security layers in FIG. 6).

Additionally, other entities that operate at the same level but are not included in the ITS-S include the relevant users at that level, the relevant HMI (e.g., audio devices, display/touchscreen devices, and/or the like); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, and/or the like, in a V-ITS-S 110 or R-ITS-S 130. In the central station, the sensor system includes sensors that may be located on the side of the road, but directly report their data to the central station, without the involvement of a V-ITS-S 110 or R-ITS-S 130. In some cases, the sensor system may additionally include gyroscope(s), accelerometer(s), and the like (see e.g., sensor circuitry 1572 of FIG. 15). These elements are discussed in more detail infra with respect to FIGS. 9, 10, and 11.

Figure 7:
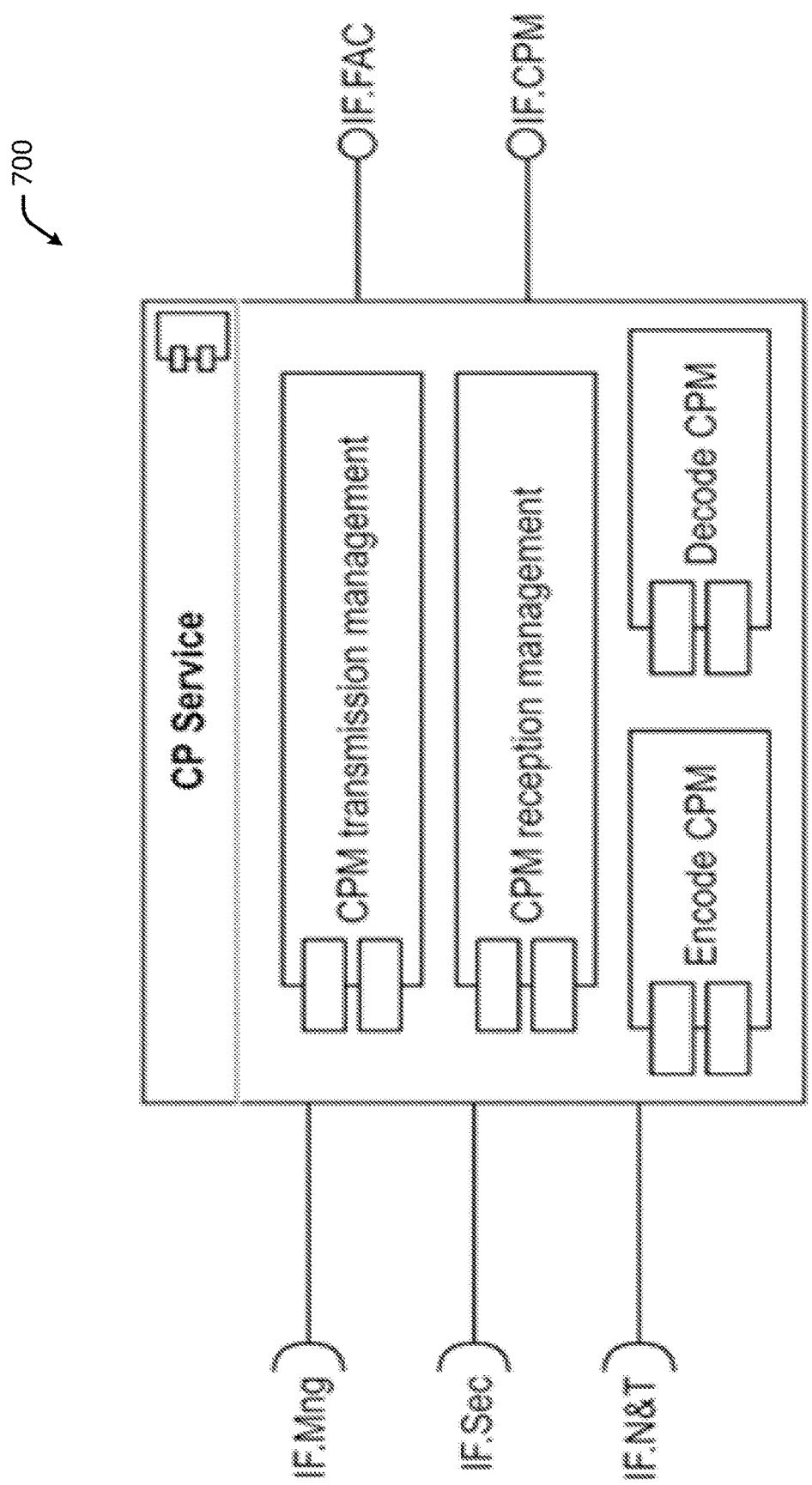
FIG. 7 depicts a collective perception basic service functional model.

FIG. 7 shows an example CPS service functional architecture. The CPS is part of the Application Support domain of the Facilities Layer according to [TS102894-1]. FIG. 7 also shows the CPS and interfaces to other facilities and layers. For sending and receiving CPMs 200, 300, the CPS includes an encode CPM sub-function, decode CPM sub-function, CPM transmission management sub-function, and CPM reception management sub-function.

The encode CPM sub-function constructs the CPM 200, 300 according to the format specified in Annex A of [TS103324]. The most recent abstract CP object information, sensor information and free space information data are included in the CPM 200, 300. The decode CPM sub-function decodes the received CPM 200, 300.

The CPM transmission management sub-function implements the protocol operation of the originating ITS-S such as: activation and termination of CPM Tx operation; determination of the CPM generation frequency; and triggering the generation of the CPM 200, 300.

The CPM reception management sub-function implements the protocol operation of the receiving ITS-S such as: triggering the decoding of the CPM upon receiving an incoming CPM; provisioning of the received CPM 200, 300 to the LDM and/or ITS applications of the Rx ITS-S; and/or checking the validity of the information of received CPMs 200, 300 (see e.g., ETSI TR 103 460 for details for checking the validity of received CPM information).

Figure 8:
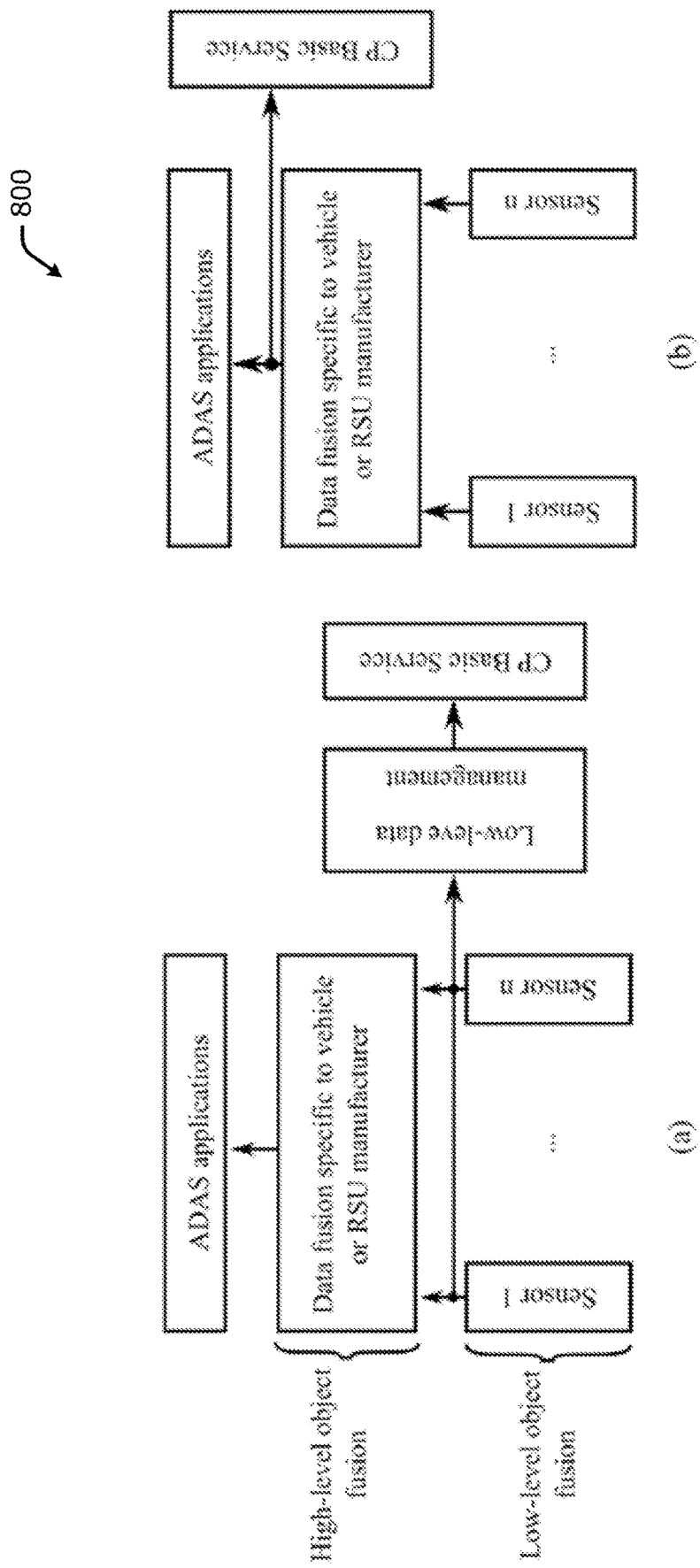
FIG. 8 shows object data extraction levels of a CPS basic service.

FIG. 8 shows an example object data extraction levels of the CP basic service. FIG. 8 part (a) depicts an implementation in which sensor data is processed as part of a low-level data management entity. The CP Basic Service then selects the object candidates to be transmitted as defined in clause 4.3 of [TS103324], [TR103562]. Part (a) is more likely to avoid filter cascades, as the task of high-level fusion will be performed by the receiving ITS-S. FIG. 8 part (b) depicts an implementation in which the CP Basic Service selects objects to be transmitted as part of the CPM 200, 300 according to clause 4.3 of [TS103324], [TR103562] from a high-level fused object list, thereby abstracting the original sensor measurement used in the fusion process. The CPM 200, 300 provides data fields to indicate the source of the object.

Raw sensor data refers to low-level data generated by a local perception sensor that is mounted to, or otherwise accessible by, a vehicle or an RSU. This data is specific to a sensor type (e.g., reflexions, time of flight, point clouds, camera image, and/or the like). In the context of environment perception, this data is usually analyzed and subjected to sensor-specific analysis processes to detect and compute a mathematical representation for a detected object from the raw sensor data. The IST-S sensor may provide raw sensor data as a result of their measurements, which is then used by a sensor specific low-level object fusion system (e.g., sensor hub, dedicated processor(s), and the like) to provide a list of objects as detected by the measurement of the sensor. The detection mechanisms and data processing capabilities are specific to each sensor and/or hardware configurations.

This means that the definition and mathematical representation of an object can vary. The mathematical representation of an object is called a state space representation. Depending on the sensor type, a state space representation may comprise multiple dimensions (e.g., relative distance components of the feature to the sensor, speed of the feature, geometric dimensions, and/or the like). A state space is generated for each detected object of a particular measurement. Depending on the sensor type, measurements are performed cyclically, periodically, and/or based on some defined trigger condition. After each measurement, the computed state space of each detected object is provided in an object list that is specific to the timestamp of the measurement.

The object (data) fusion system maintains one or more lists of objects that are currently perceived by the ITS-S. The object fusion mechanism performs prediction of each object to timestamps at which no measurement is available from sensors; associates objects from other potential sensors mounted to the station or received from other ITS-Ss with objects in the tracking list; and merges the prediction and an updated measurement for an object. At each point in time, the data fusion mechanism is able to provide an updated object list based on consecutive measurements from (possibly) multiple sensors containing the state spaces for all tracked objects. V2X information (e.g., CAMs, DENMs, CPMs 200, 300, and/or the like) from other vehicles may additionally be fused with locally perceived information. Other approaches additionally provide alternative representations of the processed sensor data, such as an occupancy grid.

The data fusion mechanism also performs various housekeeping tasks such as, for example, adding state spaces to the list of objects currently perceived by an ITS-S in case a new object is detected by a sensor; updating objects that are already tracked by the data fusion system with new measurements that should be associated to an already tracked object; and removing objects from the list of tracked objects in case new measurements should not be associated to already tracked objects. Depending on the capabilities of the fusion system, objects can also be classified (e.g., some sensor systems may be able to classify a detected object as a particular road user, while others are merely able to provide a distance measurement to an object within the perception range). These tasks of object fusion may be performed either by an individual sensor, or by a high-level data fusion system or process.

FIG. 9 depicts an example vehicle computing system 900. In this example, the vehicle computing system 900 includes a V-ITS-S 901 and Electronic Control Units (ECUs) 905. The V-ITS-S 901 includes a V-ITS-S gateway 911, an ITS-S host 912, and an ITS-S router 913. The vehicle ITS-S gateway 911 provides functionality to connect the components at the in-vehicle network (e.g., ECUs 905) to the ITS station-internal network. The interface to the in-vehicle components (e.g., ECUs 905) may be the same or similar as those discussed herein (see e.g., IX 1556 of FIG. 15) and/or may be a proprietary interface/interconnect. Access to components (e.g., ECUs 905) may be implementation specific. The ECUs 905 may be the same or similar to the driving control units (DCUs) 174 discussed previously with respect to FIG. 1. The ITS station connects to ITS ad hoc networks via the ITS-S router 913.

Figure 10:
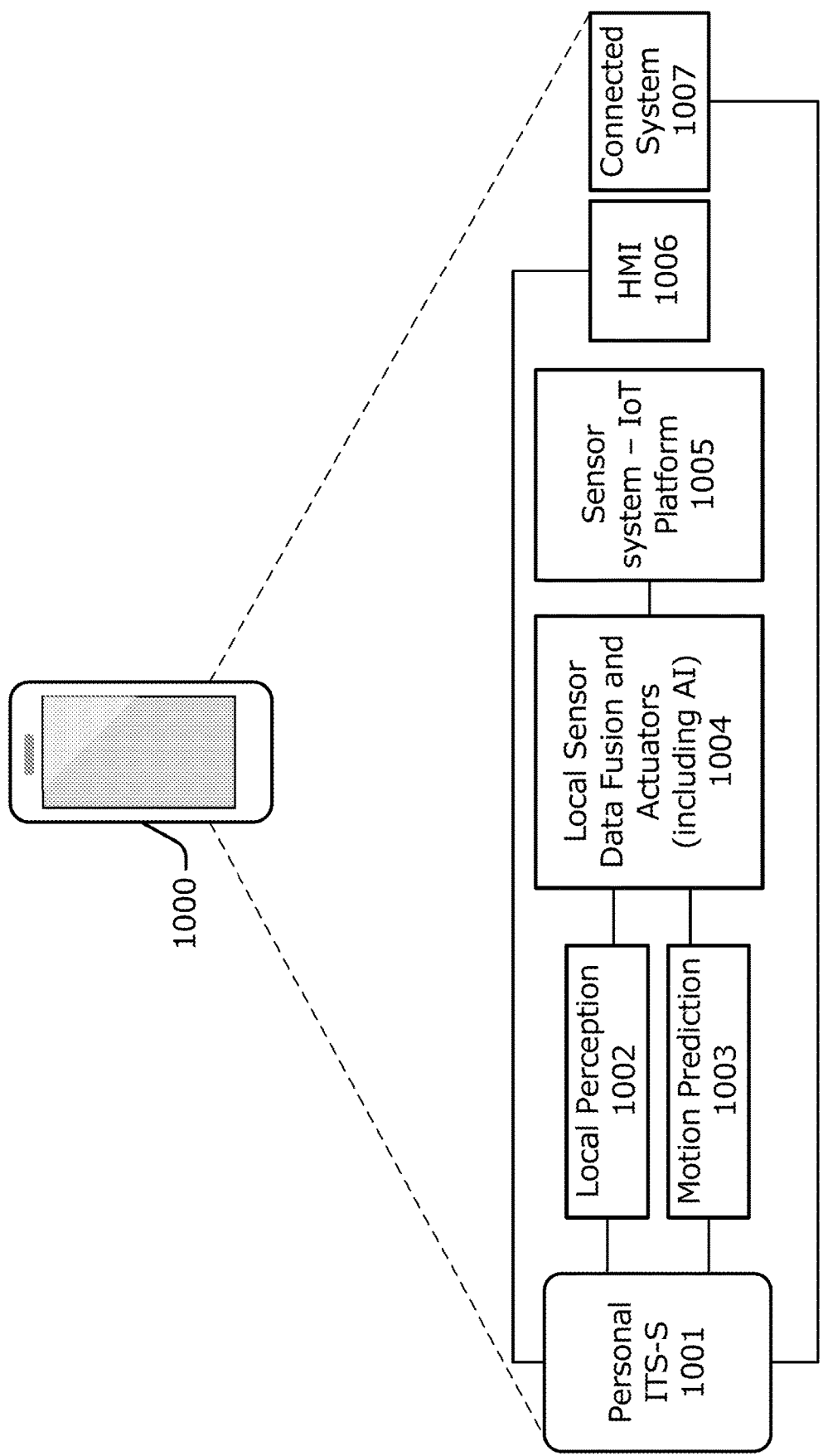
FIG. 10 depicts a personal ITS station (P-ITS-S), which may be used as a VRU ITS-S.

FIG. 10 depicts an example personal computing system 1000. The personal ITS sub-system 1000 provides the application and communication functionality of ITSC in mobile devices, such as smartphones, tablet computers, wearable devices, PDAs, portable media players, laptops, and/or other mobile devices. The personal ITS sub-system 1000 contains a personal ITS station (P-ITS-S) 1001 and various other entities not included in the P-ITS-S 1001, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 1000 may be used as a VRU ITS-S 117.

FIG. 11 depicts an example roadside infrastructure system 1100. In this example, the roadside infrastructure system 1100 includes an R-ITS-S 1101, output device(s) 1105, sensor(s) 1108, and one or more radio units (RUs) 1110. The R-ITS-S 1101 includes a R-ITS-S gateway 1111, an ITS-S host 1112, an ITS-S router 1113, and an ITS-S border router 1114. The ITS station connects to ITS ad hoc networks and/or ITS access networks via the ITS-S router 1113. The R-ITS-S gateway 911 provides functionality to connect the components of the roadside system (e.g., output devices 1105 and sensors 1108) at the roadside network to the ITS station-internal network. The interface to the in-vehicle components (e.g., ECUs 905) may be the same or similar as those discussed herein (see e.g., IX 1556 of FIG. 15) and/or may be a proprietary interface/interconnect. Access to components (e.g., ECUs 905) may be implementation specific. The sensor(s) 1108 may be inductive loops and/or sensors that are the same or similar to the sensors 172 discussed infra with respect to FIG. 1 and/or sensor circuitry 1572 discussed infra with respect to FIG. 15.

The actuators 1113 are devices that are responsible for moving and controlling a mechanism or system. The actuators 1113 are used to change the operational state (e.g., on/off, zoom or focus, and/or the like), position, and/or orientation of the sensors 1108. The actuators 1113 are used to change the operational state of some other roadside equipment, such as gates, traffic lights, digital signage or variable message signs (VMS), and/or the like. The actuators 1113 are configured to receive control signals from the R-ITS-S 1101 via the roadside network, and convert the signal energy (or some other energy) into an electrical and/or mechanical motion. The control signals may be relatively low energy electric voltage or current. The actuators 1113 comprise electromechanical relays and/or solid state relays, which are configured to switch electronic devices on/off and/or control motors, and/or may be that same or similar or actuators 1574 discussed infra with respect to FIG. 15.

Each of FIGS. 9, 10, and 11 also show entities which operate at the same level but are not included in the ITS-S including the relevant HMI 906, 1006, and 1106; vehicle motion control 908 (only at the vehicle level); local device sensor system and IoT Platform 905, 1005, and 1105; local device sensor fusion and actuator application 904, 1004, and 1104; local perception and trajectory prediction applications 902, 1002, and 1102; motion prediction 903 and 1003, or mobile objects trajectory prediction 1103 (at the RSU level); and connected system 907, 1007, and 1107.

The local device sensor system and IoT Platform 905, 1005, and 1105 collects and shares IoT data. The VRU sensor system and IoT Platform 1005 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, and/or the like). An IoT platform, which can be distributed over the system elements, may contribute to provide additional information related to the environment surrounding the VRU system 1000. The sensor system can include one or more cameras, radars, LiDARs, and/or other sensors (see e.g., 1522 of FIG. 15), in a V-ITS-S 110 or R-ITS-S 130. In the VRU device 117/1000, the sensor system may include gyroscope(s), accelerometer(s), and the like (see e.g., 1522 of FIG. 15). In a central station (not shown), the sensor system includes sensors that may be located on the side of the road, but directly report their data to the central station, without the involvement of a V-ITS-S 110 or an R-ITS-S 130.

The (local) sensor data fusion function and/or actuator applications 904, 1004, and 1104 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Sensor data fusion usually relies on the consistency of its inputs and then to their timestamping, which correspond to a common given time, the sensor data fusion and/or ML/AL techniques may be used to determine occupancy values for the DCROM as discussed herein.

Various ML/AI techniques can be used to carry out the sensor data fusion and/or may be used for other purposes, such as the DCROM as discussed herein. Where the apps 904, 1004, and 1104 are (or include) AI/ML functions, the apps 904, 1004, and 1104 may include AI/ML models that have the ability to learn useful information from input data (e.g., context information, and/or the like) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-nearest neighbor, and the like), Decision Tree Algorithms (e.g., Classification And Regression Tree (CART), Iterative Dichotomiser 3 (ID3), C4.5, chi-square automatic interaction detection (CHAID), and/or the like), Fuzzy Decision Tree (FDT), and the like), Support Vector Machines (SVM), Bayesian Algorithms (e.g., Bayesian network (BN), a dynamic BN (DBN), Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). Neural networks (NNs) are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), and/or the like), deep stacking network (DSN), Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

In one example, the ML/AI techniques are used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), and/or the like), a deep learning object detection technique (e.g., fully convolutional neural network (FCNN), region proposal convolution neural network (R-CNN), single shot multibox detector, 'you only look once' (YOLO) algorithm, and/or the like), and/or the like.

In another example, the ML/AI techniques are used for motion detection based on the y sensor data obtained from the one or more sensors. Additionally or alternatively, the ML/AI techniques are used for object detection and/or classification. The object detection or recognition models may include an enrollment phase and an evaluation phase. During the enrollment phase, one or more features are extracted from the sensor data (e.g., image or video data). A feature is an individual measurable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

Any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, and/or the like). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm.

A local perception function (which may or may not include trajectory prediction application(s)) 902, 1002, and 1102 is provided by the local processing of information collected by local sensor(s) associated to the system element. The local perception (and trajectory prediction) function 902, 1002, and 1102 consumes the output of the sensor data fusion application/function 904, 1004, and 1104 and feeds ITS-S applications with the perception data (and/or trajectory predictions). The local perception (and trajectory prediction) function 902, 1002, and 1102 detects and characterize objects (static and mobile) which are likely to cross the trajectory of the considered moving objects. The infrastructure, and particularly the road infrastructure 1100, may offer services relevant to the VRU support service. The infrastructure may have its own sensors detecting VRUs 116/117 evolutions and then computing a risk of collision if also detecting local vehicles' evolutions, either directly via its own sensors or remotely via a cooperative perception supporting services such as the CPS (see e.g., [TR103562]). Additionally, road marking (e.g., zebra areas or crosswalks) and vertical signs may be considered to increase the confidence level associated with the VRU detection and mobility since VRUs 116/117 usually have to respect these marking/signs.

The motion dynamic prediction function 903 and 1003, and the mobile objects trajectory prediction 1103 (at the RSU level), are related to the behavior prediction of the considered moving objects. The motion dynamic prediction function 903 and 1003 predict the trajectory of the vehicle 110 and the VRU 116, respectively. The motion dynamic prediction function 903 may be part of the VRU Trajectory and Behavioral Modeling module and trajectory interception module of the V-ITS-S 110. The motion dynamic prediction function 1003 may be part of the dead reckoning module and/or the movement detection module of the VRU ITS-S 117. Alternatively, the motion dynamic prediction functions 903 and 1003 may provide motion/movement predictions to the aforementioned modules. Additionally or alternatively, the mobile objects trajectory prediction 1103 predict respective trajectories of corresponding vehicles 110 and VRUs 116, which may be used to assist the VRU ITS-S 117 in performing dead reckoning and/or assist the V-ITS-S 110 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116/117 are moving, they still have a large amount of possible motion dynamics in terms of possible trajectories and velocities. This means that motion dynamic prediction 903, 1003, 1103 is used to identify which motion dynamic will be selected by the VRU 116 as quickly as possible, and if this selected motion dynamic is subject to a risk of collision with another VRU or a vehicle.

The motion dynamic prediction functions 903, 1003, 1103 analyze the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to a risk analysis function.

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116/117) follow the same itineraries, using similar motion dynamics, for example when going to the main Point of Interest (POI), which is related to their main activities (e.g., going to school, going to work, doing some shopping, going to the nearest public transport station from their home, going to sport center, and/or the like). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 908 may be included for computer-assisted and/or automated vehicles 110. Both the HMI entity 906 and vehicle motion control entity 908 may be triggered by one or more ITS-S applications. The vehicle motion control entity 908 may be a function under the responsibility of a human driver or of the vehicle if it is able to drive in automated mode.

The Human Machine Interface (HMI) 906, 1006, and 1106, when present, enables the configuration of initial data (parameters) in the management entities (e.g., VRU profile management) and in other functions (e.g., VBS management). The HMI 906, 1006, and 1106 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 1000), similar to a vehicle driver, the HMI provides the information to the VRU 116, considering its profile (e.g., for a blind person, the information is presented with a clear sound level using accessibility capabilities of the particular platform of the personal computing system 1000). In various implementations, the HMI 906, 1006, and 1106 may be part of the alerting system.

The connected systems 907, 1007, and 1107 refer to components/devices used to connect a system with one or more other systems. As examples, the connected systems 907, 1007, and 1107 may include communication circuitry and/or radio units. The VRU system 1000 may be a connected system made of up to 4 different levels of equipment. The VRU system 1000 may also be an information system which collects, in real time, information resulting from events, processes the collected information and stores them together with processed results. At each level of the VRU system 1000, the information collection, processing and storage is related to the functional and data distribution scenario which is implemented.

4. Computer-Assisted and Autonomous Driving Platforms and Technologies

Except for the UVCS technology of the present disclosure, in-vehicle system 101 and CA/AD vehicle 110 otherwise may be any one of a number of in-vehicle systems and CA/AD vehicles, from computer-assisted to partially or fully autonomous vehicles. Additionally, the in-vehicle system 101 and CA/AD vehicle 110 may include other components/subsystems not shown by FIG. 1 such as the elements shown and described elsewhere herein (see e.g., FIG. 15). These and other elements of the underlying UVCS technology used to implement in-vehicle system 101 will be further described with references to remaining FIGS. 12-14.

Figure 12:
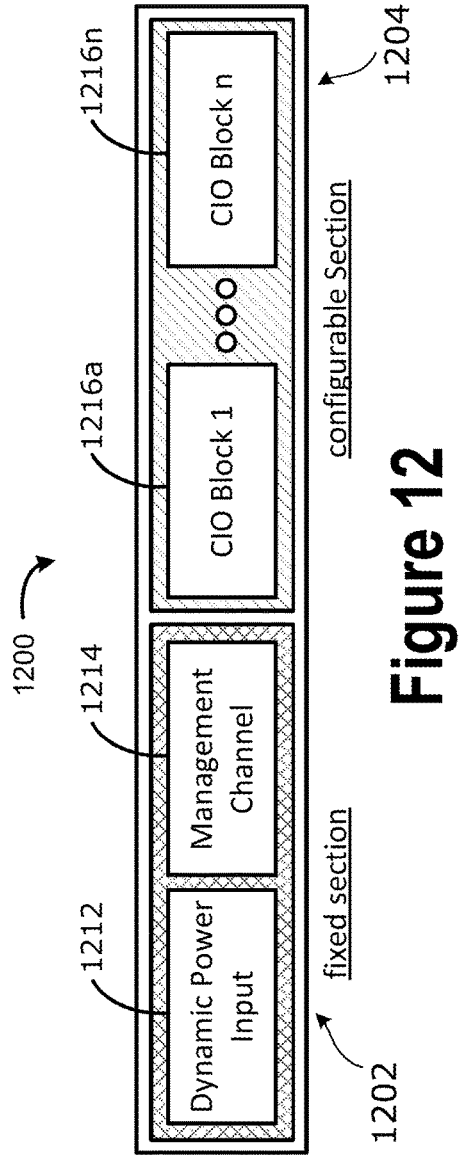
FIG. 12 illustrates an Upgradeable Vehicular Compute Systems (UVCS) interface.

FIG. 12 illustrates an example UVCS interface 1200. UVCS interface 1200 is a modular system interface designed to couple a pluggable compute module (having compute elements such as CPU, memory, storage, radios, and/or the like) to an in-vehicle compute hub or subsystem (having peripheral components, such as power supplies, management, I/O devices, automotive interfaces, thermal solution, and/or the like) pre-disposed in a vehicle to form an instance of a UVCS for the vehicle. Different pluggable compute modules having different compute elements, or compute elements of different functionalities or capabilities, may be employed to mate with an in-vehicle compute hub/subsystem pre-disposed in the vehicle, forming different instances of UVCS. Accordingly, the computing capability of a vehicle having a pre-disposed in-vehicle compute hub/subsystem may be upgraded by having a newer, more function or more capable pluggable compute module be mated with the pre-disposed in-vehicle compute hub/subsystem, replacing a prior older, less function or less capable pluggable compute module.

In the example of FIG. 12, UVCS 1200 includes a fixed section 1202 and a configurable section 1204. Fixed section 1202 includes a dynamic power input interface 1212 (also referred to as dynamic power delivery interface), and a management channel interface 1214. Configuration section 1204 includes a number of configurable I/O (CIO) blocks 1216a-1216n.

Dynamic power input interface 1212 is arranged to deliver power from the in-vehicle compute hub/subsystem to the compute elements of a pluggable compute module plugged into UVCS interface 1200 to mate with the in-vehicle compute hub to form an instance of an UVCS. Management channel interface 1214 is arranged to facilitate the in-vehicle compute hub in managing/coordinating the operations of itself and the pluggable compute module plugged into UVCS interface 1200 to form the instance of an UVCS. CIO blocks 1216a-1216n are arranged to facilitate various I/O between various compute elements of the pluggable compute module and the peripheral components of the in-vehicle compute hub/subsystem mated to each other through UVCS interface 1200 to form the instance of an UVCS. The I/O between the compute elements of the pluggable compute module and the peripheral components of the mated in-vehicle compute hub/subsystem vary from instance to instance, depending on the compute elements of the pluggable compute module used to mate with the in-vehicle compute hub to form a particular instance of the UVCS. At least some of CIO blocks 1216a-1216a are arranged to facilitate high-speed interfaces.

The CIO blocks 1216a-1216n represent a set of electrically similar high speed, differential serial interfaces, allowing a configuration of the actually used interface type and standard on a case-by-case basis. This way, different UVCS compute hubs can connect different peripherals to the same UVCS interface 1200, and allow the different peripherals to perform I/O operations in different I/O protocols with compute elements of a UVCS module.

The number of CIO blocks 1216a-1216n may depending on use case and/or implementations for different market segments. For example, there may be few CIO blocks 1216a-1216n (e.g., 2 to 4) for implementations designed for the lower end markets. On the other hand, there may be many more CIO blocks 1216-1216n (e.g., 8 to 16) for implementations designed for the higher end markets. However, to achieve the highest possible interoperability and upgradeability, for a given UVCS generation, the number and functionality/configurability of the number of CIO blocks may be kept the same.

Figure 13:
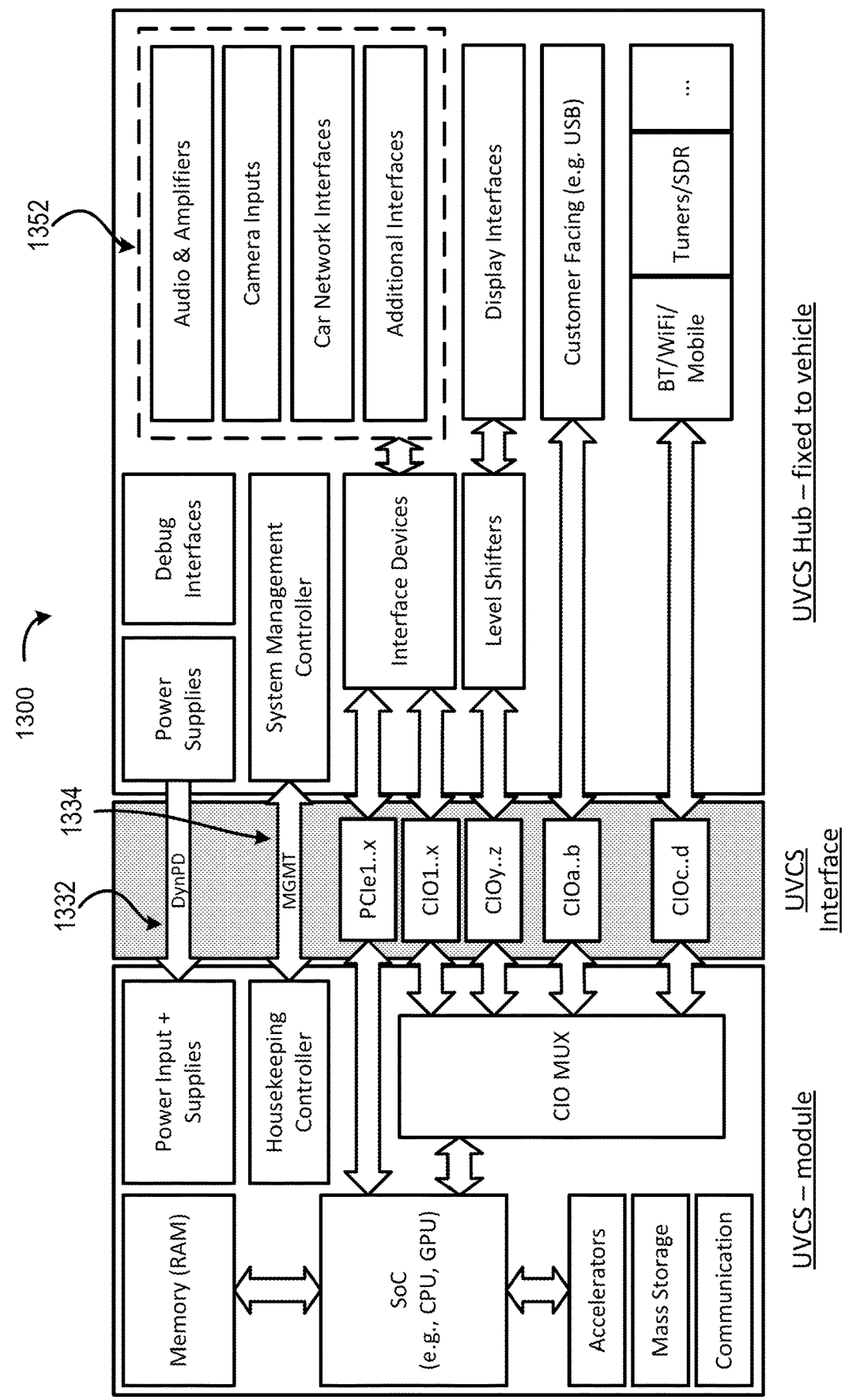
FIG. 13 illustrates an UVCS formed using a UVCS interface.

FIG. 13 illustrates an example UVCS 1300 formed using a UVCS interface. As shown, UVCS interface, which may be UVCS interface 1200, is used to facilitate mating of pluggable UVCS module with UVCS hub pre-disposed in a vehicle, to form UVCS 1300 for the vehicle, which may be one of the one or more UVCS of in-vehicle system PT100 of Figure PT1. UVCS interface, as UVCS interface 1200, includes a fixed section and a configurable section. The fixed section includes a dynamic power delivery interface (DynPD) 1332 and a management channel (MGMT) interface 1334. The configurable section includes a number of configurable I/O interfaces (CIOs), PCIe1 . . . x, CIOI . . . x, CIOy . . . z, CIOa . . . b, CIOc . . . d.

Pre-disposed UVCS hub includes power supplies and system management controller. Further, UVCS hub includes debug interfaces 1344, interface devices, level shifters, and a number of peripheral components 1352, such as audio and amplifiers, camera interface, car network interfaces, other interfaces, display interfaces, customer facing interfaces (e.g., a USB interface), and communication interfaces (e.g., Bluetooth®\BLE, WiFi, other mobile interfaces, tuners, software define radio (SDR)), coupled to power supplies, system management controller, and each other as shown. Additionally or alternatively, UVCS hub may include more or less, or different peripheral elements.

Pluggable UVCS module 1306 includes an SoC (e.g., CPU, GPU, FPGA, or other circuitry), memory, power input+supplies circuitry, housekeeping controller and CIO multiplexer(s) (MUX). Further, UVCS module includes hardware accelerators, persistent mass storage, and communication modules (e.g., BT, WiFi, 5G/NR, LTE, and/or other like interfaces), coupled to the earlier enumerated elements and each other as shown. Additionally or alternatively, UVCS module may include more or less, or different compute elements.

Power Supplies of UVCS hub delivers power to compute elements of UVCS module, via DynPD 1332 of UVCS interface and Power Input+Supplies circuitry of UVCS module. System management controller of UVCS hub manages and coordinates its operations and the operations of the compute elements of UVCS module via the management channel 1334 of UVCS interface and housekeeping controller of UVCS module. CIO MUX is configurable or operable to provide a plurality of I/O channels of different I/O protocols between the compute elements of UVCS module and the peripheral components of UVCS hub, via the configurable I/O blocks of UVCS interface, interface devices and level shifters of UVCS hub. For example, one of the I/O channels may provide for I/O between the compute elements of UVCS module and the peripheral components of UVCS hub in accordance with PCIe I/O protocol. Another I/O channel may provide for I/O between the compute elements of UVCS module and the peripheral components of UVCS hub in accordance with USB I/O protocol. Still other I/O channels provide for I/O between the compute elements of UVCS module and the peripheral components of UVCS hub in accordance with other high speed serial or parallel I/O protocols.

Housekeeping controller is configurable or operable to control power supply in its delivery of power to static and dynamic loads, as well as the consumption of power by static and dynamic loads, based on the operating context of the vehicle (e.g., whether the vehicle is in a "cold crank" or "cold start" scenario). Housekeeping controller is configurable or operable to control power consumption of static and dynamic loads by selectively initiating sleep states, lowering clock frequencies, or powering off the static and dynamic loads.

Management channel 1334 may be a small low pin count serial interface, a Universal Asynchronous Receiver-Transmitter (UART) interface, a Universal Synchronous and Asynchronous Receiver-Transmitter (USART) interface, a USB interface, or some other suitable interface (including any of the other IX technologies discussed herein). Additionally or alternatively, management channel may be a parallel interface such as an IEEE 1284 interface.

CIO blocks of UVCS interface represent a set of electrically similar high speed interfaces (e.g., high speed differential serial interfaces) allowing a configuration of the actually used interface type and standard on a case-by-case basis. In particular, housekeeping controller is arranged to configure CIO MUX to provide a plurality of I/O channels through the various CIO blocks to facilitate I/O operations in different I/O protocols. Additionally or alternatively, the plurality of I/O channels include a USB I/O channel, a PCIe I/O channel, a HDMI and DP (DDI) I/O channel, and a Thunderbolt (TBT) I/O channel. The plurality of I/O channels may also include other I/O channel types (xyz [1 . . . r]) beside the enumerated I/O channel types.

Additionally or alternatively, CIO multiplexer comprises sufficient circuit paths to be configurable to multiplex any given combination of I/O interfaces exposed by the SoC to any of the connected CIO blocks. Additionally or alternatively, CIO MUX may support a limited multiplexing scheme, such as when the CIO blocks support a limited number of I/O protocols (e.g., supporting display interfaces and Thunderbolt, while not offering PCIe support). In some implementations, the CIO MUX may be integrated as part of the SoC.

System management controller of UVCS hub and housekeeping controller of UVCS module are configurable or operable to negotiate, during an initial pairing of the UVCS hub and UVCS module a power budget or contract. The power budget/contract may provide for minimum and maximum voltages, current/power needs of UVCS module and the current power delivery limitation of UVCS interface, if any. This allows for the assessments of the compatibility of a given pair of UCS hub and module, as well as for operational benefits.

Figure 14:
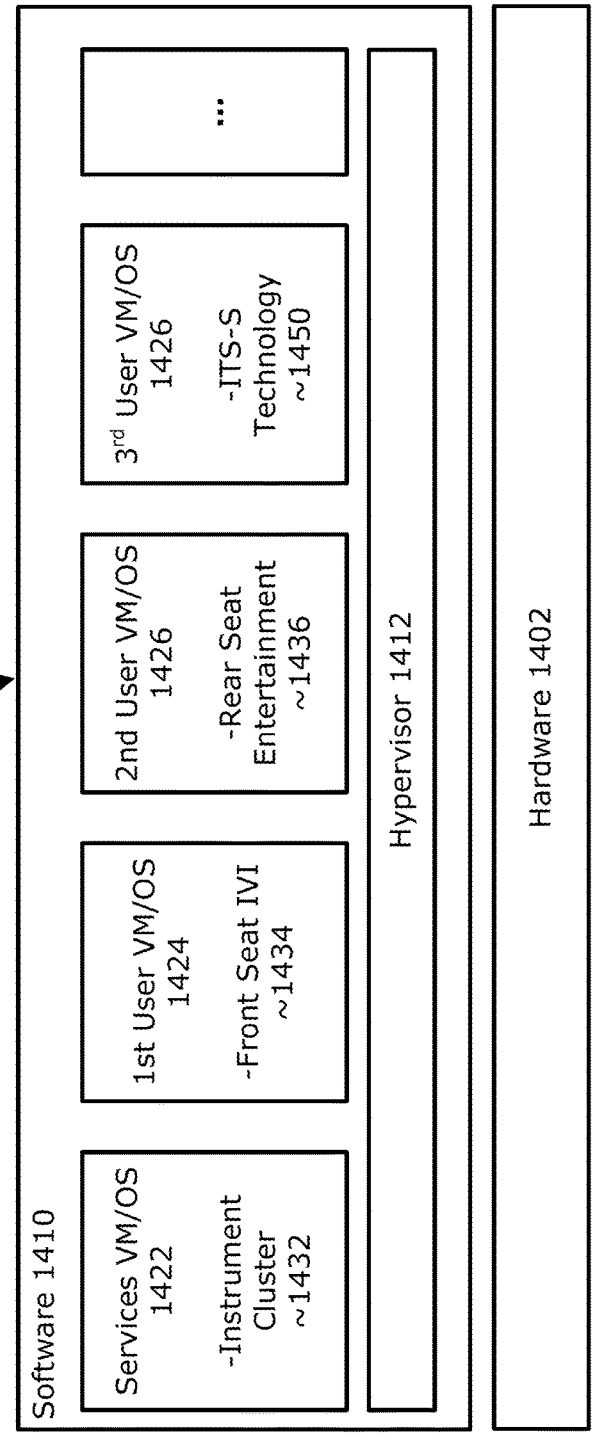
FIG. 14 shows a software component view of an example in-vehicle system formed with a UVCS.

FIG. 14 shows a software component view of an example in-vehicle system formed with a UVCS. As shown, in-vehicle system 1400, which could be formed with UVCS 1300, includes hardware 1402 and software 1410. Software 1410 includes hypervisor 1412 hosting a number of virtual machines (VMs) 1422-1428. Hypervisor 1412 is configurable or operable to host execution of VMs 1422-1428. Hypervisor 1412 may also implement some or all of the functions described earlier for a system management controller of a UVCS module. As examples, hypervisor 1412 may be a KVM hypervisor, Xen provided by Citrix Inc., VMware provided by VMware Inc., and/or any other suitable hypervisor or VM manager (VMM) technologies such as those discussed herein. The VMs 1422-1428 include a service VM 1422 and a number of user VMs 1424-1428. Service machine 1422 includes a service OS hosting execution of a number of instrument cluster applications 1432. As examples, service OS of service VM 1422 and user OS of user VMs 1424-1428 may be Linux, available e.g., from Red Hat Enterprise of Raleigh, NC, Android, available from Google of Mountain View, CA, and/or any other suitable OS such as those discussed herein.

User VMs 1424-1428 may include a first user VM 1424 having a first user OS hosting execution of front seat infotainment applications 1434, a second user VM 1426 having a second user OS hosting execution of rear seat infotainment applications 1436, a third user VM 1428 having a third user OS hosting execution of ITS-S subsystem 1450, and/or any other suitable OS/applications such as those discussed herein. Additionally or alternatively, the VMs 1422-1426 may be, or may include isolated user-space instances such as containers, partitions, virtual environments (VEs), and/or the like, which may be implemented using a suitable OS-level virtualization technology.

5. Computing System and Hardware Configurations

Figure 15:
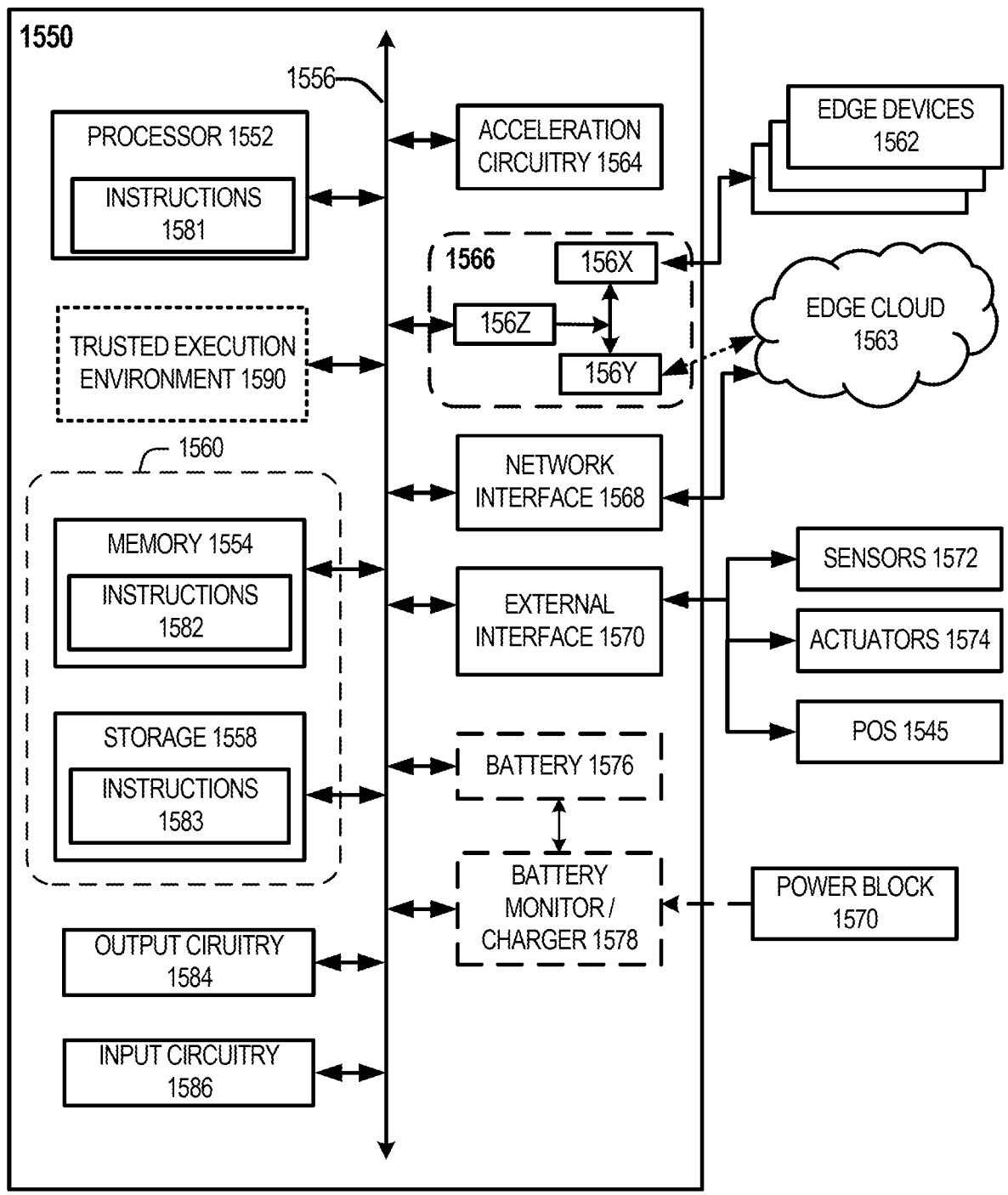
FIG. 15 depicts components of various compute nodes in edge computing system(s).

FIG. 15 depicts an example edge computing systems and environments that may fulfill any of the compute nodes or devices discussed herein. The edge compute node 1550 may be embodied as a type of device, appliance, computer, or other "thing" capable of communicating with other edge, networking, or endpoint components. For example, an edge compute device 1550 may be embodied as a smartphone, a mobile compute device, a smart appliance, an in-vehicle compute system (e.g., a navigation system), or other device or system capable of performing the described functions.

FIG. 15 illustrates an example of components that may be present in an edge computing node 1550 for implementing the techniques (e.g., operations, processes, methods, and methodologies) described herein. This edge computing node 1550 provides a closer view of the respective components of node 1550 when implemented as or as part of a computing device (e.g., as a mobile device, a base station, server, gateway, infrastructure equipment, road side unit (RSU) or R-ITS-S 130, radio head, relay station, server, and/or any other element/device discussed herein). The edge computing node 1550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1550, or as components otherwise incorporated within a chassis of a larger system.

The edge computing node 1550 includes processing circuitry in the form of one or more processors 1552. The processor circuitry 1552 includes circuitry such as, but not limited to one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1552 may include one or more hardware accelerators (e.g., same or similar to acceleration circuitry 1564), which may be microprocessors, programmable processing devices (e.g., FPGA, ASIC, and/or the like), or the like. The one or more accelerators may include, for example, computer vision and/or deep learning accelerators. In some implementations, the processor circuitry 1552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1552 may be coupled with or may include memory/storage and may be configured to execute instructions stored in the memory/storage to enable various applications or operating systems to run on the node 1550. The processors (or cores) 1552 is configured to operate application software to provide a specific service to a user of the node 1550. The processor(s) 1552 may be a special-purpose processor(s)/controller(s) configured (or configurable) to operate according to the discussion in sections 1-4 supra.

In some implementations, the processor(s) 1552 may be a part of a system on a chip (SoC), System-in-Package (SiP), a multi-chip package (MCP), and/or the like, in which the processor(s) 1552 and other components are formed into a single integrated circuit, or a single package. The system 1550 may not utilize processor(s) 1552, and instead may include a special-purpose processor/controller to process IP data received from an EPC or 5GC, for example.

In some implementations, such as implementations where subsystems of the system 1550 are individual software agents or AI agents, each agent is implemented in a respective hardware accelerator that are configured with appropriate bit stream(s) or logic blocks to perform their respective functions. In these implementations, processor(s) and/or hardware accelerators of the processor(s) 1552 may be specifically tailored for operating the agents and/or for machine learning functionality, such as a cluster of AI GPUs, tensor processing units (TPUs), Neural Network Processors (NNPs), Vision Processing Units (VPUs), and/or the like. The hardware accelerator may be implemented as an AI accelerating co-processor, such as a Neural Engine, the Neural Processing Unit, and/or the like.

The processor(s) 1552 may communicate with system memory 1554 over an interconnect (IX) 1556. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMNs or MiniDIMMs.

To provide for persistent storage of information such as data, applications, operating systems and so forth, a storage 1558 may also couple to the processor 1552 via the IX 1556. In an example, the storage 1558 may be implemented via a solid-state disk drive (SSDD) and/or high-speed electrically erasable memory (commonly referred to as "flash memory"). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1554 and/or storage circuitry 1558 may also incorporate three-dimensional (3D) cross-point (XPOINT) memories.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The storage circuitry 1558 store computational logic 1582 (or "modules 1582") in the form of software, firmware, or hardware commands to implement the techniques described herein. The computational logic 1582 may be employed to store working copies and/or permanent copies of computer programs, or data to create the computer programs, for the operation of various components of node 1550 (e.g., drivers, and/or the like), an OS of node 1550 and/or one or more applications for carrying out the functionality discussed herein. The computational logic 1582 may be stored or loaded into memory circuitry 1554 as instructions 1582, or data to create the instructions 1588, for execution by the processor circuitry 1552 to provide the functions described herein. The various elements may be implemented by assembler instructions supported by processor circuitry 1552 or high-level languages that may be compiled into such instructions (e.g., instructions 1588, or data to create the instructions 1588). The permanent copy of the programming instructions may be placed into persistent storage devices of storage circuitry 1558 in the factory or in the field through, for example, a distribution medium (not shown), through a communication interface (e.g., from a distribution server (not shown)), or over-the-air (OTA).

In an example, the instructions 1583, 1582 provided via the memory circuitry 1554 and/or the storage circuitry 1558 of FIG. 15 are embodied as one or more non-transitory computer readable storage media (see e.g., NTCRSM 1560) including program code, a computer program product or data to create the computer program, with the computer program or data, to direct the processor circuitry 1552 of node 1550 to perform electronic operations in the node 1550, and/or to perform a specific sequence or flow of actions, for example, as described with respect to the flowchart(s) and block diagram(s) of operations and functionality depicted previously. The processor circuitry 1552 accesses the one or more non-transitory computer readable storage media over the interconnect 1556.

Additionally or alternatively, programming instructions (or data to create the instructions) may be disposed on multiple NTCRSM 1560. Additionally or alternatively, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1560 may be embodied by devices described for the storage circuitry 1558 and/or memory circuitry 1554. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, and/or the like), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, and/or the like.

The program code (or data to create the program code) described herein may be stored in one or more of a compressed format, an encrypted format, a fragmented format, a packaged format, and/or the like. Program code (or data to create the program code) as described herein may require one or more of installation, modification, adaptation, updating, combining, supplementing, configuring, decryption, decompression, unpacking, distribution, reassignment, and/ or the like in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), and/or the like in order to execute the instructions on a particular computing device or other device. In another example, the program code (or data to create the program code) may need to be configured (e.g., settings stored, data input, network addresses recorded, and/or the like) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1583, instructions 1582, instructions 1581 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PUP, Pearl, Python, Ruby on Rails, Accelerated Mobile Pages Script (AMPscript), Mustache Template Language, Handlebars Template Language, Guide Template Language (GTL), PUP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1550, partly on the system 1550, as a stand-alone software package, partly on the system 1550 and partly on a remote computer or entirely on the remote computer or server. In the latter scenario, the remote computer may be connected to the system 1550 through any type of network, including a LAN or WAN, or the connection may be made to an external computer (e.g., through the Internet using an Internet Service Provider).

In an example, the instructions 1581 on the processor circuitry 1552 (separately, or in combination with the instructions 1582 and/or logic/modules 1583 stored in computer-readable storage media) may configure execution or operation of a trusted execution environment (TEE) 1590. The TEE 1590 operates as a protected area accessible to the processor circuitry 1552 to enable secure access to data and secure execution of instructions. The TEE 1590 may be a physical hardware device that is separate from other components of the system 1550 such as a secure-embedded controller, a dedicated SoC, or a tamper-resistant chipset or microcontroller with embedded processing devices and memory devices.

Additionally or alternatively, the TEE 1590 may be implemented as secure enclaves, which are isolated regions of code and/or data within the processor and/or memory/storage circuitry of the system 1550. Only code executed within a secure enclave may access data within the same secure enclave, and the secure enclave may only be accessible using the secure application (which may be implemented by an application processor or a tamper-resistant microcontroller). Various implementations of the TEE 1550, and an accompanying secure area in the processor circuitry 1552 or the memory circuitry 1554 and/or storage circuitry 1558 may be provided, for instance, through use of Software Guard Extensions (SGX), hardware security extensions, secure enclaves, and/or the like. Details of security hardening, hardware roots-of-trust, and trusted or protected operations may be implemented in the device 1550 through the TEE 1590 and the processor circuitry 1552.

The memory circuitry 1554 and/or storage circuitry 1558 may be divided into isolated user-space instances such as containers, partitions, virtual environments (VEs), and/or the like. The isolated user-space instances may be implemented using a suitable OS-level virtualization technology such as containers, zones, virtual private servers, virtual kernels and/or jails, chroot jails, and/or the like. Virtual machines could also be used in some implementations. The memory circuitry 1554 and/or storage circuitry 1558 may be divided into one or more trusted memory regions for storing applications or software modules of the TEE 1590.

Although the instructions 1582 are shown as code blocks included in the memory circuitry 1554 and the computational logic 1583 is shown as code blocks in the storage circuitry 1558, it should be understood that any of the code blocks may be replaced with hardwired circuits, for example, built into an FPGA, ASIC, or some other suitable circuitry. For example, where processor circuitry 1552 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1554 and/or storage circuitry 1558 may store program code of an operating system (OS), which may be a general purpose OS or an OS specifically written for and tailored to the computing node 1550. For example, the OS may be desktop OS, a netbook OS, a vehicle OS, a mobile OS, a real-time OS (RTOS), and/or some other suitable OS, such as those discussed herein.

The OS may include one or more drivers that operate to control particular devices that are embedded in the node 1550, attached to the node 1550, or otherwise communicatively coupled with the node 1550. The drivers may include individual drivers allowing other components of the node 1550 to interact or control various I/O devices that may be present within, or connected to, the node 1550. For example, the drivers may include a display driver to control and allow access to a display device, a touchscreen driver to control and allow access to a touchscreen interface of the node 1550, sensor drivers to obtain sensor readings of sensor circuitry 1572 and control and allow access to sensor circuitry 1572, actuator drivers to obtain actuator positions of the actuators 1574 and/or control and allow access to the actuators 1574, a camera driver to control and allow access to an embedded image capture device, audio drivers to control and allow access to one or more audio devices. The OSs may also include one or more libraries, drivers, APIs, firmware, middleware, software glue, and/or the like, which provide program code and/or software components for one or more applications to obtain and use the data from a secure execution environment, trusted execution environment, and/or management engine of the node 1550 (not shown).

The components of edge computing device 1550 may communicate over the IX 1556. The IX 1556 may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Ultra Path Interface (UPI), Accelerator Link (IAL), Common Application Programming Interface (CAPI), QuickPath interconnect (QPI), Ultra Path Interconnect (UPI), Omni-Path Architecture (OPA) IX, RapidIO system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

The IX 1556 couples the processor 1552 to communication circuitry 1566 for communications with other devices, such as a remote server (not shown) and/or the connected edge devices 1562. The communication circuitry 1566 is a hardware element, or collection of hardware elements, used to communicate over one or more networks (e.g., cloud 1563) and/or with other devices (e.g., edge devices 1562). The modem circuitry 156Z may convert data for transmission over-the-air using one or more radios 156X and 156Y, and may convert receive signals from the radios 156X and 156Y into digital signals/data for consumption by other elements of the system 1550.

The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios 156X and 156Y (or "RAT circuitries 156X and 156Y"), configured for a particular wireless communication protocol, may be used for the connections to the connected edge devices 1562. For example, wireless local area network (WLAN) circuitry 156X may be used to implement WiFi® communications in accordance with the Institute of Electrical and Electronics Engineers (IEEE) 802.11 standard. In addition, wireless wide area communications (e.g., according to a cellular or other wireless wide area protocol) may occur via wireless wide area network (WWAN) circuitry 156Y.

The wireless network transceiver 1566 (or multiple transceivers) may communicate using multiple standards or radios for communications at a different range. For example, the edge computing node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1563 via local or wide area network protocols. The wireless network transceiver 1566 may be an LPWA transceiver that follows the IEEE 802.15.4, or IEEE 802.15.4g standards, among others. The edge computing node 1563 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as WiFi® networks for medium speed communications and provision of network communications. The transceiver 1566 may include radios 156X and 156Y that are compatible with any number of 3GPP specifications, such as LTE and 5G/NR communication systems, discussed in further detail at the end of the present disclosure. A network interface controller (NIC) 1568 may be included to provide a wired communication to nodes of the edge cloud 1563 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, Tx, and/or the like) may be embodied by such communications circuitry.

The edge computing node 1550 may include or be coupled to acceleration circuitry 1564, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1564 may comprise logic blocks or logic fabric and other interconnected resources that may be programmed (configured) to perform various functions, such as the procedures, methods, functions, and/or the like discussed herein. In such implementations, the acceleration circuitry 1564 may also include memory cells (e.g., EPROM, EEPROM, flash memory, static memory (e.g., SRAM, anti-fuses, and/or the like) used to store logic blocks, logic fabric, data, and/or the like in LUTs and the like.

The IX 1556 also couples the processor 1552 to a sensor hub or external interface 1570 that is used to connect additional devices or subsystems. The additional/external devices may include sensors 1572, actuators 1574, and positioning circuitry 1545.

The sensor circuitry 1572 includes devices, modules, or subsystems whose purpose is to detect events or changes in its environment and send the information (sensor data) about the detected events to some other a device, module, subsystem, and/or the like. Examples of such sensors 1572 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 172 of the host vehicle may include engine sensor data collected by various engine sensors (e.g., engine temperature, oil pressure, and so forth).

The actuators 1574, allow node 1550 to change its state, position, and/or orientation, or move or control a mechanism or system. The actuators 1574 comprise electrical and/or mechanical devices for moving or controlling a mechanism or system, and converts energy (e.g., electric current or moving air and/or liquid) into some kind of motion. The actuators 1574 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1574 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The node 1550 may be configured to operate one or more actuators 1574 based on one or more captured events and/or instructions or control signals received from a service provider and/or various client systems.

The actuators 1574 may be driving control units (e.g., DCUs 174 of FIG. 1), Examples of DCUs 1574 include a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular implementations, the actuators/DCUs 1574 may be provisioned with control system configurations (CSCs), which are collections of software modules, software components, logic blocks, parameters, calibrations, variants, and/or the like used to control and/or monitor various systems implemented by node 1550 (e.g., when node 1550 is a CA/AD vehicle 110). The CSCs define how the DCUs 1574 are to interpret sensor data of sensors 1572 and/or CSD of other DCUs 1574 using multidimensional performance maps or lookup tables, and define how actuators/components are to be adjust/modified based on the sensor data. The CSCs and/or the software components to be executed by individual DCUs 1574 may be developed using any suitable object-oriented programming language (e.g., C, C++, Java, and/or the like), schema language (e.g., XML schema, AUTomotive Open System Architecture (AUTOSAR) XML schema, and/or the like), scripting language (VBScript, JavaScript, and/or the like), or the like. the CSCs and software components may be defined using a hardware description language (HDL), such as register-transfer logic (RTL), very high speed integrated circuit (VHSIC) HDL (VHDL), Verilog, and/or the like for DCUs 1574 that are implemented as field-programmable devices (FPDs). The CSCs and software components may be generated using a modeling environment or model-based development tools, the CSCs may be generated or updated by one or more autonomous software agents and/or AI agents based on learnt experiences, ODDs, and/or other like parameters.

The IVS 101 and/or the DCUs 1574 is configurable or operable to operate one or more actuators based on one or more captured events (as indicated by sensor data captured by sensors 1572) and/or instructions or control signals received from user inputs, signals received over-the-air from a service provider, or the like. Additionally, one or more DCUs 1574 may be configurable or operable to operate one or more actuators by Tx/sending instructions or control signals to the actuators based on detected events (as indicated by sensor data captured by sensors 1572). One or more DCUs 1574 may be capable of reading or otherwise obtaining sensor data from one or more sensors 1572, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 1574 may be configurable or operable to provide the control system data to a central hub and/or other devices/components on a periodic or aperiodic basis, and/or when triggered.

The various subsystems, including sensors 1572 and/or DCUs 1574, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

Additionally or alternatively, individual AI agents are configurable or operable to control respective control systems of the host vehicle, some of which may involve the use of one or more DCUs 1574 and/or one or more sensors 1572. The actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, and/or the like (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 1572 and receive control system data (CSD) from one or more DCUs 1574 of the host vehicle 110. The act of monitoring may include capturing CSD and/or sensor data from individual sensors 172 and DCUs 1574. Monitoring may include polling (e.g., periodic polling, sequential (roll call) polling, and/or the like) one or more sensors 1572 for sensor data and/or one or more DCUs 1574 for CSD for a specified/selected period of time. Additionally or alternatively, monitoring may include sending a request or command for sensor data/CSD in response to an external request for sensor data/CSD. Monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular application, use case, design choice, and/or the like. The monitoring may be triggered or activated by an application or subsystem of the IVS 101 or by a remote device, such as compute node 140 and/or server(s) 160.

Additionally or alternatively, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 1572 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 1574 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 1545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. The positioning circuitry 1545 may include a Micro-Technology for Positioning, Navigation, and Timing (Micro-PNT) IC that uses a aggregated timing clock to perform position tracking/estimation without GNSS assistance. The positioning circuitry 1545 may also be part of, or interact with, the communication circuitry 1566 to communicate with the nodes and components of the positioning network. The positioning circuitry 1545 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1545 is, or includes an INS, which is a system or device that uses sensor circuitry 1572 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 1550 without the need for external references.

In some optional examples, various input/output (I/O) devices may be present within or connected to, the edge computing node 1550, which are referred to as input circuitry 1586 and output circuitry 1584 in FIG. 15. The input circuitry 1586 and output circuitry 1584 include one or more user interfaces designed to enable user interaction with the node 1550 and/or peripheral component interfaces designed to enable peripheral component interaction with the node 1550. Input circuitry 1586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1584 may be included to show information or otherwise convey information, such as sensor readings, actuator position(s), or other like information. Data and/or graphics may be displayed on one or more user interface components of the output circuitry 1584. Output circuitry 1584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the node 1550. The output circuitry 1584 may also include speakers or other audio emitting devices, printer(s), and/or the like. The sensor circuitry 1572 may be used as the input circuitry 1584 (e.g., an image capture device, motion capture device, or the like) and one or more actuators 1574 may be used as the output device circuitry 1584 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge computing node 1550, although, in examples in which the edge computing node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge computing node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1578 may communicate the information on the battery 1576 to the processor 1552 over the IX 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1583 in the form of software, firmware, or hardware commands to implement the techniques described herein. Although such instructions 1583 are shown as code blocks included in the memory 1554 and the storage 1558, it may be understood that any of the code blocks may be replaced with hardwired circuits, for example, built into an application specific integrated circuit (ASIC).

In an example, the instructions 1581, 1582, 1583 provided via the memory 1554, the storage 1558, or the processor 1552 may be embodied as a non-transitory, machine-readable medium 1560 including code to direct the processor 1552 to perform electronic operations in the edge computing node 1550. The processor 1552 may access the non-transitory, machine-readable medium 1560 over the IX 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

The illustrations of FIGS. 12-15 is intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The compute platform of FIG. 15 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

At least one of the systems or components set forth in one or more of the preceding figures may be configurable or operable to perform one or more operations, techniques, processes, and/or methods as set forth in the implementation examples section below.

6. Implementation Examples

Example 1 includes a method of operating an Intelligent Transportation System Station (ITS-S), the method comprising: generating a Collective Perception Messages (CPM) including a layered cost map container, the layered cost map container including cost values and corresponding confidence levels of a layered cost map available at the ITS-S; and transmitting the CPM to one or more other ITS-Ss.

Example 2 includes the method of example 1 and/or some other example(s) herein, further comprising: detecting a CPM generation event, wherein the generating the CPM is further for generating the CPM in response to detection of the CPM generation event.

Example 3 includes the method of examples 1-2 and/or some other example(s) herein, wherein the cost-based occupancy grid data comprises data of an aggregated cost map layer of the layered cost map available at the ITS-S.

Example 4 includes the method of example 3 and/or some other example(s) herein, further comprising: selecting the aggregated cost map layer to be included in the CPM when one or more values of respective cells in the aggregated cost map layer changes for more than an aggregated layer threshold, wherein the one or more values are cost values of the respective cells or confidence levels of the respective cells.

Example 5 includes the method of example 4 and/or some other example(s) herein, wherein the aggregated layer threshold is based on a fraction of a total number of cells in the aggregated cost map layer for which cost values or confidence levels changed compared to cost values or confidence levels in a previous aggregated cost map layer of a previously transmitted CPM.

Example 6 includes the method of examples 3-5 and/or some other example(s) herein, further comprising: determining to include the layered cost map container with the aggregated cost map layer in the CPM when a difference between a current Euclidian distance of a center point of the layered cost map and a previous Euclidian distance of a center point of a previous layered cost map included in a previously transmitted CPM exceeds a center point position change threshold.

Example 7 includes the method of examples 3-6 and/or some other example(s) herein, further comprising: determining to include the layered cost map container with the aggregated cost map layer in the CPM when a difference between a current dimension of the layered cost map and a previous dimension of the layered cost map included in a previously transmitted CPM exceeds a dimension change threshold.

Example 8 includes the method of examples 3-7 and/or some other example(s) herein, further comprising: determining to include the layered cost map container with the aggregated cost map layer in the CPM when a difference between a current orientation of the layered cost map and a previous orientation of the layered cost map included in a previously transmitted CPM exceeds an orientation change threshold.

Example 9 includes the method of examples 3-8 and/or some other example(s) herein, further comprising: determining to include the layered cost map container with the aggregated cost map layer in the CPM when a time elapsed since a previous time the aggregated cost map layer was included in a previously transmitted CPM exceeds a threshold amount of time (T_GenCpmMax), wherein the T_GenCpmMax is an amount of time to be elapsed between a start of a previous CPM generation event and a current CPM generation event.

Example 10 includes the method of examples 3-9 and/or some other example(s) herein, wherein the cost-based occupancy grid data further comprises one or more other layers of the layered cost map available at the ITS-S, wherein the other layers include a discrepancy handling cost map layer and a collaboration request cost map layer, the discrepancy handling cost map layer indicating cells where there are discrepancies between cost values or confidence levels of the layered cost map and cost values or confidence levels of another layered cost map received from one or more neighboring ITS-Ss, and the collaboration request cost map layer indicating cells where the ITS-S could not determine perception with a minimum confidence level.

Example 11 includes the method of example 10 and/or some other example(s) herein, wherein further comprising: determining to include the layered cost map container with the discrepancy handling cost map layer in the CPM when one or more values of respective cells in the discrepancy handling cost map layer changes for more than an discrepancy threshold, wherein the one or more values are cost values of the respective cells or confidence levels of the respective cells.

Example 12 includes the method of example 11 and/or some other example(s) herein, wherein the discrepancy threshold is based on a fraction of a total number of cells in the discrepancy handling cost map layer or the aggregated cost map layer for which cost values or confidence levels changed compared to cost values or confidence levels in a cost map layer of a CPM received from a neighboring ITS-S.

Example 13 includes the method of examples 10-12 and/or some other example(s) herein, further comprising: determining to include the layered cost map container with the collaboration request cost map layer in the CPM when a confidence level for perception in one or more cells of the layered cost map is lower than a confidence level threshold for more than a threshold number of cells in the aggregated cost map layer.

Example 14 includes the method of examples 10-13 and/or some other example(s) herein, wherein the other layers further include one or more of a static cost map layer indicating perceived permanent structures, a perceived objects cost map layer indicating one or more perceived objects that are dynamic or static, an inflation cost map layer indicating respective buffer zones around the one or more perceived objects or the permanent structures, and a collective perception cost map layer indicating one or more perceived objects received from one or more neighboring ITS-Ss.

Example 15 includes the method of example 14 and/or some other example(s) herein, further comprising: determining to include the layered cost map container with corresponding ones of the static cost map layer, the perceived objects cost map layer, the inflation cost map layer, and the collective perception cost map layer in the CPM when a confidence level for one or more cells of the static cost map layer, the perceived objects cost map layer, the inflation cost map layer, or the collective perception cost map layer is lower than a confidence level threshold for more than a threshold number of cells in the layered cost map compared to the cost values or confidence levels of same cost map layer in a previously transmitted CPM.

Example 16 includes the method of examples 14-15 and/or some other example(s) herein, further comprising: determining to include the layered cost map container with one or more of the static cost map layer, the perceived objects cost map layer, the inflation cost map layer, and the collective perception cost map layer in the CPM when a time elapsed since a last time same cost map layer was included in a previously transmitted CPM exceeds another threshold amount of time.

Example 17 includes the method of example 16 and/or some other example(s) herein, wherein the other threshold amount of time is based on a predefined amount of time to be elapsed between consecutive inclusion of a cost map layer other than the aggregated cost map layer in CPM and T_GenCpmMax.

Example 18 includes the method of examples 3-17, further comprising: dividing the layered cost map into a plurality of cells; generating a plurality of layers of the layered cost map; and preparing the aggregated cost map layer by aggregating each layer of the plurality of layers.

Example 19 includes the method of example 18, wherein the preparing the layered cost map further comprises: preparing the layered cost map to have specified dimensions based on a field-of-view (FOV) of one or more sensors accessible by the ITS-S.

Example 20 includes the method of example 18 or 19, wherein the preparing the layered cost map further comprises: periodically updating the aggregated cost map layer, wherein a period for updating the aggregated cost map layer is smaller than a CPM generation event periodicity.

Example 21 includes the method of examples 18-20, wherein the generating the CPM further comprises: generating the CPM to further include a ReportedCostMapGridArea data field including dimensions of the layered cost map; and generating the CPM to further include a GridCellSizeX data element (DE) and a GridCellSizeYDE to indicate dimensions of each cell of the plurality of cells.

Example 22 includes the method of examples 18-21, wherein the generating the CPM further comprises: generating the CPM to further include a NumberOfLayeredCostMap DF indicating a number of cost map layers in the layered cost map container.

Example 23 includes the method of examples 18-22, further comprising: determining respective cost values for each cell of the plurality of cells based on sensor data obtained from the one or more sensors, information obtained from one or more neighboring ITS-Ss, and a static map available to the ITS-S.

Example 24 includes the method of examples 18-23, wherein the generating the CPM further comprises: generating the CPM to further include a PerGridCellCostValueConfigType DF and a PerGridCellConfidenceLevelConfigType DF, the PerGridCellCostValueConfigType DF including a cost value of a cell of the plurality of cells, and the PerGridCellConfidenceLevelConfigType DF including a confidence level of the cell of the plurality of cells.

Example 25 includes the method of examples 1-24, wherein at least one cost map layer included in the layered cost map container has a different format than at least one other cost map layer included in the layered cost map container.

Example 26 includes the method of examples 1-25, wherein the ITS-S is a vehicle ITS-S (V-ITS-S), a roadside ITS-S(R-ITS-S), or a vulnerable road user (VRU) ITS-S.

Example Y01 includes an apparatus employed in a vehicle, the apparatus comprising: communication circuitry communicatively coupled with processor circuitry, the processor circuitry communicatively coupled with memory circuitry, the processor circuitry is configurable or operable to perform the method of any one of examples 1-26.

Example Y02 includes an apparatus employed in a roadside infrastructure, the apparatus comprising: communication circuitry communicatively coupled with processor circuitry, the processor circuitry communicatively coupled with memory circuitry, the processor circuitry is configurable or operable to perform the method of any one of examples 1-26.

Example Y03 includes an apparatus employed as a mobile device, the apparatus comprising: communication circuitry communicatively coupled with processor circuitry, the processor circuitry communicatively coupled with memory circuitry, the processor circuitry is configurable or operable to perform the method of any one of examples 1-26.

Example Z01 includes one or more computer readable media comprising instructions, wherein execution of the instructions by processor circuitry is to cause the processor circuitry to perform the method of any one of examples 1-26 and/or Y01-Y03. Example Z02 includes a computer program comprising the instructions of example Z01. Example Z03a includes an Application Programming Interface defining functions, methods, variables, data structures, and/or protocols for the computer program of example Z02.

Example Z03b includes an API or specification defining functions, methods, variables, data structures, protocols, and/or the like, defining or involving use of any of examples 1-26 and/or Y01-Y03 or portions thereof, or otherwise related to any of examples 1-26 and/or Y01-Y03 or portions thereof.

Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object. Example Z12 includes a signal encoded with the data unit of examples Z10 and/or Z11. Example Z13 includes an electromagnetic signal carrying the instructions of example Z01. Example Z14 includes an apparatus comprising means for performing the method of any one of examples 1-26 and/or Y01-Y03 and/or some other example(s) herein.

An example implementation includes a Multi-access Edge Computing (MEC) host executing a service as part of one or more MEC applications instantiated on a virtualization infrastructure, the service being related to any of examples 1-26 and/or Y01-Y03 or portions thereof and/or some other example(s) herein, and wherein the MEC host is configurable or operable to operate according to a standard from one or more ETSI MEC standards families.

An example implementation is an edge computing system, including respective edge processing devices and nodes to invoke or perform the operations of examples 1-26, or other subject matter described herein. Another example implementation is a client endpoint node, operable to invoke or perform the operations of examples 1-26, or other subject matter described herein. Another example implementation is an aggregation node, network hub node, gateway node, or core data processing node, within or coupled to an edge computing system, operable to invoke or perform the operations of examples 1-26 and/or Y01-Y03, or other subject matter described herein. Another example implementation is an access point, base station, road-side unit, street-side unit, or on-premise unit, within or coupled to an edge computing system, operable to invoke or perform the operations of examples 1-26 and/or Y01-Y03, or other subject matter described herein. Another example implementation is an edge provisioning node, service orchestration node, application orchestration node, or multi-tenant management node, within or coupled to an edge computing system, operable to invoke or perform the operations of examples 1-26 and/or Y01-Y03, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-26 and/or Y01-Y03, or other subject matter described herein. Another example implementation is an edge computing system operable as an edge mesh, as an edge mesh with side car loading, or with mesh-to-mesh communications, operable to invoke or perform the operations of examples 1-26 and/or Y01-Y03, or other subject matter described herein. Another example implementation is an edge computing system including network functions, acceleration functions, acceleration hardware, storage hardware, or computation hardware resources, operable to invoke or perform the use cases discussed herein, with use of examples 1-26 and/or Y01-Y03, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-26 and/or Y01-Y03, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-26, and/or other subject matter described herein. Another example implementation is an edge computing system adapted for supporting xApps and operating according to 0-RAN specifications, operable to invoke or perform the use cases discussed herein, with use of examples 1-26 and/or Y01-Y03, or other subject matter described herein. Another example implementation is an edge computing system adapted for operating according to Open Visual Inference and Neural network Optimization (OpenVINO) specifications, operable to invoke or perform the use cases discussed herein, with use of examples 1-26 and/or Y01-Y03, or other subject matter described herein. Another example implementation is an edge computing system adapted for operating according to OpenNESS specifications, operable to invoke or perform the use cases discussed herein, with use of examples 1-26 and/or Y01-Y03, or other subject matter described herein. Another example implementation is an edge computing system adapted for operating according to a Smart Edge computing framework, operable to invoke or perform the use cases discussed herein, with use of examples 1-26 and/or Y01-Y03, or other subject matter described herein.

Any of the above-described examples may be combined with any other example (or combination of examples), unless explicitly stated otherwise.

7. Terminology

The terminology used herein is for the purpose of the present disclosure only and is not intended to be limiting of the disclosure. The present disclosure has been described with reference to flowchart illustrations and/or block diagrams of methods, apparatus (systems), and/or computer program products of the present disclosure. In the drawings, some structural or method features may be shown in specific arrangements and/or orderings. However, it should be appreciated that such specific arrangements and/or orderings may not be required. Rather, such features may be arranged in a different manner and/or order than shown in the illustrative figures. Additionally, the inclusion of a structural or method feature in a particular figure is not meant to imply that such feature is required in all implementations and may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some of the described process (e.g., code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, and/or the like, or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and/or the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an element of edge computing operations, whether part of a larger system, distributed collection of systems, or a stand-alone apparatus. A compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and/or the like. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. The base station may be split into multiple functional blocks operating in software for flexibility, cost, and performance. A base station can include an evolved node-B (eNB) or a next generation node-B (gNB). The base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, and/or the like. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, and/or the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and/or the like), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" or "NFV" indicates the migration of NFs from embedded services inside proprietary hardware appliances to software-based virtualized NFs (or VNFs) running on standardized CPUs using industry standard virtualization and cloud computing technologies. NFV processing and data storage occurs at the edge data centers that are connected directly to the local cellular site, within the infrastructure edge. As used herein, the term "virtualized network function" or "VNF" indicates a software-based NF operating on multi-function, multi-purpose compute resources (e.g., x86, ARM processing architecture) which are used by NFV in place of dedicated physical equipment. Several VNFs can operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, and/or the like) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, and/or the like), V2X communication technologies (including C-V2X), Dedicated Short Range Communications (DSRC) communication systems such as Intelligent-Transport-Systems (ITS) including the European ITS-G5, ITS-G5B, ITS-G5C, and/or the like. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "interoperability" refers to the ability of UEs and/or stations, such as ITS-Ss including vehicle ITS-Ss (V-ITS-Ss), roadside ITS-Ss (R-ITS-Ss), and VRU ITS-Ss utilizing one RAT to communicate with other stations utilizing another RAT. The term "Coexistence" refers to sharing or allocating radiofrequency resources among stations/UEs using either vehicular communication system.

The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, and/or the like, and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S" or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Geo-Area" refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter $\alpha$ which is the distance between the center point and the short side of the rectangle (perpendicular bisector of the short side, a parameter b which is the distance between the center point and the long side of the rectangle (perpendicular bisector of the long side, and a parameter $\theta$ which is the azimuth angle of the long side of the rectangle. The elliptical Geo-Area is defined by an elliptical shape with a point A that represents the center of the rectangle and a parameter $\alpha$ which is the length of the long semi-axis, a parameter b which is the length of the short semi-axis, and a parameter $\theta$ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system.

The term "Interoperability" refers to the ability of ITS-Ss utilizing one communication system or RAT to communicate with other ITS-Ss utilizing another communication system or RAT. The term "Coexistence" refers to sharing or allocating radiofrequency resources among ITS-Ss using either communication system or RAT.

The term "ITS data dictionary" refers to a repository of DEs and DFs used in the ITS applications and ITS facilities layer. The term "ITS message" refers to messages exchanged at ITS facilities layer among ITS stations or messages exchanged at ITS applications layer among ITS stations.

The term "Collective Perception" or "CP" refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs.

The term "Collective Perception basic service" (also referred to as CP service (CPS)) refers to a facility at the ITS-S facilities layer to receive and process CPMs, and generate and transmit CPMs.

The term "Collective Perception Message" or "CPM" refers to a CP basic service PDU.

The term "Collective Perception data" or "CPM data" refers to a partial or complete CPM payload.

The term "Collective Perception protocol" or "CPM protocol" refers to an ITS facilities layer protocol for the operation of the CPM generation, transmission, and reception.

The term "Environment Model" refers to a current representation of the immediate environment of an ITS-S, including all perceived objects perceived by either local perception sensors or received by V2X.

The term "object", in the context of the CP Basic Service, refers to the state space representation of a physically detected object within a sensor's perception range. The term "object list" refers to a collection of objects temporally aligned to the same timestamp.

The term "CP object", "CPM object", or "object" in the context of CP, refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference.

The term "ITS station" refers to a functional entity specified by the ITS station (ITS-S) reference architecture. The term "Roadside ITS station" refers to an ITS station in a roadside ITS sub-system. The term "Vehicle ITS station" refers to an ITS station in a vehicular ITS sub-system.

The term "ITS sub-system" refers to one or more sub-systems of an ITS with ITSC components for a specific context. The term "Roadside ITS sub-system" refers to an ITS sub-system in the context of roadside ITS equipment. The term "Vehicle ITS station" refers to an ITS station in a vehicular ITS sub-system.

The term "ITS Central System" refers to an ITS system in the backend, for example, traffic control center, traffic management center, or cloud system from road authorities, ITS application suppliers or automotive OEMs (see e.g., clause 4.5.1.1 of [EN302665]).

The term "personal ITS-S" refers to an ITS-S in a nomadic ITS sub-system in the context of a portable device (e.g., a mobile device of a pedestrian).

The term "vehicle" may refer to road vehicle designed to carry people or cargo on public roads and highways such as AVs, busses, cars, trucks, vans, motor homes, and motor-cycles; by water such as boats, ships, and/or the like; or in the air such as airplanes, helicopters, UAVs, satellites, and/or the like.

The term "sensor measurement" refers to the operation of a sensor based on its working principle to generate a state space representation for detected objects. Additionally or alternatively, the term "sensor measurement" refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, and/or the like) to generate an object description.

The term "State Space Representation" refers to a mathematical description of a detected object, which includes state variables such as distance, speed, object dimensions, and the like. The state variables associated with an object are interpreted as an observation for a certain point in time, and therefore, are accompanied by a time reference.

The term "Cost Map Grid" refers to an area of the road surface including pavement, sidewalk, verge, and/or the like, where the shape may be a rectangle, circle, ellipse, polygon, or some other shape. The term "Cost Map Cell" refers to a Cost Map Grid is divided into smaller rectangular cells and it is the smallest granularity. The term "Cost Map Layer" refers to a Cost Map Grid where each cell is represented by a cost and confidence value. It carries the information of specific type of objects or obstacles or structures on the road Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the present disclosure, and as such, any combination of containers, frames, DFs, DEs, IEs, values, actions, and/or features are possible, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements The configurations, arrangements, implementations, and processes described herein can be used in various combinations and/or in parallel. The accompanying drawings that form a part hereof show, by way of illustration, and not of limitation, specific implementations in which the subject matter may be practiced. The illustrated implementations are described in sufficient detail to enable those skilled in the art to practice the teachings disclosed herein. Other implementations and arrangements may be utilized and derived therefrom, such that structural and logical substitutions and changes may be made without departing from the scope of this disclosure. The scope of the invention is set out in the appended set of claims, along with the full range of equivalents to which such claims are entitled.

The invention claimed is:

1. An apparatus to be employed as an Intelligent Transportation System Station (ITS-S), the apparatus comprising:
   memory circuitry to store instructions of a Collective Perception Service (CPS) facility; and
   processor circuitry connected to the memory circuitry, wherein the processor circuitry is to operate the CPS to:
      generate a Collective Perception Message (CPM) including a layered cost map container, wherein the layered cost map container includes cost values and corresponding confidence levels of a layered cost map available at the ITS-S;
      generate an aggregated cost map layer as an aggregation of each layer of a set of layers;
      divide each layer in the set of layers into a set of cells;
      determine respective cost values for corresponding cells in the set of cells based on sensor data obtained from one or more sensors accessible by the ITS-S, a static map available to the ITS-S, and information obtained from one or more neighboring ITS-Ss;
      select the aggregated cost map layer to be included in the CPM when at least one of the cost values or confidence levels of respective cells in the aggregated cost map layer changes by more than an aggregated layer threshold; and
      cause transmission of the CPM to one or more other ITS-Ss.

2. The apparatus of claim 1, wherein the processor circuitry is to operate the CPS to:
   detect a CPM generation event, wherein the CPM is generated in response to detection of the CPM generation event.

3. The apparatus of claim 1, wherein the aggregated layer threshold is based on a fraction of a total number of cells in the aggregated cost map layer for which at least one of the cost values or the confidence levels changed compared to cost values or confidence levels, respectively, in a previous aggregated cost map layer of a previously transmitted CPM.

4. The apparatus of claim 3, wherein the processor circuitry is to operate the CPS to:
   determine to include the aggregated cost map layer in the layered cost map container of in the CPM when one or more of:

a difference between a current Euclidian distance of a center point of the layered cost map and a previous Euclidian distance of a center point of a previous layered cost map included in a previously transmitted CPM exceeds a center point position change threshold;

a difference between a current dimension of the layered cost map and a previous dimension of the layered cost map included in a previously transmitted CPM exceeds a dimension change threshold;

a difference between a current orientation of the layered cost map and a previous orientation of the layered cost map included in a previously transmitted CPM exceeds an orientation change threshold; or a time elapsed since a previous time the aggregated cost map layer was included in a previously transmitted CPM exceeds a threshold amount of time (T_GenCpmMax), wherein the T_GenCpmMax is an amount of time to be elapsed between a start of a previous CPM generation event and a current CPM generation event.

5. The apparatus of claim 1, wherein the set of layers includes a discrepancy handling cost map layer, the discrepancy handling cost map layer indicates cells where there are discrepancies between at least one of the cost values or the confidence levels of the layered cost map and cost values or confidence levels, respectively, of another layered cost map received from one or more neighboring ITS-Ss, and the processor circuitry is to operate the CPS to:

determine to include the layered cost map container with the discrepancy handling cost map layer in the CPM when one or more values of respective cells in the discrepancy handling cost map layer change by more than a discrepancy threshold, wherein:

the one or more values are cost values of the respective cells or confidence levels of the respective cells, and the discrepancy threshold is based on a fraction of a total number of cells in the discrepancy handling cost map layer or the aggregated cost map layer for which cost values or confidence levels changed compared to cost values or confidence levels in a cost map layer of a CPM received from a neighboring ITS-S.

6. The apparatus of claim 5, wherein the set of layers includes a collaboration request cost map layer, the collaboration request cost map layer indicates cells where the ITS-S could not determine perception with a minimum confidence level, and the processor circuitry is to operate the CPS to:

determine to include the layered cost map container with the collaboration request cost map layer in the CPM when a confidence level for perception in one or more cells of the layered cost map is lower than a confidence level threshold by more than a threshold number of cells in the aggregated cost map layer.

7. The apparatus of claim 5, wherein the set of layers includes one or more of a static cost map layer indicating perceived permanent structures, a perceived objects cost map layer indicating one or more perceived objects that are dynamic or static, an inflation cost map layer indicating respective buffer zones around the one or more perceived objects or the permanent structures, or a collective perception cost map layer indicating one or more perceived objects received from one or more neighboring ITS-Ss, and the processor circuitry is to operate the CPS to:

determine to include the layered cost map container with corresponding ones of the static cost map layer, the perceived objects cost map layer, the inflation cost map layer, and the collective perception cost map layer in the CPM when one or more of:

a confidence level for one or more cells of the static cost map layer, the perceived objects cost map layer, the inflation cost map layer, or the collective perception cost map layer is lower than a confidence level threshold by more than a threshold number of cells in the layered cost map compared to the cost values or confidence levels of a same cost map layer in a previously transmitted CPM; or, a time elapsed since a last time same cost map layer was included in a previously transmitted CPM exceeds a threshold amount of time, wherein the threshold amount of time is based on a predefined amount of time to be elapsed between consecutive inclusion of a cost map layer other than the aggregated cost map layer in CPM and a threshold amount of time (T_GenCpmMax).

8. The apparatus of claim 1, wherein, to prepare the layered cost map, the processor circuitry is to operate the CPS to one or both of:

prepare the layered cost map to have specified dimensions based on a field-of-view (FOV) of the one or more sensors; and periodically update the aggregated cost map layer, wherein a period for updating the aggregated cost map layer is smaller than a CPM generation event periodicity.

9. The apparatus of claim 1, wherein the processor circuitry is to operate the CPS to generate the CPM to include one or more of:

a ReportedCostMapGridArea data frame (DF) to include dimensions of the layered cost map;

a GridCellSizeX data element (DE) and a GridCellSizeY DE to include dimensions of each cell of the set of cells;

a NumberOfLayeredCostMap data frame to indicate a number of cost map layers in the layered cost map container;

a PerGridCellCostValueConfigType DF to include a cost value of a cell of the set of cells; or a PerGridCellConfidenceLevelConfigType DF to include a confidence level of the cell of the set of cells.

10. The apparatus of claim 1, wherein at least one layer in the set of layers has a different format than at least one other layer in the set of layers.

11. The apparatus of claim 1, wherein the ITS-S is a vehicle ITS-S (V-ITS-S), a roadside ITS-S (R-ITS-S), or a vulnerable road user (VRU) ITS-S.

12. One or more non-transitory computer readable media (NTCRM), comprising instructions of a Collective Perception Service (CPS) facility, wherein execution of the instructions by one or more processors of an Intelligent Transportation System Station (ITS-S) is to cause the ITS-S to:

detect a Collective Perception Message (CPM) generation event;

generate a CPM based on the CPM generation event, wherein:

the CPM includes a layered cost map container, the layered cost map container includes cost values and corresponding confidence levels of a layered cost map available at the ITS-S, the layered cost map includes a set of layers, each layer in the set of layers includes a set of cells, the set of layers includes a discrepancy handling cost map layer, and the discrepancy handling cost map layer indicates cells where there are discrepancies between at least one of the cost values or confidence levels of the layered cost map and cost values or confidence levels, respectively, of another layered cost map received from one or more neighboring ITS-Ss; and cause transmission of the CPM to one or more other ITS-Ss.

13. The one or more NTCRM of claim 12 wherein the set of cells of each layer in the set of layers is arranged in a grid, and execution of the instructions is to cause the ITS-S to:

determine the cost values for corresponding cells in the set of cells of each layer based on sensor data obtained from the one or more sensors accessible by the ITS-S, a static map available to the ITS-S, and information obtained from one or more neighboring ITS-Ss.

14. The one or more NTCRM of claim 13, wherein the set of layers includes an aggregated cost map layer which is an aggregation of each layer of the set of layers.

15. The one or more NTCRM of claim 13, wherein the set of layers includes a collaboration request cost map layer which indicates cells where the ITS-S could not determine perception with a minimum confidence level.

16. The one or more NTCRM of claim 15, wherein the set of layers includes one or more of a static cost map layer indicating perceived permanent structures, a perceived objects cost map layer indicating one or more perceived objects that are dynamic or static, an inflation cost map layer indicating respective buffer zones around the one or more perceived objects or the permanent structures, or a collective perception cost map layer indicating one or more perceived objects received from one or more neighboring ITS-Ss.

17. The one or more NTCRM of claim 14, wherein, to prepare the layered cost map, execution of the instructions is to cause the ITS-S to one or both of:

prepare the layered cost map to have specified dimensions based on a field-of-view (FOV) of the one or more sensors; and periodically update the aggregated cost map layer, wherein a period for updating the aggregated cost map layer is smaller than a CPM generation event periodicity.

18. The one or more NTCRM of claim 13, wherein, to generate the CPM, execution of the instructions is to cause the ITS-S to generate the CPM to include one or more of:

a ReportedCostMapGridArea data frame (DF) to include dimensions of the layered cost map;

a GridCellSizeX data element (DE) and a GridCellSizeY DE to include dimensions of each cell of the set of cells;

a NumberOfLayeredCostMap DF to indicate a number of cost map layers in the layered cost map container;

a PerGridCellCostValueConfigType DF to include a cost value of a cell of the set of cells; or a PerGridCellConfidenceLevelConfigType DF to include a confidence level of the cell of the set of cells.

19. The one or more NTCRM of claim 13, wherein at least one layer in the set of layers has a different format than at least one other layer in the set of layers.

20. A method of operating a Collective Perception Service (CPS) facility in a facilities layer of an Intelligent Transportation System Station (ITS-S), the method comprising:

detecting a Collective Perception Message (CPM) generation event;

determining cost values for corresponding cells in a set of cells of each layer of a layered cost map based on sensor data obtained from one or more sensors accessible by the ITS-S, a static map available to the ITS-S, and information obtained from one or more neighboring ITS-Ss;

determining confidence levels of the corresponding cells;

generating a CPM based on the CPM generation event, wherein:

the CPM includes a layered cost map container; and the layered cost map container includes a discrepancy handling cost map layer which indicates discrepancies between at least one of the determined cost values or the determined confidence levels of the layered cost map and cost values or confidence levels, respectively, of another layered cost map received from one or more neighboring ITS-Ss; and causing transmission of the CPM to one or more other ITS-Ss.

21. The method of claim 20, wherein the generating includes generating the CPM to include one or more of:

a ReportedCostMapGridArea data frame (DF) to include dimensions of the layered cost map;

a GridCellSizeX data element (DE) and a GridCellSizeY DE to include dimensions of each cell of the set of cells;

a NumberOfLayeredCostMap DF to indicate a number of cost map layers in the layered cost map container;

a PerGridCellCostValueConfigType DF to include a cost value of a cell of the set of cells; or a PerGridCellConfidenceLevelConfigType DF to include a confidence level of the cell of the set of cells.

22. The apparatus of claim 1, wherein the set of layers includes a discrepancy handling cost map layer, the discrepancy handling cost map layer indicates cells where there are discrepancies between at least one of the cost values or the confidence levels of the layered cost map and cost values or confidence levels, respectively, of another layered cost map received from one or more neighboring ITS-Ss.

23. The apparatus of claim 22, wherein the processor circuitry is to operate the CPS to determine to include the layered cost map container with the discrepancy handling cost map layer in the CPM when at least one of the cost values or the confidence levels of respective cells in the discrepancy handling cost map layer changes by more than a discrepancy threshold.

24. The apparatus of claim 23, wherein the discrepancy threshold is based on a fraction of a total number of cells in the discrepancy handling cost map layer or the aggregated cost map layer for which cost values changed compared to cost values in a cost map layer of a CPM received from a neighboring ITS-S.

25. The apparatus of claim 23, wherein the discrepancy threshold is based on a fraction of a total number of cells in the discrepancy handling cost map layer or the aggregated cost map layer for which confidence levels changed compared to confidence levels in a cost map layer of a CPM received from a neighboring ITS-S.

* * * * *